US012641493B2

(12) United States Patent (10) Patent No.: US 12,641,493 B2
Zhao et al. (45) Date of Patent: May 26, 2026

(54) HANDOVER METHOD AND COMMUNICATION APPARATUS

(71) Applicant: HUAWEI TECHNOLOGIES CO., LTD., Guangdong (CN)

(72) Inventors: Fengyu Zhao, Shenzhen (CN); Meng Li, Beijing (CN); Cuili Ge, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 577 days.

(21) Appl. No.: 17/896,920

(22) Filed: Aug. 26, 2022

(65) Prior Publication Data

US 2022/0408317 A1 Dec. 22, 2022

Related U.S. Application Data

(63) Continuation of application No. PCT/CN2020/077375, filed on Mar. 1, 2020.

(51) Int. Cl.
*H04W 36/00* (2009.01)

(52) U.S. Cl.
CPC ................................. *H04W 36/0009* (2018.08)

(58) Field of Classification Search
CPC ...................... H04W 36/0007; H04W 36/0009
See application file for complete search history.

(56) References Cited

U.S. PATENT DOCUMENTS

| | | | |
|---|---|---|---|
| 2008/0310368 A1 | 12/2008 | Fischer | |
| 2009/0168723 A1* | 7/2009 | Meylan | ................. H04L 1/1841 |
| | | | 370/331 |
| 2013/0301509 A1* | 11/2013 | Purnadi | ............ H04W 36/0033 |
| | | | 370/312 |

(Continued)

FOREIGN PATENT DOCUMENTS

| | | |
|---|---|---|
| CN | 109842639 A | 6/2019 |
| CN | 110167190 A | 8/2019 |

(Continued)

OTHER PUBLICATIONS

Ericsson, Introduction of option 3—Dual Connectivity with NR in E-UTRAN—RAN3 parts. 3GPP TSG-RAN WG3 Meeting #95bis, Spokane, WA, USA, Apr. 3-7, 2017, R3-171152, 46 pages.

(Continued)

*Primary Examiner* — Marcus Smith
*Assistant Examiner* — Zhaohui Yang

(57) ABSTRACT

A handover method and a communication apparatus are provided. The method includes: A target access network device obtains a first message and information used for transmitting multicast data, where the first message is used for requesting to establish a resource for handing over a terminal device to the target access network device. The target access network device sends a second message, where the second message indicates the established resource on the target access network device; receives a first packet from a user plane network element, where the first packet corresponds to the information used for transmitting the multicast data; and sends the first packet to the terminal device. In this way, the terminal device is handed over from a source access network device to the target access network device when the terminal device receives the multicast data.

7 Claims, 14 Drawing Sheets

(56)                    References Cited

U.S. PATENT DOCUMENTS

2018/0176839 A1 *   6/2018   Ohara ................. H04W 36/087
2019/0268815 A1      8/2019   Zhu et al.

FOREIGN PATENT DOCUMENTS

| | | |
|---|---|---|
| CN | 110476378 A | 11/2019 |
| CN | 110809299 A | 2/2020 |
| WO | 2019165427 A1 | 8/2019 |
| WO | 2019223780 A1 | 11/2019 |

OTHER PUBLICATIONS

Ericsson, Anchor change for Ethernet PDU Sessions. 3GPP TSG-SA WG2 Meeting #128, Vilnius, Lithuania 2 Jul. 6, 2018, S2-186420, 4 pages.
3GPP TS 23.502 V16.3.0 (Dec. 2019), 3rd Generation Partnership Project; Technical Specification Group Services and System Aspects; Procedures for the 5G System (5GS); Stage 2(Release 16), 558 pages.

3GPP TS 38.423 V16.0.0 (Dec. 2019), 3rd Generation Partnership Project; Technical Specification Group Radio Access Network; NG-RAN; Xn application protocol (XnAP)(Release 16), 330 pages.
3GPP TS 23.501 V16.3.0 (Dec. 2019), 3rd Generation Partnership Project; Technical Specification Group Services and System Aspects; System architecture for the 5G System (5GS); Stage 2(Release 16), 417 pages.
3GPP TS 38.425 V15.6.0 (Jul. 2019), 3rd Generation Partnership Project; Technical Specification Group Radio Access Network; NG-RAN; NR user plane protocol(Release 15), 22 pages.
3GPP TS 38.331 V15.8.0 (Dec. 2019), 3rd Generation Partnership Project; Technical Specification Group Radio Access Network; NR; Radio Resource Control (RRC) protocol specification(Release 15), 532 pages.
3GPP TS 36.331 V15.8.0 (Dec. 2019), 3rd Generation Partnership Project; Technical Specification Group Radio Access Network; Evolved Universal Terrestrial Radio Access (E-UTRA); Radio Resource Control (RRC); Protocol specification (Release 15), 964 pages.
3GPP TS 38.300 V16.0.0 (Dec. 2019), 3rd Generation Partnership Project; Technical Specification Group Radio Access Network; NR; NR and NG-RAN Overall Description; Stage 2(Release 16), 101 pages.

* cited by examiner

HANDOVER METHOD AND COMMUNICATION APPARATUS

CROSS-REFERENCE TO RELATED APPLICATIONS

This application is a continuation of International Application No. PCT/CN2020/077375, filed on Mar. 1, 2020, the disclosure of which is hereby incorporated by reference in its entirety.

TECHNICAL FIELD

This application relates to the communication field, and more specifically, to a handover method and a communication apparatus.

BACKGROUND

Currently, in some communication systems, for example, in a 5th generation (5G) mobile communication system, a network device may transmit data to a terminal device in a transmission manner in which unicast and broadcast are converged (or referred to as "pseudo broadcast"). A core network device may transmit multicast data of a multicast group to an access network device through a unicast transmission path of the terminal device, and the access network device may transmit the multicast data to a plurality of terminal devices in the multicast group in a multicast manner.

However, due to high mobility of the terminal device, the terminal device may perform a cell handover while receiving the multicast data. How to perform the cell handover when the terminal device receives the multicast data becomes an urgent technical problem to be resolved.

SUMMARY

This application provides a handover method and a communication apparatus, to hand over a terminal device from a source access network device to a target access network device during a time when the terminal device receives multicast data.

According to a first aspect, a handover method is provided. The method may be performed by, for example, a target access network device, or may be performed by a component (for example, a circuit, a chip, or a chip system) disposed in the target access network device. This is not limited in this application.

Specifically, the method includes: obtaining a first message, where the first message is used for requesting to establish a resource for handing over a terminal device to the target access network device; obtaining information used for transmitting multicast data; sending a second message, where the second message indicates the established resource on the target access network device; receiving a first packet from a user plane network element (user plane function, UPF), where the first packet corresponds to the information used for transmitting the multicast data; and sending the first packet to the terminal device.

For example, the information used for transmitting the multicast data may include one or more of the following items: a data identifier of the multicast data, an identifier of a multicast group corresponding to the multicast data, an identifier of a multicast session corresponding to the multicast data, an identifier of a protocol data unit (PDU) session used for transmitting the multicast data, an identifier of a tunnel used for transmitting the multicast data, an identifier of a quality of service flow (QoS Flow) used for transmitting the multicast data, and identification information of the multicast data. The identification information of the multicast data includes one or more of the following items: a source internet protocol (IP) address, a source port number, a destination IP address, or a destination port number of the multicast data.

According to the foregoing solution, the terminal device can be handed over from a source access network device to the target access network device when the terminal device receives the multicast data. When requesting the target access network device to establish the resource, the source access network device may send, to the target access network device, the information used for transmitting the multicast data, so that the target access network device sends data corresponding to the information to the terminal device based on the information. Therefore, the terminal device can be handed over when the terminal device receives the multicast data, without affecting receiving of the multicast data.

Optionally, the obtaining a first message includes: obtaining the first message from the source access network device.

Optionally, the obtaining information used for transmitting multicast data includes: obtaining, from the source access network device, the information used for transmitting the multicast data.

Optionally, the sending a second message includes: sending the second message to the source access network device.

Further, the method further includes: receiving a second packet from the source access network device, where the second packet corresponds to the information used for transmitting the multicast data, and the second packet includes a first sequence number corresponding to the second packet.

To avoid a packet loss of the multicast data, the target access network device may receive a packet of the multicast data, namely, the second packet, from the source access network device.

With reference to the first aspect, in some implementations of the first aspect, the target access network device may determine, based on the comparison of the value of a sequence number of the first packet and a sequence number of a first end marker packet from the source access network device, whether to forward the second packet to the terminal device.

Optionally, the method further includes: receiving the first end marker packet from the source access network device, where the first end marker packet includes a second sequence number corresponding to the first end marker packet.

After receiving the first end marker packet, the target access network device starts to consider forwarding, to the terminal device, the first packet received from the UPF.

Optionally, if the first sequence number is less than the second sequence number, the second packet is sent to the terminal device.

Optionally, the sending the first packet to the terminal device includes: if the first sequence number is greater than or equal to the second sequence number, sending the first packet to the terminal device.

The target access network device may determine, based on the comparison of the value of the first sequence number and the second sequence number, whether to forward the first packet or the second packet to the terminal device. In this way, a packet loss of the multicast data can be avoided. This helps obtain complete data and ensures data transmission performance.

With reference to the first aspect, in some implementations of the first aspect, the target access network device may determine, based on the comparison of the value of the sequence number of the first packet and a sequence number of the second packet, whether to forward the second packet to the terminal device. In this implementation, the UPF may send the second packet to the terminal device, for example, in an IP multicast manner or through a multicast transmission tunnel.

Optionally, the first packet includes a third sequence number corresponding to the first packet. The sending the first packet to the terminal device includes: if the third sequence number is less than or equal to the first sequence number, sending the first packet to the terminal device.

Optionally, if the third sequence number is greater than the first sequence number, the second packet is sent to the terminal device.

The target access network device may determine, based on the comparison of the value of the first sequence number and the third sequence number, whether to forward the first packet or the second packet to the terminal device. In this way, a packet loss of the multicast data can be avoided. This helps obtain complete data and ensures data transmission performance.

With reference to the first aspect, in some implementations of the first aspect, the method further includes: sending access network tunnel information to the source access network device, where the access network tunnel information indicates an identifier of a forwarding tunnel for forwarding the multicast data.

In a possible design, the access network tunnel information may be carried in the second message. In this case, when sending the second message, the target access network device also sends the access network tunnel information. In other words, the step of sending the access network tunnel information and the step of sending the second message may be combined into one sending step.

It should be understood that the access network tunnel information may alternatively be carried in other signaling. This is not limited in this application.

The access network tunnel information is sent to the source access network device, so that the source access network device and the target access network device establish a forwarding tunnel between the source access network device and the target access network device, and the source access network device can forward a packet to the target access network device. Therefore, when a core network has not completed path switch, the source access network device may forward the multicast data to the target access network device through the forwarding tunnel, and then the target access network device sends the multicast data to the terminal device. Therefore, a packet loss of the multicast data can be avoided.

Herein, the forwarding tunnel between the source access network device and the target access network device may be a tunnel that includes or does not include a core network element (for example, an access and mobility management network element (access and mobility management function, AMF)). For example, in an Xn-based handover scenario, the forwarding tunnel may not include the core network element; and in an N2-based handover scenario, the forwarding tunnel may include the core network element. This is not limited in this application.

According to a second aspect, a handover method is provided. The method may be performed by, for example, a source access network device, or may be performed by a component (for example, a circuit, a chip, or a chip system) disposed in the source access network device. This is not limited in this application.

Specifically, the method includes: sending a first message, where the first message is used for requesting to establish a resource for handing over a terminal device to a target access network device; sending, to the target access network device, information used for transmitting multicast data; receiving a second message, where the second message indicates the established resource on the target access network device; and sending a second packet to the terminal device, where the second packet corresponds to the information used for transmitting the multicast data.

For example, the information used for transmitting the multicast data may include one or more of the following items: a data identifier of the multicast data, an identifier of a multicast group corresponding to the multicast data, an identifier of a multicast session corresponding to the multicast data, an identifier of a PDU session used for transmitting the multicast data, an identifier of a tunnel used for transmitting the multicast data, an identifier of a quality of service flow used for transmitting the multicast data, and identification information of the multicast data. The identification information of the multicast data includes one or more of the following items: a source IP address, a source port number, a destination IP address, or a destination port number of the multicast data.

According to the foregoing solution, the terminal device can be handed over from the source access network device to the target access network device when the terminal device receives the multicast data. When requesting the target access network device to establish the resource, the source access network device may send, to the target access network device, the information used for transmitting the multicast data, so that the target access network device sends data corresponding to the information to the terminal device based on the information. Therefore, the terminal device can be handed over when the terminal device receives the multicast data, without affecting receiving of the multicast data.

Optionally, the sending a first message includes: sending the first message to the target access network device.

Optionally, the sending information used for transmitting multicast data includes: sending, to the target access network device, the information used for transmitting the multicast data.

Optionally, the receiving a second message includes: receiving the second message from the target access network device.

With reference to the second aspect, in some implementations of the second aspect, the method further includes: receiving a second end marker packet from a UPF, where the second end marker packet includes a second sequence number corresponding to the second end marker packet, and the second end marker packet is transmitted on a tunnel that is of the terminal device and that is used for transmitting the multicast data; and sending a first end marker packet to the target access network device based on the received second end marker packet.

The second end marker packet sent by the UPF to the source access network device may be understood as an end marker packet sent for the multicast data. The source access network device may send the first end marker packet to the target access network device based on the second end marker packet. In this way, the target access network device may start to consider forwarding, to the terminal device, a first packet received from the UPF.

It should be understood that the first end marker packet and the second end marker packet may be a same packet, or may be different packets. This is not limited in this application.

The source access network device may determine, based on a sequence number of the second end marker packet and a sequence number of the second packet received from the UPF, whether to forward the second packet to the target access network device.

Optionally, the method further includes: if a first sequence number is less than the second sequence number, sending the second packet to the target access network device.

If the first sequence number is less than the second sequence number, it indicates that before the second end marker packet, there is still a packet that is of the multicast data and that does not arrive. If forwarding of the second packet to the target access network device is directly stopped, a packet loss of the multicast data may be caused. Therefore, the source access network device may send the second packet to the target access network device when the first sequence number is less than the second sequence number. In this way, the packet loss of the multicast data can be avoided.

The second end marker packet may be transmitted through a transmission tunnel that is of the terminal device and that is used for transmitting the multicast data. The source access network device may determine, based on a pre-obtained mapping relationship between multicast data and a transmission tunnel and the transmission tunnel for transmitting the second end marker packet, specific multicast data for which the second end marker packet is transmitted.

With reference to the second aspect, in some implementations of the second aspect, the method further includes: receiving a second end marker packet from a UPF, where the second end marker packet carries identifier information of a transmission tunnel of the multicast data, and the second end marker packet is transmitted on the transmission tunnel of the multicast data; and sending a first end marker packet to the target access network device based on the received second end marker packet.

The second end marker packet carries the identifier information of the transmission tunnel of the multicast data, so that the source access network device may determine, based on a pre-obtained mapping relationship between multicast data and a transmission tunnel and the transmission tunnel for transmitting the second end marker packet, specific multicast data for which the second end marker packet is transmitted.

According to a third aspect, a communication method is provided. The method may be performed by, for example, a session management network element (session management function, SMF), or may be performed by a component (for example, a circuit, a chip, or a chip system) disposed in the SMF. This is not limited in this application.

Specifically, the method includes: receiving a third message, where the third message indicates information used for transmitting multicast data, the third message is used for requesting to configure data transmission on a transmission tunnel of a terminal device, the transmission tunnel is used for transmitting data requested by the terminal device, and the data requested by the terminal device corresponds to the information used for transmitting the multicast data; and sending a fourth message, where the fourth message indicates a forwarding action on the data requested by the terminal device.

For example, the information used for transmitting the multicast data may include one or more of the following items: a data identifier of the multicast data, an identifier of a multicast group corresponding to the multicast data, an identifier of a multicast session corresponding to the multicast data, an identifier of a PDU session used for transmitting the multicast data, an identifier of a tunnel used for transmitting the multicast data, an identifier of a quality of service flow used for transmitting the multicast data, and identification information of the multicast data. The identification information of the multicast data includes one or more of the following items: a source IP address, a source port number, a destination IP address, or a destination port number of the multicast data.

According to the foregoing solution, because the data requested by the terminal device corresponds to the information used for transmitting the multicast data, the SMF may determine the forwarding action on the data. For example, the data requested by the terminal device is filtered or not filtered. If the terminal device needs to be handed over between access network devices when the terminal device receives the multicast data, the forwarding action on the data may be determined, to ensure that no packet loss occurs on the data requested by the terminal device. Optionally, the receiving a third message includes: receiving the third message from an access and mobility management network element (access and mobility management function, AMF). For example, the third message may be an N11 message.

Optionally, the sending a fourth message includes: sending the fourth message to a UPF. For example, the fourth message may be an N4 message.

With reference to the third aspect, in some implementations of the third aspect, the fourth message includes any one or more of the following items: an indication of the forwarding action on the data requested by the terminal device, the information used for transmitting the multicast data, an identification rule, a forwarding action rule, and related information of an end marker packet.

After determining the forwarding action on the data requested by the terminal device, the SMF may indicate the forwarding action to the UPF by using the fourth message; or the SMF may send information such as the information used for transmitting the multicast data, the identification rule, and the forwarding action rule to the UPF, and the UPF determines the forwarding action on the data requested by the terminal device.

For example, the related information of the end marker packet included in the fourth message may be an end marker packet generated by the SMF and sent to the UPF, or may be information indicating the UPF to generate an end marker packet. This is not limited in this application.

According to a fourth aspect, a communication method is provided. The method may be performed by, for example, a UPF, or may be performed by a component (for example, a circuit, a chip, or a chip system) disposed in the UPF. This is not limited in this application.

Specifically, the method includes: receiving a fourth message, where the fourth message includes information used for transmitting multicast data, and the information used for transmitting the multicast data corresponds to data requested by a terminal device; and determining, based on the information used for transmitting the multicast data, a forwarding action on the data requested by the terminal device.

For example, the information used for transmitting the multicast data may include one or more of the following items: a data identifier of the multicast data, an identifier of a multicast group corresponding to the multicast data, an identifier of a multicast session corresponding to the multicast data, an identifier of a PDU session used for transmitting the multicast data, an identifier of a tunnel used for transmitting the multicast data, an identifier of a quality of service flow used for transmitting the multicast data, and identification information of the multicast data. The identification information of the multicast data includes one or more of the following items: a source IP address, a source port number, a destination IP address, or a destination port number of the multicast data.

According to the foregoing solution, because the data requested by the terminal device corresponds to the information used for transmitting the multicast data, the UPF may determine, based on the information used for transmitting the multicast data, the forwarding action on the data requested by the terminal device. For example, the data is filtered or not filtered. If the terminal device needs to be handed over between access network devices when the terminal device receives the multicast data, the forwarding action on the data may be determined, to ensure that no packet loss occurs on the data requested by the terminal device. Optionally, the receiving a fourth message includes: receiving the fourth message from an SMF. The fourth message may be an N11 message.

With reference to the fourth aspect, in some implementations of the fourth aspect, the fourth message includes any one or more of the following items: an identification rule, a forwarding action rule, and related information of an end marker packet.

For related descriptions of the identification rule, the forwarding action rule, and the related information of the end marker packet, refer to related descriptions in the third aspect. For brevity, details are not described herein again.

With reference to the third aspect or the fourth aspect, in some implementations, the forwarding action includes: transmitting, on a transmission tunnel of the terminal device, the data requested by the terminal device.

When the terminal device receives the multicast data, the data requested by the terminal device may be combined or filtered on a UPF side or a RAN side. The SMF or the UPF may determine the forwarding action on the data when the terminal device is handed over, so that the requested data is not filtered after the terminal device is handed over to a target access network device. In other words, after being handed over to the target access network device, the terminal device may receive, through the transmission tunnel of the terminal device, the data requested by the terminal device.

After determining the forwarding action on the data requested by the terminal device, the UPF may transmit, on the transmission tunnel of the terminal device, the data requested by the terminal device.

With reference to the third aspect or the fourth aspect, in some implementations, the fourth message further indicates to transmit a second end marker packet on the transmission tunnel of the terminal device.

With reference to the third aspect or the fourth aspect, in some implementations, the fourth message further indicates to transmit the second end marker packet on a transmission tunnel of the multicast data.

The foregoing provides two transmission tunnels for transmitting the second end marker packet. To be specific, in the former implementation, the second end marker packet and the data requested by the terminal device are transmitted on a same transmission tunnel. In the latter implementation, the second end marker packet is transmitted on the transmission tunnel of the multicast data, that is, the second end marker packet and the data requested by the terminal device are not transmitted on a same transmission tunnel.

Optionally, the fourth message further includes identifier information of the transmission tunnel of the terminal device.

The fourth message carries the identifier information of the transmission tunnel of the terminal device, so that a source access network device can determine specific data of a specific terminal device for which the second end marker packet is sent, or specific multicast data for which the second end marker packet is sent, and then may send a first end marker packet to the target access network device through a corresponding forwarding tunnel.

With reference to the third aspect or the fourth aspect, in some implementations, before the terminal device is handed over from the source access network device to the target access network device, the transmission tunnel of the terminal device is a tunnel between the user plane network element and the source access network device; and after the terminal device is handed over from the source access network device to the target access network device, the transmission tunnel of the terminal device is a tunnel between the user plane network element and the target access network device.

It should be understood that the methods provided in the third aspect and the fourth aspect are not limited to use during handover of the terminal device. The SMF may determine, by using the foregoing methods, different forwarding actions on the data requested by the terminal device. An application scope of the methods is not limited in this application.

According to a fifth aspect, a communication apparatus is provided, including modules or units configured to perform the method in any possible implementation of the first aspect to the fourth aspect.

According to a sixth aspect, a communication apparatus is provided, including a processor. The processor is coupled to a memory, and may be configured to execute instructions or data in the memory, to implement the method in any possible implementation of the first aspect to the fourth aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip disposed in a terminal device. When the communication apparatus is the chip disposed in the terminal device, the communication interface may be an input/output interface.

Optionally, the transceiver may be a transceiver circuit. Optionally, the input/output interface may be an input/output circuit.

According to a seventh aspect, a processor is provided, including an input circuit, an output circuit, and a processing circuit. The processing circuit is configured to: receive a signal through the input circuit, and transmit a signal through the output circuit, so that the processor is enabled to perform the method in any possible implementation of the first aspect to the fourth aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to an eighth aspect, a processing apparatus is provided, including a processor and a memory. The processor is configured to: read instructions stored in the memory, receive a signal through a receiver, and transmit a signal through a transmitter, to perform the method in any possible implementation of the first aspect to the fourth aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in embodiments of this application.

It should be understood that, a related data exchange process such as sending of indication information may be a process of outputting the indication information from the processor, and receiving of capability information may be a process of receiving input capability information by the processor. Specifically, data output by the processor may be output to the transmitter, and input data received by the processor may be from the receiver. The transmitter and receiver may be collectively referred to as a transceiver.

The processing apparatus in the eighth aspect may be one or more chips. The processor in the processing apparatus may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a ninth aspect, a computer program product is provided. The computer program product includes a computer program (which may also be referred to as code or instructions). When the computer program is run, a computer is enabled to perform the method in any possible implementation of the first aspect to the fourth aspect.

According to a tenth aspect, a computer-readable storage medium is provided. The computer-readable storage medium stores a computer program (which may also be referred to as code or instructions). When the computer program is run on a computer, the computer is enabled to perform the method in any possible implementation of the first aspect to the fourth aspect.

According to an eleventh aspect, a communication system is provided, including one or more of the foregoing source access network device, target access network device, SMF, UPF, and terminal device.

DESCRIPTION OF EMBODIMENTS

The following describes technical solutions of this application with reference to the accompanying drawings.

Technical solutions provided in this application may be applied to various communication systems, for example, a 5th generation (5G) mobile communication system or a new radio access technology (NR access technology). The 5G mobile communication system may include a non-standalone (NSA) communication system and/or a standalone (SA) communication system.

The technical solutions provided in this application may also be applied to a machine type communication (MTC) network, a long term evolution-machine type communication technology (Long Term Evolution-machine, LTE-M), a device-to-device (D2D) network, a machine to machine (M2M) network, an internet of things (IoT) network, or another network. The IoT network may include, for example, an internet of vehicles. Communication modes in an internet of vehicles system are collectively referred to as vehicle to another device (vehicle to X, V2X, where X may represent anything). For example, the V2X may include vehicle to vehicle (V2V) communication, vehicle to infrastructure (V2I) communication, vehicle to pedestrian (V2P) communication, vehicle to network (V2N) communication, or the like.

The technical solutions provided in this application may also be applied to a future communication system, for example, a sixth generation mobile communication system. This is not limited in this application.

Figure 1:
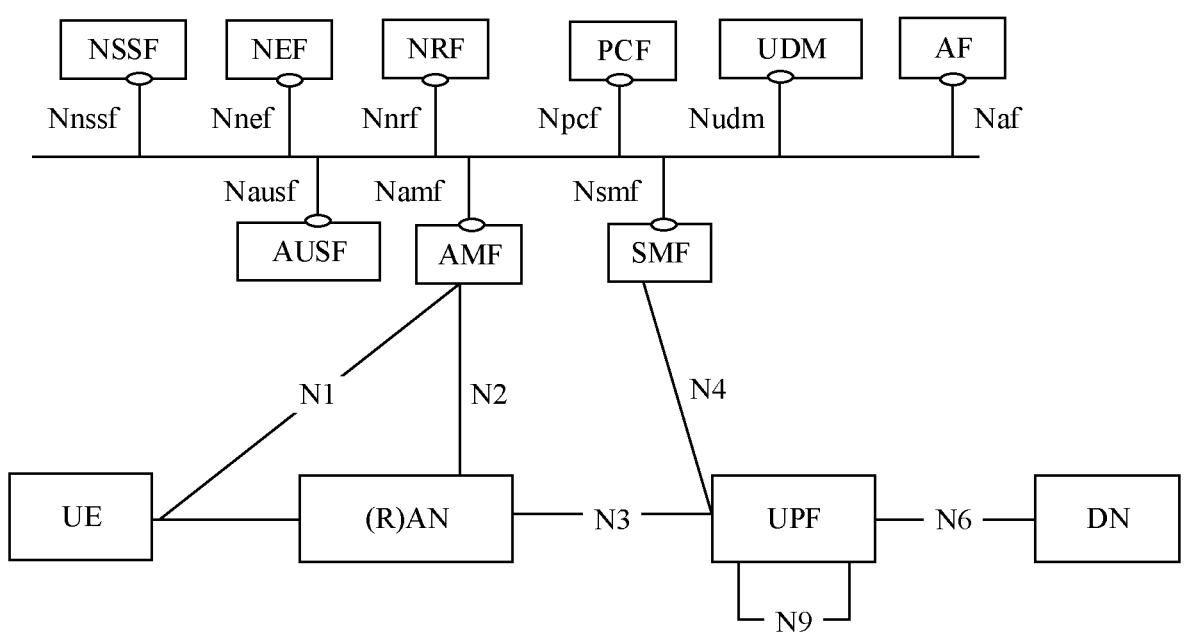
FIG. 1 is a schematic diagram of a network structure applicable to a handover method according to an embodiment of this application.

FIG. 1 is a schematic diagram of a network architecture applicable to a method according to an embodiment of this application. As shown in FIG. 1, the network architecture is, for example, a 5G system (5GS) defined in the 3rd Generation Partnership Project (3GPP) protocol TS23.501. The network architecture may be divided into two parts: an access network (AN) and a core network (CN). The access network may be configured to implement a radio access-related function. The core network mainly includes the following several key logical network elements: an access and mobility management network element (AMF), a session management network element (SMF), a user plane network element (UPF), a policy control network element (PCF), a unified data management (UDM) network element, and the like.

The following briefly describes network elements shown in FIG. 1.

1. User equipment (UE) may be referred to as a terminal device, an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice/ data connectivity for a user, for example, a handheld device or a vehicle-mounted device that has a wireless connection function. Currently, some examples of the terminal may be: a mobile phone, a tablet computer (pad), a computer with a wireless sending/receiving function (for example, a notebook computer or a palmtop computer), a mobile internet device (MID), a virtual reality (VR) device, an augmented reality (AR) device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device or computing device with a wireless communication function, another processing device connected to a wireless modem, a vehicle-mounted device, a wearable device, a terminal device in a 5G network, a terminal device in a future evolved public land mobile network (PLMN), and the like.

In addition, the terminal device may alternatively be a terminal device in an internet of things (IoT) system. The IoT is an important part of future information technology development. A main technical feature of the IoT is to connect things to a network by using a communication technology, to implement an intelligent network for human- machine interconnection and thing-thing interconnection. The IoT technology can implement massive connections, deep coverage, and power saving for terminals by using, for example, a narrow band NB technology.

In addition, the terminal device may alternatively include sensors such as an intelligent printer, a train detector, and a gas station, and main functions of the terminal device include: collecting data (which is a function of a part of terminal devices), receiving control information and downlink data of a network device, sending an electromagnetic wave, and transmitting uplink data to the network device.

2. The access network (AN) may provide a network access function for an authorized user in a specific area, and can use transmission tunnels of different quality based on user levels, service requirements, and the like. Different access networks may use different access technologies. Currently, there are two types of radio access technologies: a 3GPP access technology (for example, a radio access technology used in a 3G, 4G, or 5G system) and a non-3GPP access technology. The 3GPP access technology is an access technology that complies with a 3GPP standard specification. For example, an access network device in the 5G system is referred to as a next generation node base station (next generation Node Base station, gNB). The non-3GPP access technology is an access technology that does not comply with a 3GPP standard specification, for example, an air interface technology represented by an access point (AP) in wireless fidelity (Wi-Fi).

An access network that implements a network access function based on a wireless communication technology may be referred to as a radio access network (RAN). The radio access network can manage radio resources, provide an access service for the terminal device, and further complete forwarding of a control signal and user data between the terminal device and a core network.

For example, the radio access network may include but is not limited to: a radio network controller (RNC), a NodeB (NB), a base station controller (BSC), a base transceiver station (BTS), a home base station (for example, a home evolved NodeB, or a home NodeB, HNB), a baseband unit (BBU), an AP in a Wi-Fi system, a radio relay node, a radio backhaul node, a transmission point (TP), or a transmission and reception point (TRP). Alternatively, the radio access network may include a gNB or a transmission point (TRP or TP) in a 5G (for example, NR) system, or one antenna panel or a group of antenna panels (including a plurality of antenna panels) of a base station in the 5G system. Alternatively, the radio access network may include a network node constituting a gNB or a transmission point, for example, a baseband unit (BBU), a distributed unit (DU), or a base station in a next-generation 6G communication system. A specific technology and a specific device form that are used by a radio access network device are not limited in embodiments of this application.

The access network may provide a service for a cell. The terminal device may communicate with the cell by using a transmission resource (for example, a frequency domain resource or a spectrum resource) allocated by the access network device.

3. The access and mobility management network element (AMF) is mainly used for mobility management, access management, and the like, for example, user location update, registration with a network by a user, and a user handover. The AMF may be further configured to implement a function other than session management in a mobility management entity (MME), for example, a lawful interception function or an access authorization (or authentication) function.

4. The session management network element (SMF) is mainly used for session management, internet protocol (IP) address assignment and management for the UE, manageable user plane function selection, policy control or charging function interface termination, downlink data notification, and the like. In embodiments of this application, the SMF is mainly responsible for session management in a mobile network, for example, session establishment, modification, and release. Specific functions may include, for example, assigning an IP address to the terminal device, and selecting a UPF that provides a packet forwarding function.

5. The user plane network element (UPF) is a data plane gateway, and may be configured to: route and forward a packet, process quality of service (QoS) of user plane data, or the like. User data may be transmitted to a data network (DN) by using this network element. In embodiments of this application, the UPF may be configured to implement functions of a user plane gateway.

6. The data network (DN) is an operator network for providing a data service for a user, for example, a network of an operator service, the internet, a third-party service network, or an IP multi-media service network.

7. An authentication service network element (authentication server function, AUSF) is mainly used for user authentication and the like.

8. A network exposure network element (network exposure function, NEF) is configured to securely open, to the outside, a service, a capability, and the like that are provided by a 3GPP network function.

9. A network repository network element (network function (NF) repository function, NRF) is configured to store description information of a network function entity and a service provided by the network function entity, and support service discovery, network element entity discovery, and the like.

10. The policy control function (PCF) network element is configured to guide a unified policy framework of network behavior, provide policy rule information for a control plane function network element (for example, the AMF or SMF network element), and the like.

11. The unified data management (UDM) network element is configured to store user data, for example, subscription information and authentication/authorization information.

12. An application function (AF) network element is responsible for providing a service for a 3GPP network, for example, affecting service routing and interacting with the PCF to perform policy control.

In the network architecture shown in FIG. 1, network elements may communicate with each other through interfaces shown in the figure. As shown in the figure, an N1 interface is a reference point between the terminal device and the AMF; an N2 interface is a reference point between the RAN and the AMF, and is configured to send a non-access stratum (NAS) message and the like; an N3 interface is a reference point between the RAN and the UPF, and is configured to transmit user plane data and the like; an N4 interface is a reference point between the SMF and the UPF, and is configured to transmit information such as tunnel identifier information of an N3 connection, data buffer indication information, and a downlink data notification message; and an N6 interface is a reference point between the UPF and the DN, and is configured to transmit user plane data and the like. Relationships between other interfaces and network elements are as shown in FIG. 1. For brevity, details are not described herein.

It should be understood that the foregoing network architecture applied to embodiments of this application is merely an example of a network architecture described from the perspective of a conventional point-to-point architecture and a service architecture, and a network architecture applicable to embodiments of this application is not limited thereto. Any network architecture that can implement functions of the foregoing network elements is applicable to embodiments of this application.

It should be further understood that the AMF, the SMF, the UPF, a network slice selection function (NSSF) network element, the NEF, the AUSF, the NRF, the PCF, and the UDM shown in FIG. 1 may be understood as network elements configured to implement different functions in a core network, for example, may be combined into a network slice as required. These core network elements may be independent devices, or may be integrated into a same device to implement different functions. Specific forms of the foregoing network elements are not limited in this application.

It should be further understood that the foregoing names are defined merely for distinguishing between different functions, and should not constitute any limitation on this application. This application does not exclude a possibility of using other names in the 5G network and another future network. For example, in a 6G network, terms in 5G may still be used for a part or all of the foregoing network elements, or other names may be used. Names of interfaces between the foregoing network elements in FIG. 1 are merely examples, and the interfaces may have other names during specific implementation. This is not specifically limited in this application. In addition, names of messages (or signaling) transmitted between the foregoing network elements are merely examples, and do not constitute any limitation on functions of the messages.

To facilitate understanding of embodiments of this application, terms used in this application are first briefly described.

1. Protocol data unit (PDU) session (PDU session): A 5G core network (5G corenet, 5GC) supports a PDU connection service. The PDU connection service may be a service of exchanging a PDU packet between a terminal device and a DN. The PDU connection service is implemented by initiating PDU session establishment by the terminal device. A PDU session is established, that is, a data transmission tunnel between the terminal device and the DN is established. In other words, the PDU session is at a UE level. Each terminal device may establish one or more PDU sessions.

As described above, the SMF is mainly responsible for session management in a mobile network. The PDU session may be established, modified, or released between the terminal device and the SMF by using a NAS session management (SM) signaling.

In embodiments of this application, one PDU session may be identified by using one PDU session identifier (PDU session identifier, PDU session ID). Because the PDU session is at a UE level, each PDU session identifier may also correspond to one terminal device.

2. Tunnel: Data transmission between a core network and an access network may be implemented according to a GPRS tunnel protocol (GTP). In embodiments of this application, the tunnel may be understood as a transmission tunnel at a smaller granularity in the PDU session, and may be used for transmitting a GTP packet.

3. QoS flow: The QoS flow is a finest QoS differentiation granularity in the PDU session. In a 5G system, one QoS flow identifier (QFI) may be used for identifying one QoS flow. One PDU session may include a plurality of QoS flows, but each QoS flow has a different QFI. In other words, one QFI is unique in one PDU session.

4. Convergence of unicast and multicast: The convergence of unicast and multicast may also be referred to as "pseudo broadcast". In the 5G core network (5G corenet, 5GC), a unicast transmission path of a terminal device is used for transmission, but data transmitted on the unicast transmission path may be received by a plurality of terminal devices. Because receiving, by the plurality of terminal devices, data transmitted on a same unicast transmission path is similar to receiving broadcast data, this transmission mode is referred to as "pseudo broadcast". In other words, the core network implements multicast data transmission in a unicast manner, and can support multicast over an air interface on an access network side. Therefore, the convergence of unicast and multicast may be considered as a technology for the core network to implement multicast.

The technical solutions provided in embodiments of this application mainly relate to improvement of multicast data transmission between a core network and an access network, but do not make a modification to air interface transmission between an access network device and a terminal device. Because the core network can implement multicast over an air interface in a unicast manner, data that is transmitted between the core network and the access network device and that can implement multicast over the air interface may be referred to as multicast data. Descriptions of multicast data, a multicast group, a multicast session, and the like described below are all provided for data transmitted between the core network and the access network device, and should not constitute a limitation on data transmitted over the air interface on the access network side.

However, it should be noted that the pseudo broadcast is different from conventional broadcast. A dedicated broadcast tunnel needs to be established for the conventional broadcast. The pseudo broadcast can be implemented by using only a unicast transmission path of a terminal device, or by using a common transmission path.

A PDU session used for transmitting multicast data may be referred to as a multicast session, and a plurality of terminal devices that receive same multicast data may belong to one multicast group. In other words, one piece of multicast data may correspond to one multicast group or one multicast session.

One multicast group may include one or more terminal devices. When there is a plurality of terminal devices in a same multicast group, the plurality of terminal devices may be terminal devices camping on a same cell, or may be terminal devices camping on a plurality of different cells. This is not limited in this application.

Same multicast data may be indicated by using one data identifier. A same multicast group may be indicated by using one identifier of the multicast group. A same multicast session may be indicated by using one identifier of the multicast session. In other words, there is a correspondence between a data identifier of multicast data, an identifier of a multicast group, and an identifier of a multicast session.

It should be understood that the data identifier of the multicast data, the identifier of the multicast group, and identifier of the multicast session are introduced herein merely for ease of understanding and description. In an actual transmission configuration process, the data identifier of the multicast data, the identifier of the multicast group, and the identifier of the multicast session may not all be configured. Because the data identifier of the multicast data, the identifier of the multicast group, and the identifier of the multicast session are in a one-to-one correspondence, it may be considered that the data identifier of the multicast data, the identifier of the multicast group, and the identifier of the multicast session are interchangeable or equivalent.

A prerequisite of multicast may be that for some applications (APPs), for example, APPs that send a live service, the core network may identify, based on identification information, whether data transmitted by the applications belongs to a same multicast group, or whether data is transmitted for a same multicast group.

Herein, the identification information based on which the core network performs identification may be, for example, one or more of the following items: a source IP address, a destination IP address, a source port number, and a destination port number. For example, the identification information may be: the source IP address, the source port number, or the source IP address and the source port number; the destination IP address, the destination port number, or the destination IP address and the destination port number; or the source IP address, the source port number, the destination IP address, and the destination port number.

In embodiments of this application, when the terminal device sends a request to the core network, the request may carry the identification information, or may carry one or more of the following items: identifier information of the multicast group, identifier information of the multicast data, and identifier information of the multicast session. The core network may determine, based on the identification information, whether data that the terminal device requests to transmit can be transmitted in a multicast manner.

Specifically, if the core network determines that data #1 and data #2 that terminal devices request to transmit have same identification information, the core network may determine that the terminal devices that request the data #1 and the data #2 belong to a same multicast group. For example, if the data #1 and the data #2 have a same source IP address, it may be determined that the terminal devices that request the data #1 and the data #2 belong to a same multicast group. Alternatively, if the data #1 and the data #2 have a same destination IP address, it may be determined that the terminal devices that request the data #1 and the data #2 belong to a same multicast group. Alternatively, if the data #1 and the data #2 have a same source IP address, and the data #1 and the data #2 also have a same source port number, it may be determined that the terminal devices that request the data #1 and the data #2 belong to a same multicast group. Alternatively, if the data #1 and the data #2 have a same destination IP address, and the data #1 and the data #2 also have a same destination port number, it may be determined that the terminal devices that request the data #1 and the data #2 belong to a same multicast group. Alternatively, if the data #1 and the data #2 have a same source IP address, a same source port number, a same destination IP address, and a same destination port number, it may be determined that the terminal devices that request the data #1 and the data #2 belong to a same multicast group. For brevity, examples are not listed one by one herein. If the data #1 and the data #2 have a same source IP address, and/or the data #1 and the data #2 have a same source port number, it may be considered that the data #1 and the data #2 are data from a same application server. In other words, identifier information of the application server may also be understood as a type of identification information.

It should be understood that, merely for ease of understanding, the foregoing uses the data #1 and the data #2 as examples to describe the identification information and the multicast group. However, this shall not constitute any limitation on this application. A quantity of terminal devices in the multicast group is not limited in this application. The data #1 and the data #2 may be understood as two examples of data requested by any two terminal devices in the multicast group. A specific implementation of transmitting data in the multicast manner may be as follows: The PCF may generate, based on the foregoing identification information carried in the request sent by the terminal device to the core network, a PCC rule that carries the identification information. The SMF may create a special mapping rule based on the identification information in the PCC rule, and map data corresponding to the identification information to a QoS flow. In this way, it can be ensured that same live content of one application can be mapped to a same QoS flow in one PDU session. When one live content is mapped to one QoS flow, the QoS flow carries multicast data.

In embodiments of this application, the QoS flow used for carrying the multicast data may be a QoS flow in a multicast dedicated PDU session, a QoS flow on a multicast dedicated tunnel, a multicast dedicated QoS flow, or a unicast QoS flow, and the QoS flow carries indication information indicating that the QoS flow carries the multicast data.

It should be noted that the multicast dedicated PDU session may be a PDU session specially established for the multicast data. The multicast dedicated PDU session means that the PDU session is not shared with unicast data or other multicast data. The PDU session may be established for a terminal device, or may be established for the multicast group. This is not limited in this application. The multicast dedicated PDU session may include a multicast dedicated tunnel established for the multicast data, and the QoS flow in the multicast dedicated PDU session is a QoS flow dedicated to carrying the multicast data.

The multicast dedicated tunnel may be a tunnel specially established for the multicast data. The multicast dedicated tunnel may be a tunnel in a multicast dedicated PDU session, or may be a tunnel in a non-multicast dedicated PDU session, for example, may be a tunnel established for the multicast group in a unicast PDU session. The QoS flow on the multicast dedicated tunnel is a QoS flow dedicated to carrying the multicast data.

The multicast dedicated QoS flow may be a QoS flow specially established for the multicast data. The multicast dedicated QoS flow may be a QoS flow in a multicast dedicated PDU session, or may be a QoS flow in a non-multicast dedicated PDU session, for example, may be a QoS flow established for the multicast group in a unicast PDU session. For ease of understanding, the following briefly describes specific implementation procedures of multicast with reference to FIG. 2 and FIG. 3.

Figure 2:
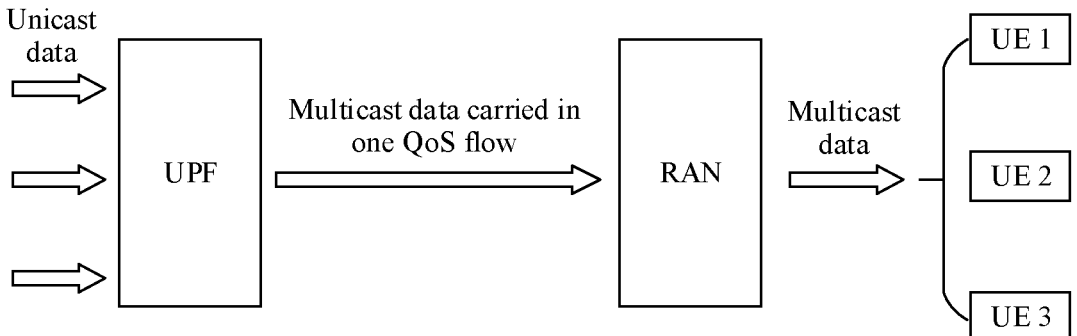
FIG. 2 and FIG. 3 show specific implementation procedures of multicast according to an embodiment of this application.

FIG. 2 is a schematic diagram of combining multicast data on a UPF side.

Step 1: In a PDU session establishment or modification process, that is, in a process in which UE requests data from an application server, an SMF may send an identification rule (packet detection rule, PDR) and a forwarding action rule (FAR) to a UPF. The identification rule may indicate the UPF to identify a specific multicast group corresponding to the data. The forwarding action rule may indicate whether the UPF forwards the data and indicate a specific transmission tunnel on which the data is to be forwarded.

It should be noted that the specific multicast group corresponding to the data may be determined based on identification information of the data.

In a possible implementation, before a PDU session is established or modified, that is, before the UE requests the data from the application server, the application server may send one or more requests for a multicast session to a core network (for example, an NEF). For ease of description, the following uses one request for a multicast session as an example. The request may carry partial identification information of one multicast session, for example, may include an IP address and/or a port number of the application server. The IP address and/or the port number of the application server that sends the request for the multicast session may be used as a source IP address and/or a source port number of the multicast session.

The NEF may return ingress information of the multicast session to the application server. For example, the NEF may configure a UPF for the multicast session, and return an IP address and/or a port number of the UPF. The IP address and/or the port number of the UPF configured for the multicast session may be used as a destination IP address and/or a destination port number of the multicast session.

Therefore, the NEF may obtain a correspondence between the source IP address and/or the source port number of the multicast session and the destination IP address and/or the destination port number of the multicast session. The NEF may send the correspondence to the SMF, for example, in the process in which the UE requests the data; or send the correspondence to the SMF after obtaining the correspondence, regardless of whether the UE requests the data. Alternatively, the NEF may send the correspondence to another network element used for storage, for example, a UDM or a unified data repository (UDR).

In the PDU session establishment or modification process, the SMF may further determine, based on the request of the UE, a correspondence between multicast data requested by the UE and the identification information. Optionally, the SMF may send the correspondence as the identification rule to the UPF. The following table shows an example of the correspondence between the multicast data and the identification information. It should be understood that the following table shows merely an example for ease of understanding, and should not constitute any limitation on this application. The foregoing correspondence does not necessarily exist in a form of a table.

| Sequence number | Identifier information of multicast data | Identification information |
|---|---|---|
| 1 | Identifier 1 | Source IP address 1, source port number 1, destination IP address 1, and destination port number 1 |
| 2 | Identifier 2 | Source IP address 2, source port number 2, destination IP address 2, and destination port number 2 |
| . . . | . . . | . . . |

Whether to forward data and on which transmission tunnel the data is to be forwarded may be determined based on a mapping relationship between multicast data and a transmission tunnel.

In another example, the SMF may not send the identifier information of the multicast data to the UPF, but sends only the identification information to the UPF. In this case, the SMF further sends the following configuration information to the UPF.

In the PDU session establishment or modification process, the SMF may separately send the configuration information to the UPF and a RAN. For example, the SMF sends the configuration information to the UPF and the RAN at a granularity of a PDU session. The configuration information may include one or more of the following items: an indication of the mapping relationship between the multicast data and the transmission tunnel, an indication of the multicast data, or an indication of the transmission tunnel. The indication of the multicast data may be, for example, one or more of the following items: a data identifier of the multicast data, an identifier of the multicast group, or an identifier of the multicast session. The indication of the transmission tunnel may be, for example, one or more of the following items: a multicast dedicated PDU session identifier, a multicast dedicated tunnel identifier, or a QoS flow identifier (namely, a QFI). This is not limited in this application. A relationship between the multicast data, the multicast group, and the multicast session is described above. For brevity, details are not described herein again. The SMF may predetermine a correspondence between the multicast data and the multicast group and/or the multicast session.

In an example, the SMF sends a correspondence between the identification information and the configuration information to the UPF. The following table shows the correspondence that is between the identification information and the configuration information and that is sent by the SMF to the UPF. It should be understood that the following table shows merely an example for ease of understanding, and should not constitute any limitation on this application. The foregoing correspondence does not necessarily exist in a form of a table.

| Sequence number | Configuration information | Identification information |
|---|---|---|
| 1 | Configuration information 1 | Source IP address 1, source port number 1, destination IP address 1, and destination port number 1 |
| 2 | Configuration information 2 | Source IP address 2, source port number 2, destination IP address 2, and destination port number 2 |
| . . . | . . . | . . . |

Several examples of the configuration information are shown below.

In an example, when the QoS flow used for carrying the multicast data is the QoS flow in the multicast dedicated PDU session, the mapping relationship between the multicast data and the transmission tunnel may be a mapping relationship between the indication of the multicast data and the multicast dedicated PDU session identifier. In another example, when the QoS flow used for carrying the multicast data is the QoS flow in the multicast dedicated tunnel, the mapping relationship between the multicast data and the transmission tunnel may be a mapping relationship between the indication of the multicast data and the multicast dedicated tunnel identifier. In still another example, the mapping relationship between the multicast data and the transmission tunnel may be a mapping relationship between the indication of the multicast data and the QFI.

It should be understood that the foregoing plurality of examples are shown merely for ease of understanding, and should not constitute any limitation on this application.

If configuration information sent by the SMF to the UPF and the RAN for requests of a plurality of terminal devices includes a same indication of multicast data, the UPF and the RAN may determine that the plurality of terminal devices belong to a same multicast group.

The RAN may send an RRC message to each terminal device in the same multicast group, where the RRC message carries a group radio network temporary identifier (G-RNTI), so that the terminal device in the multicast group receives data based on the G-RNTI.

It should be understood that a specific process in which the terminal device receives the data based on the G-RNTI is similar to a specific process in which the terminal device receives the data based on a C-RNTI. The specific process in which the terminal device receives the data based on the C-RNTI belongs to the conventional technology. Therefore, for brevity, details are not described herein.

In this embodiment of this application, the configuration information may be defined based on the RAN. For example, the SMF may determine configuration information based on each RAN. Data that corresponds to a multicast group included in each piece of configuration information may be data transmitted through the RAN, or may correspond to data transmitted in a cell served by the RAN. A same data identifier in a same RAN may correspond to one or more QoS flows. However, it should be understood that if a data identifier corresponds to a plurality of QoS flows, it does not mean that data corresponding to the data identifier is mapped to the plurality of QoS flows for transmission. Instead, the plurality of QoS flows corresponding to the data identifier may be used for transmitting data with same content. However, as described below, data in a part or all of the plurality of QoS flows may be filtered out.

Step 2: The UPF sends data to the RAN.

The application server may send data to the UPF based on requests of a plurality of terminal devices. If data requested by the plurality of terminal devices is data with same content, the application server may separately send unicast data to each terminal device, as shown in FIG. 2. Alternatively, the application server may send data to the UPF based on requests of the plurality of terminal devices, and the UPF makes a plurality of copies of the data, to obtain a plurality of pieces of unicast data for the plurality of terminal devices.

It should be understood that FIG. 2 shows merely a possible implementation, and should not constitute any limitation on this application. For example, in another implementation, the application server may alternatively send only one piece of data to the UPF. This is not limited in this application.

When sending data to the RAN, the UPF may combine, based on the mapping relationship sent by the SMF, data corresponding to a same multicast group in each PDU session for sending. Specifically, the UPF may transmit, by using a QoS flow in a PDU session of a terminal device, data identified by the data identifier, or a network may separately establish a dedicated QoS flow to transmit data.

As described above, the UPF may receive one piece of data from the application server, or may receive a plurality of pieces of data from the application server, where the plurality of pieces of data are data corresponding to a same data identifier. When the UPF receives a plurality of pieces of data, if the UPF transmits data by using a QoS flow in a PDU session of a terminal device, the UPF may filter out or discard data in another (second) QoS flow corresponding to the data identifier. In other words, the second QoS flow corresponding to the data identifier may not be used for transmitting data. If the UPF transmits data by using a separately established dedicated QoS flow, the UPF may filter out or discard data transmitted in a QoS flow that is of each terminal device and that correspond to the data identifier. In other words, another QoS flow corresponding to the data identifier may not be used for transmitting data. For example, it is assumed that the mapping relationship includes a data identifier 1 and a QoS flow corresponding to the data identifier 1. For example, the data identifier 1 corresponds to a QoS flow 1 of UE 1, a QoS flow 2 of UE 2, a QoS flow 3 of UE 3, and a QoS flow 4 of UE 4. This indicates that data transmitted in the QoS flow 1 of the UE 1, the QoS flow 2 of the UE 2, the QoS flow 3 of the UE 3, and the QoS flow 4 of the UE 4 has same content and is all data identified by the data identifier 1. The UPF may select any one of the QoS flow 1, the QoS flow 2, the QoS flow 3, and the QoS flow 4 to transmit data, for example, select the QoS flow 1 to transmit data. If the UPF receives a plurality of pieces of data corresponding to the data identifier 1 from the application server, the plurality of pieces of data may be originally transmitted by using the QoS flow 2, the QoS flow 3, and the QoS flow 4. However, in this case, the UPF may filter out, discard, or not transmit the data in the QoS flow 2, the QoS flow 3, and the QoS flow 4. Alternatively, the network may separately establish a dedicated QoS flow to transmit data. If the UPF receives a plurality of pieces of data corresponding to the data identifier 1 from the application server, the plurality of pieces of data may be originally transmitted by using the QoS flow 1, QoS flow 2, the QoS flow 3, and the QoS flow 4. However, in this case, the UPF may filter out, discard, or not transmit the data transmitted in the QoS flow 1, QoS flow 2, the QoS flow 3, and the QoS flow 4.

It should be understood that discarding data transmitted in a QoS flow herein does not mean discarding the QoS flow. The QoS flow still exists in the PDU session of the terminal device, but data that originally needs to be transmitted by using the QoS flow is transmitted by using another QoS flow.

The UPF may further add a special identifier to a general packet radio service tunneling protocol user plane (general packet radio service tunneling protocol user, GTP-U) packet header to be sent to the RAN, to indicate that QoS flows with a same data identifier exist in the UPF and the UPF selects one of the QoS flows for sending.

Step 3: The RAN forwards, to the terminal device, the QoS flow from the UPF.

When receiving an identifier of the QoS flow and the identifier of the GTP-U header from the UPF, the RAN may send, based on a pre-determined multicast group corresponding to the QoS flow, data carried in the QoS flow to each terminal device in the multicast group. The RAN may send the data to a plurality of terminal devices by using a shared resource, or may separately send the data to a specific terminal device. This is not limited herein.

Figure 3:
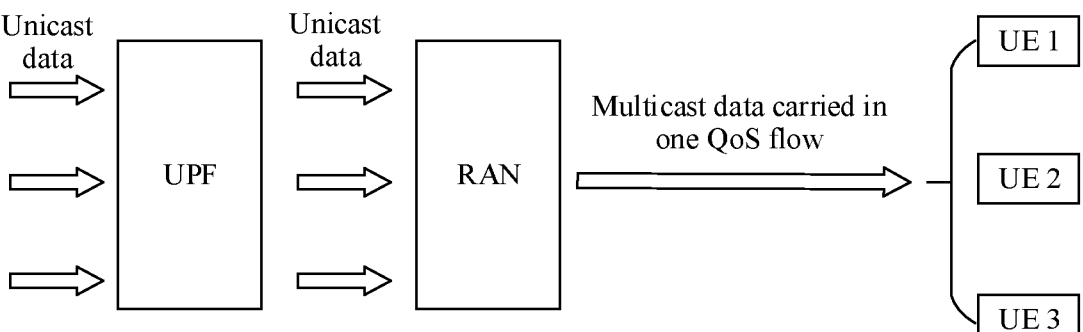

FIG. 3 is a schematic diagram of combining multicast data on a RAN side.

In step 1, an SMF may alternatively send configuration information to a RAN, but does not send the configuration information to a UPF. The RAN may determine terminal devices in a same multicast group based on the configuration information.

In step 2, the UPF may send, to the RAN in a unicast manner, data corresponding to each terminal device. In other words, same data is carried in QoS flows from the UPF to the RAN in PDU sessions of all terminal devices.

In step 3, the RAN combines data corresponding to the same multicast group, and sends combined data to each terminal device in the multicast group.

A process of combination on the RAN side is basically similar to the foregoing process of combination on the UPF side, except that the step of combining data by the UPF is performed by the RAN. For brevity, descriptions of same or similar content are omitted herein.

Due to high mobility of a terminal device, the terminal device may be frequently handed over between a plurality of cells. However, a problem of how the terminal device completes a handover when receiving multicast data still needs to be resolved.

This application provides a handover method, to provide a plurality of possible handover procedures for a terminal device in a multicast scenario, so as to resolve a problem of how the terminal device completes a handover when receiving multicast data.

The following describes in detail the handover method provided in embodiments of this application with reference to a plurality of accompanying drawings.

It should be understood that, merely for ease of understanding and description, interaction between devices is used as an example in the following to describe in detail the method provided in embodiments of this application. However, this shall not constitute any limitation on an execution body of the method provided in this application. For example, an access network device shown in the following embodiments may be replaced with a component (for example, a circuit, a chip, or a chip system) disposed in the access network device.

A specific structure of the execution body of the method provided in embodiments of this application is not specifically limited in the following embodiments, provided that a program that records code of the method provided in embodiments of this application can be run to implement a handover of a terminal device according to the method provided in embodiments of this application.

In addition, merely for ease of understanding, core network elements such as a UPF, an SMF, and an AMF are separately shown in the accompanying drawings, but this shall not constitute any limitation on this application. A specific form of the core network element is not limited in this application.

To better understand embodiments of this application, the following descriptions are first provided.

First, for ease of understanding and description, the following assumptions and definitions are provided.

UE 1: The UE 1 is a terminal device that receives multicast data in a source cell.

UE 2: The UE 2 is a terminal device that receives the same multicast data in the source cell, and belongs to a same multicast group as the UE 1. In embodiments of this application, the UE 2 is a terminal device to be handed over from a source access network device to a target access network device.

Multicast data: The multicast data includes data that corresponds to the multicast group and that is received by the UE 2 before a handover, that is, data that corresponds to the multicast group and that is received by the UE 2 in the source cell; and also includes data that corresponds to the multicast group and that is received by the UE 2 after the handover, that is, data that corresponds to the multicast group and that is received by the UE 2 in a target cell. It may be understood that both the data that is of the multicast group and that is received by the UE 2 before the handover and the data that is of the multicast group and that is received by the UE 2 after the handover are referred to as multicast data.

Data #1: The data #1 is data requested by the UE 2 when the UE 2 is in the source cell. The data #1 originally needs to be sent by the UPF or the source access network device to the UE 2, but is not sent to the UE 2 due to transmission of multicast data whose content is the same as that of the data #1. The data requested by the UE 2 may be multicast data, or may be unicast data. This is not limited in this application.

It should be understood that the multicast data and the data #1 are defined merely for ease of distinguishing the foregoing differences, and the multicast data and the data #1 are essentially data with same content. Herein, the same content may mean that a payload part of a packet used for carrying the multicast data is the same as that of a packet used for carrying the data #1, or may mean that a header and a payload part of a packet used for carrying the multicast data are the same as those of a packet used for carrying the data #1. This is not limited in this application.

Second, in embodiments of this application, data may be carried in a plurality of packets for transmission. For example, a packet of the multicast data may be a packet carrying the multicast data. After combining a plurality of received packets corresponding to same data, a receiving device (for example, a terminal device) may obtain data carried in a combined packet.

In embodiments of this application, because the multicast data and the data #1 are data with same content, the receiving device (for example, the terminal device) may obtain, based on the packet of the received multicast data, data carried in the packet. The data obtained in this way is the multicast data, or may be the data #1.

The following descriptions about transmission, sending, and receiving of the data #1 may be understood as descriptions about transmission, sending, and receiving of the packet of the multicast data. A person skilled in the art can understand the meaning.

Third, in this application, related descriptions of sending a message or a packet by a network element A to a network element B and receiving, by the network element B, a message or a packet from the network element A are intended to describe a specific network element to which the message or the packet is to be sent, but does not limit whether the message or the packet is to be directly sent or indirectly sent through another network element.

For example, in this specification, the source access network device sends a message or a packet to the target access network device. This does not limit that the source access network device directly sends the message or the packet to the target access network device. In an N2-based handover scenario, because communication between the source access network device and the target access network device through an Xn interface is not supported, communication between the source access network device and the target access network device may be forwarded through the AMF. However, in an Xn-based handover scenario, because communication between the source access network device and the target access network device through an Xn interface is supported, the source access network device and the target access network device can directly interact with each other without forwarding by the AMF. Although examples are not listed one by one in this specification, a person skilled in the art can understand the meaning.

Fourth, in this application, "indicating" may include "directly indicating" and "indirectly indicating". When it is described that a piece of indication information indicates A, the indication information may directly indicate A or indirectly indicate A, but it does not necessarily indicate that the indication information carries A.

The information indicated by the indication information is referred to as to-be-indicated information. In a specific implementation process, there are a plurality of manners of indicating the to-be-indicated information, for example, but not limited to, the following manners: The to-be-indicated information is directly indicated, for example, the to-be-indicated information or an index of the to-be-indicated information is indicated. The to-be-indicated information may alternatively be indirectly indicated by indicating other information, where there is an association relationship between the other information and the to-be-indicated information. Alternatively, only a part of the to-be-indicated information may be indicated, and the other part of the to-be-indicated information is known or pre-agreed on. For example, specific information may alternatively be indicated by using an arrangement sequence of a plurality of pieces of information that is pre-agreed on (for example, stipulated in a protocol), to reduce indication overheads to some extent. In addition, a common part of all pieces of information may be further identified and indicated in a unified manner, to reduce indication overheads caused by separately indicating same information.

The to-be-indicated information may be sent as a whole, or may be divided into a plurality of pieces of sub-information for separate sending. In addition, sending periodicities and/or sending occasions of the pieces of sub-information may be the same or may be different. A specific sending method is not limited in this application.

Fifth, in embodiments of this application, descriptions such as "when", "in a case", and "if" mean that a device (for example, a terminal device or a network device) performs corresponding processing in an objective situation, and are not intended to limit time, and the device (for example, the terminal device or the network device) is not required to perform a determining action during implementation, and do not mean any other limitation.

Sixth, the terms "first", "second", and various numbers in the following embodiments are merely used for differentiation for ease of description, for example, used for differentiation between different pieces of multicast data, different UEs, and different PDU sessions, but are not intended to limit the scope of the embodiments of this application.

Seventh, "at least one" refers to one or more, and "a plurality of" refers to two or more. "And/or" describes an association relationship between associated objects, and indicates that three relationships may exist. For example, A and/or B may indicate the following three cases: only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one item (piece) of a, b, and c may represent: a, b, c, a and b, a and c, b and c, or a, b, and c, where a, b, and c each may be singular or plural.

Eighth, in a plurality of accompanying drawings based on which the following embodiments are described, a source access network (source RAN, S-RAN) may correspond to a source access network device, a target access network (target RAN, T-RAN) may correspond to a target access network device, an AMF may correspond to an access and mobility management network element, a source AMF (S-AMF) may correspond to a source access and mobility management network element, an SMF may correspond to a session management network element, and a UPF may correspond to a user plane network element.

Ninth, in a plurality of embodiments shown below, it is assumed that multicast data is combined on a UPF side. However, this shall not constitute any limitation on this application. Based on a same concept, a person skilled in the art can implement a handover of a terminal device in a multicast scenario by making a corresponding variation based on a method provided in the following embodiment.

Tenth, in a plurality of embodiments and accompanying drawings shown below, an SMF network element may be a unicast session management network element, or may be a specific session management network element used for management of a multicast session (or a multicast group, multicast data, or the like). If the SMF is a specific session management network element used for management of a multicast session, there may be another (second) interaction procedure between an AMF and the SMF. Although not shown in the following description and accompanying drawings, a person skilled in the art should understand that the second interaction procedure between the AMF and the SMF does not affect implementation of embodiments of this application. It should be further understood that whether the SMF is a unicast session management network element or a specific session management network element is not limited in this application. It should be further understood that if the SMF is a unicast session management network element, the SMF may have a capability of managing a multicast session (for example, sending configuration information to a UPF and a RAN).

When the SMF is a specific session management network element, the UPF herein may be a specific user plane network element, or may be a unicast user plane network element.

Figure 10:
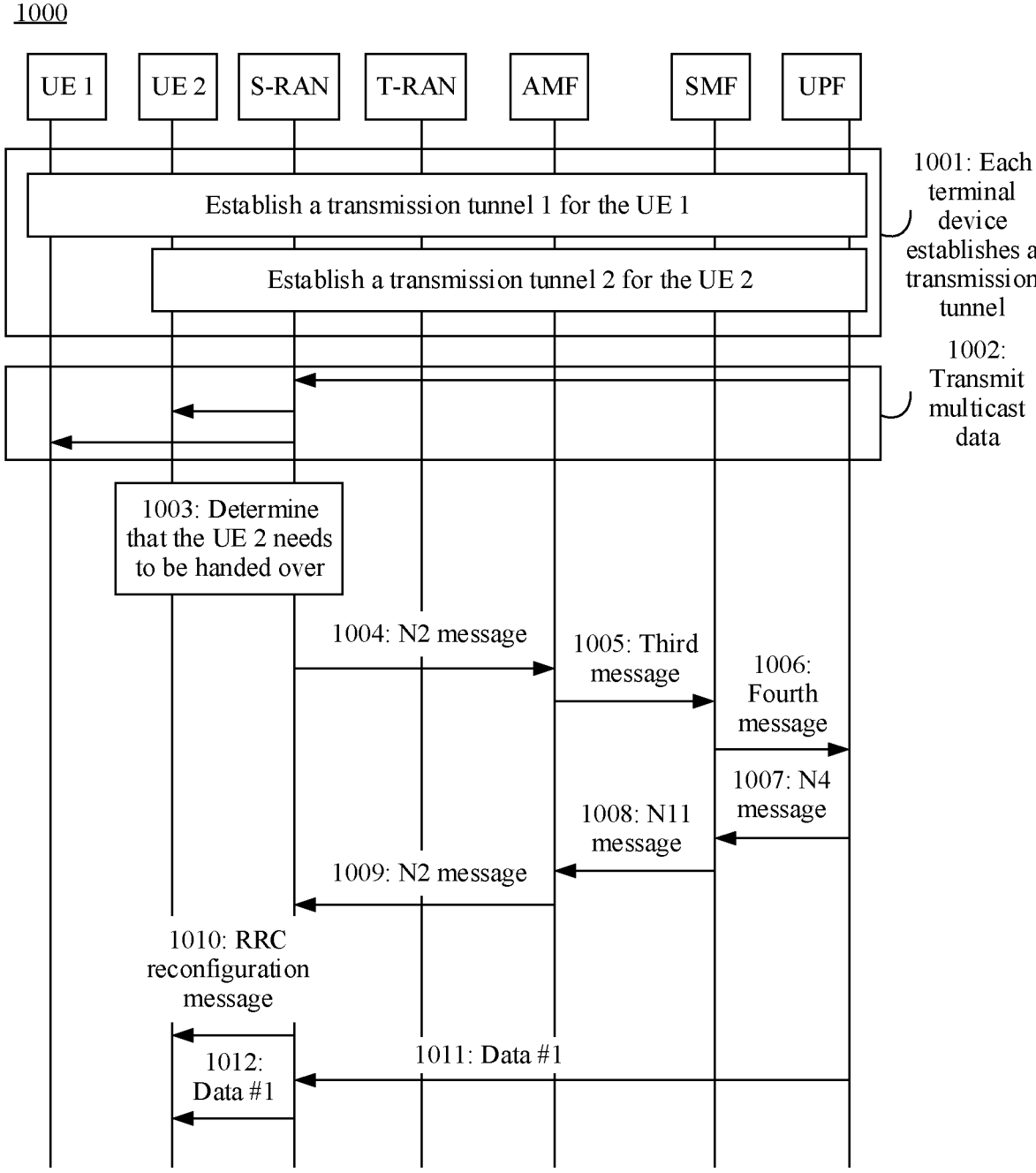
FIG. 10 is a schematic flowchart of a handover method according to yet another embodiment of this application.
Figures 11, 12:
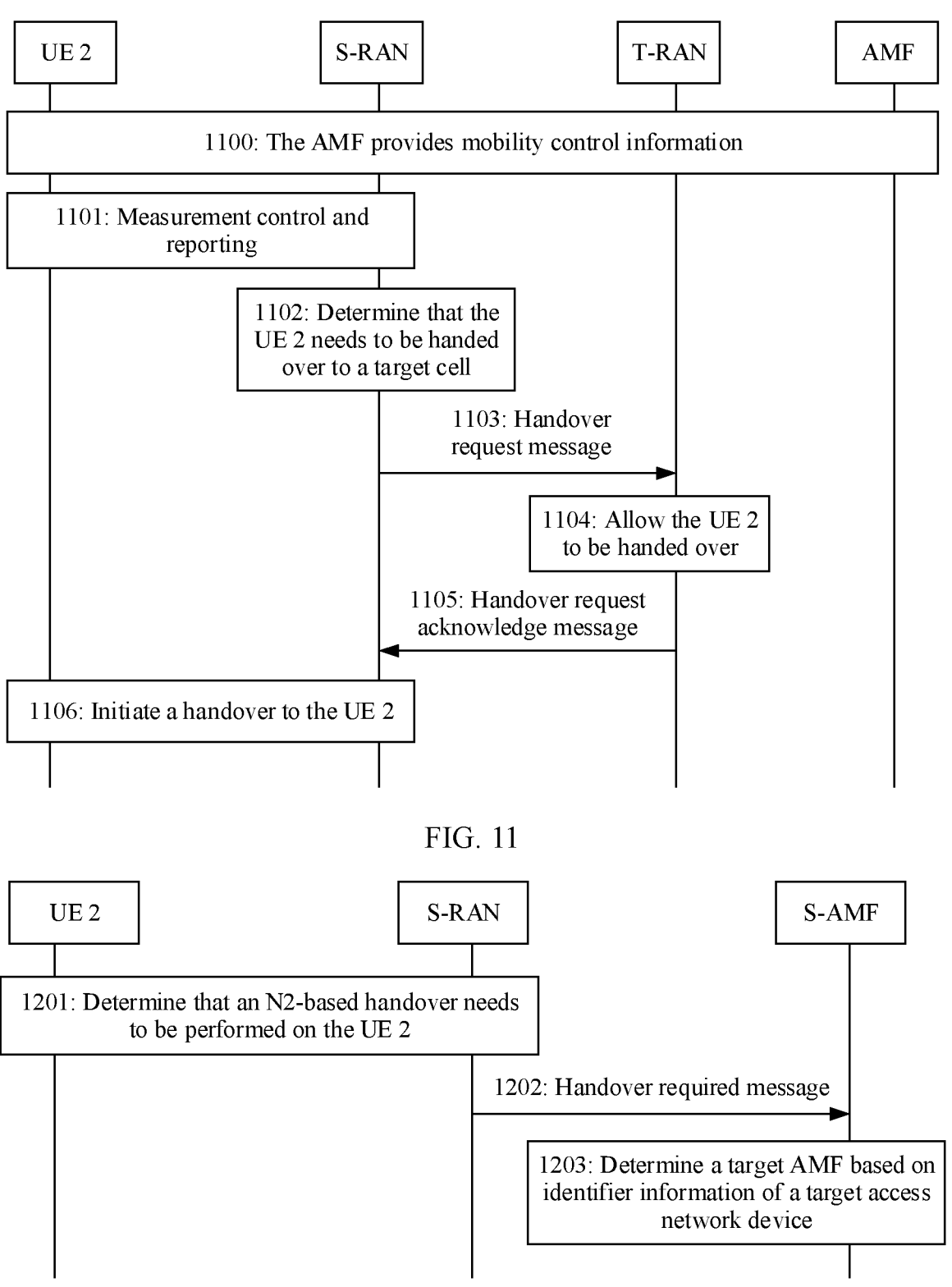
FIG. 11 is a schematic diagram of a partial procedure of an Xn-based handover according to an embodiment of this application.
FIG. 12 and FIG. 13 are schematic diagrams of partial procedures of an N2-based handover according to an embodiment of this application.

The following plurality of embodiments show two different implementations. In one implementation, when receiving multicast data, UE 2 is handed over from a source access network device to a target access network device. In the latter implementation, UE 2 is switched from receiving multicast data to receiving unicast data in a source cell, and then is handed over to a target access network device. Embodiments described below with reference to FIG. 4 to FIG. 9 show a specific procedure in the former implementation, and embodiments described below with reference to FIG. 10 to FIG. 12 show a specific procedure in the latter implementation. The following describes embodiments in detail with reference to accompanying drawings.

Figure 4:
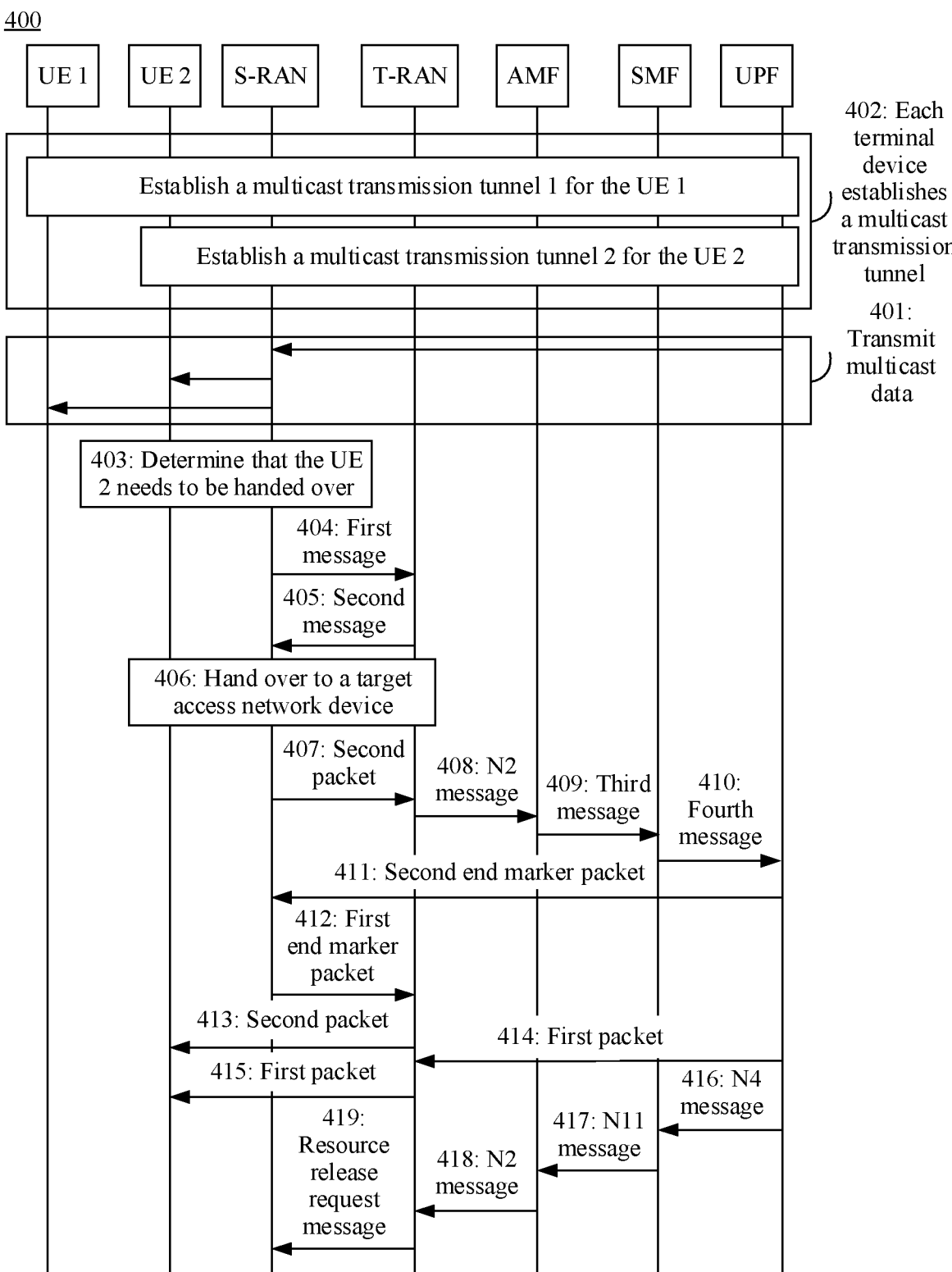
FIG. 4 is a schematic flowchart of a handover method according to an embodiment of this application.

FIG. 4 is a schematic flowchart of a handover method 400 according to an embodiment of this application. As shown in FIG. 4, the method 400 may include steps 401 to 419. The following describes the steps in the method 400 in detail.

In step 401, terminal devices that belong to a same multicast group in a source cell receive multicast data.

There may be a plurality of terminal devices in the source cell that receive the multicast data, and the plurality of terminal devices are terminal devices in the same multicast group. The multicast group is a multicast group corresponding to the multicast data. The plurality of terminal devices may include, for example, but are not limited to, UE 1 and UE 2 that camp on the source cell. It should be understood that the multicast group may further include a terminal device in another cell. This is not limited in this application.

In an implementation, a source access network device may allocate, in advance by using an RRC message, a G-RNTI to each terminal device that is in the source cell and that belongs to the multicast group. Each terminal device may receive the multicast data from the source access network device based on the received G-RNTI.

In another implementation, a source access network device may alternatively allocate, in advance by using an RRC message, respective cell radio network temporary identifiers (C-RNTIs) to terminal devices that are in the source cell and that belong to the multicast group. The source access network device may separately send the multicast data to each terminal device that is in the source cell and that belongs to the multicast group. Each terminal device may receive the multicast data based on the C-RNTI.

It should be understood that a specific process in which each terminal device receives the multicast data based on the G-RNTI and a specific process in which each terminal device receives the multicast data based on the C-RNTI are similar to a specific process in which each terminal device receives unicast data based on the C-RNTI. For brevity, details are not described herein.

In this embodiment of this application, each terminal device may receive the multicast data through an existing transmission tunnel (for example, in a PDU session), or may establish a transmission tunnel based on transmission of the multicast data and receive the multicast data through the newly established transmission tunnel.

Optionally, before step 401, the method further includes step 402: Each terminal device in the source cell establishes a multicast transmission tunnel.

In this embodiment of this application, the transmission tunnel established by each terminal device is a tunnel used for transmitting the multicast data, and may be specifically a tunnel used for transmitting the multicast data from a UPF to the source access network device. The transmission tunnel established by each terminal device may be used for transmitting data requested by the terminal device. For example, a transmission tunnel of the UE 2 may be used for transmitting data requested by the UE 2.

For example, the multicast transmission tunnel established by each terminal device may include but is not limited to a multicast dedicated PDU session, a multicast dedicated tunnel, a multicast dedicated QoS flow, a unicast QoS flow carrying indication information for carrying the multicast data, or another tunnel that can be used for transmitting the multicast data. Each terminal device may establish a multicast dedicated transmission tunnel. For example, the multicast dedicated transmission tunnel may include but is not limited to a multicast dedicated PDU session, a multicast dedicated tunnel, a multicast dedicated QoS flow, or another tunnel that can be specially used for transmitting the multicast data.

For example, the terminal devices that are in the source cell and that receive the multicast data may include but are not limited to the UE 1 and the UE 2. The UE 1 may establish a multicast transmission tunnel 1 based on the multicast data, and the UE 2 may establish a multicast transmission tunnel 2 based on the multicast data. It may be understood that each terminal device that is in the source cell and that receives the multicast data may establish a multicast transmission tunnel of the terminal device based on the multicast data. Merely for ease of understanding and description in the following, it is assumed that the terminal devices that are in the source cell and that receive the multicast data include the UE 1 and the UE 2. In other words, the UE 1 and the UE 2 are terminal devices belonging to a same multicast group.

It should be noted that, when sending a request to a core network, each terminal device may request the multicast data. Based on the request, each terminal device may establish a multicast transmission tunnel of the terminal device for the multicast data.

A specific process in which each terminal device establishes the multicast transmission tunnel is the same as a specific process in which a terminal device establishes a transmission tunnel in the conventional technology. For example, a specific process in which each terminal device establishes a multicast dedicated PDU session is the same as a specific process in which the terminal device establishes a PDU session in the conventional technology. For brevity, details are not described herein.

Because the multicast transmission tunnel established by each terminal device in the multicast group in the source cell is established for the multicast data, the UPF may combine the multicast data on a plurality of multicast transmission tunnel s. For example, in a first possible implementation, the UPF may transmit the multicast data through the multicast transmission tunnel 1 of the UE 1, and filter out data that is originally to be transmitted through the multicast transmission tunnel 2 of the UE 2. Therefore, no multicast data is transmitted on the multicast transmission tunnel 2 of the UE 2. In a second possible implementation, the UPF may alternatively transmit the multicast data through the multicast transmission tunnel 2 of the UE 2, and filter out data that is originally to be transmitted through the multicast transmission tunnel 1 of the UE 1. Therefore, no multicast data is transmitted on the multicast transmission tunnel 1 of the UE 1. In a third possible implementation, the network may separately establish a multicast shared transmission tunnel for the multicast data, where the multicast shared transmission tunnel is not established for any terminal device in the multicast group. The UPF may transmit the multicast data through the multicast shared transmission tunnel, filter out data that is originally to be transmitted through the multicast transmission tunnel 1 of the UE 1, and filter out data that is originally to be transmitted through the multicast transmission tunnel 2 of the UE 2. Therefore, no multicast data is transmitted on the multicast transmission tunnel 1 of the UE 1, and no multicast data is transmitted on the multicast transmission tunnel 2 of the UE 2. It should be understood that combining the multicast data by the UPF is merely a possible implementation. As described above, the source access network device may alternatively combine the multicast data. In this case, the UPF does not combine the multicast data. A difference between the foregoing two cases is described in detail above with reference to FIG. 2 and FIG. 3. For brevity, details are not described herein again.

For ease of description, the transmission tunnel of the multicast data is denoted as a multicast transmission tunnel 0. As described above, in the first implementation, the multicast transmission tunnel 0 may be the multicast transmission tunnel 1, and the multicast transmission tunnel 2 is a tunnel that is of the UE 2 and that is used for transmitting the multicast data. In the second implementation, the multicast transmission tunnel 0 may be the multicast transmission tunnel 2, and the multicast transmission tunnel 1 is a tunnel that is of the UE 1 and that is used for transmitting the multicast data. In the third implementation, the multicast transmission tunnel 0 may be the separately established multicast shared transmission tunnel, the multicast transmission tunnel 1 is a tunnel that is of the UE 1 and that is used for transmitting the multicast data, and the multicast transmission tunnel 2 is a tunnel that is of the UE 2 and that is used for transmitting the multicast data.

It should be noted that even if the UE 1 and the UE 2 each establish a multicast dedicated PDU session, if the network separately establishes a multicast shared transmission tunnel based on the multicast data, the multicast shared transmission tunnel is not limited to the PDU session, for example, may alternatively be a multicast dedicated tunnel or a multicast dedicated QoS flow. This is not limited in this application.

In this embodiment, it is assumed that the multicast data is not transmitted through the multicast transmission tunnel 2. In other words, the multicast transmission tunnel 0 may be the multicast transmission tunnel 1, or may be the separately established multicast shared transmission tunnel.

In this embodiment of this application, although the multicast data is not actually transmitted through all multicast transmission tunnels corresponding to the terminal devices that belong to the same multicast group in the source cell, synchronization of sequence number information of packets on the multicast transmission tunnels can still be ensured.

The multicast transmission tunnel 1 and the multicast transmission tunnel 2 that respectively correspond to the UE 1 and the UE 2 are used as an example. Synchronization of sequence number information of packets on the multicast transmission tunnel 1 and the multicast transmission tunnel 2 may be represented as that sequence numbers of packets (for example, GTP-U packets) on the multicast transmission tunnel 1 and the multicast transmission tunnel 2 are the same. Herein, the sequence number may be understood as a type of sequence number information. A sequence number may be maintained for the multicast transmission tunnel, to count a packet sent from the UPF. This may be implemented based on a configuration of the UPF.

For example, it is assumed that the UPF selects to transmit the multicast data through the multicast transmission tunnel 1 of the UE 1. In this case, the multicast transmission tunnel 0 is the multicast transmission tunnel 1. When updating a sequence number of the multicast transmission tunnel 1 of the UE 1, the UPF may synchronously update a sequence number of a multicast transmission tunnel of another terminal device (for example, the multicast transmission tunnel 2 of the UE 2) in the same multicast group. For example, when transmitting the multicast data through the multicast transmission tunnel 1, the UPF may count a sent packet based on the sequence number. For example, each time the UPF transmits a packet through the multicast transmission tunnel 1, the sequence number of the multicast transmission tunnel 1 is increased by 1. When counting the packet on the multicast transmission tunnel 1, the UPF may also update the sequence number of the multicast transmission tunnel 2, so that the sequence number of the multicast transmission tunnel 2 is synchronous with the sequence number of the multicast transmission tunnel 1.

In another example, it is assumed that the network separately establishes the multicast shared transmission tunnel for the multicast data. In this case, the multicast transmission tunnel 0 is the multicast shared transmission tunnel instead of the multicast transmission tunnel 1. When updating a sequence number of the multicast transmission tunnel 0 established by the network, the UPF may synchronously update sequence numbers of multicast transmission tunnels of other terminal devices (for example, the multicast transmission tunnel 1 of the UE 1 and the multicast transmission tunnel 2 of the UE 2) in the same multicast group. For example, when transmitting the multicast data through the multicast transmission tunnel 0, the UPF may count a sent packet based on the sequence number. For example, each time the UPF transmits a packet through the multicast transmission tunnel 0, the sequence number of the multicast transmission tunnel 0 is increased by 1. When counting the packet on the multicast transmission tunnel 0, the UPF may also update the sequence numbers of the multicast transmission tunnel 1 and the multicast transmission tunnel 2, so that the sequence numbers of the multicast transmission tunnel 1 and the multicast transmission tunnel 2 are synchronous with the sequence number of the multicast transmission tunnel 0.

For still another example, when updating the sequence number of the multicast transmission tunnel 0, the UPF does not synchronously update sequence numbers of multicast transmission tunnels (for example, the multicast transmission tunnel 1 and the multicast transmission tunnel 2) in the same multicast group immediately, but triggers, based on a specific event, updating of the sequence numbers of the multicast transmission tunnel 1 and the multicast transmission tunnel 2. For example, when a handover occurs, an SMF configures the UPF to send an end marker packet. In this case, the UPF may update the sequence numbers of the multicast transmission tunnel 1 and the multicast transmission tunnel 2 to the sequence number of the multicast transmission tunnel 0.

It should be noted that the foregoing synchronization mechanism is merely an example, and should not constitute any limitation on this application.

For example, the sequence number may be implemented with reference to an existing GTP-U sequence number mechanism, may be implemented by adding a new GTP-U sequence number, or may be implemented by adding additional sequence number information to a GTP-U packet. This is not limited in this application.

In step 403, the source access network device determines, based on a measurement report reported by the UE 2, that the UE 2 needs to be handed over.

Each UE can perform measurement control and reporting in the source cell. The source access network device determines, based on a measurement report reported by each UE, whether a handover condition is met, and performs a handover procedure when the handover condition is met. For details of determining, by the source access network device based on the measurement report, whether the handover condition is met, refer to the conventional technology. For brevity, details are not described herein.

In this embodiment, it is assumed that the source access network device determines, based on the measurement report reported by the UE 2, that the UE 2 needs to be handed over.

In step 404, a target access network device obtains a first message, where the first message is used for requesting to establish a resource for handing over the UE 2 to the target access network device. Context information related to the UE 2 is established on the target access network device. In other words, the UE 2 is handed over to the target access network device.

In this embodiment, that the first message is used for requesting to establish a resource for handing over the UE 2 to the target access network device may include: establishing the context information related to the UE 2, that is, contexts of the UE 2 and a PDU session, where the context information related to the UE 2 is used for handing over the UE 2 to the target access network device.

In an implementation of step 404, the source access network device may send the first message to the target access network device through an Xn interface. For example, in an Xn-based handover scenario, the source access network device and the target access network device may be managed by a same AMF, or communication between the source access network device and the target access network device through the Xn interface is supported. In this implementation, the first message may be, for example, a handover request message.

In another possible implementation of step 404, the source access network device sends a handover required message to a core network element (for example, the AMF), and the core network element may send the first message to the target access network device based on the handover required message. For example, in an N2-based handover scenario, communication between the source access network device and the target access network device through the Xn interface is not supported. In this implementation, the first message may also be, for example, a handover request message.

None of a transmission path of the first message, a specific implementation of step 404, and a specific signaling name of the first message are limited in this application.

Optionally, the first message may carry information used for transmitting the multicast data.

Herein, the information used for transmitting the multicast data may specifically include information that can be used for identifying the multicast data (or the multicast group corresponding to the multicast data), such as a data identifier of the multicast data, an identifier of the multicast group, an identifier of a multicast session, an identifier of a multicast PDU session, an identifier of a multicast tunnel, identification information of the multicast data, or a QFI. As described above, the SMF may send the configuration information to the RAN, where the configuration information may include the mapping relationship between the multicast data and the transmission tunnel. Therefore, the target access network device can identify the multicast session by obtaining either of an indication of the multicast session and an indication of the transmission tunnel. In step 404, the target access network device may further obtain, from the first message, the information used for transmitting the multicast data.

Certainly, the first message may alternatively not carry the information used for transmitting the multicast data. The source access network device may send, to the target access network device by using other signaling, the information used for transmitting the multicast data. The target access network device may separately obtain the first message and the information used for transmitting the multicast data from the source access network device. Whether the first message carries the information used for transmitting the multicast data is not limited in this application.

In step 405, the target access network device sends a second message, where the second message is used for notifying the source access network device of the established resource on the target access network device.

In this embodiment, the established resource on the target access network device includes the resource established for handing over the UE 2 to the target access network device. After receiving the first message in step 404, the target access network device may establish, based on the first message, a related resource for the UE 2 to access the target access network device, for example, the context information related to the UE 2 and the context of the PDU session. The target access network device may send the second message, to notify the source access network device of the resource established for the UE 2.

Corresponding to step 404, in a possible implementation of step 405, the target access network device sends the second message to the source access network device. For example, in the Xn-based handover scenario, the target access network device and the source access network device may be managed by the same AMF, or communication between the target access network device and the source access network device through the Xn interface is supported. In this implementation, the second message may be, for example, a handover request response message.

In another possible implementation of step 405, the target access network device may send the second message to the core network element (for example, the AMF). Based on the second message, the core network element may combine handover command messages and send a combined handover command message to the source access network. For example, in the N2-based handover scenario, communication between the target access network device and the source access network device through the Xn interface is not supported. In this implementation, the second message may be, for example, a handover request acknowledge message.

It should be understood that none of a transmission path of the second message, a specific implementation of step 405, and a specific signaling name of the second message are limited in this application.

Optionally, the second message carries related information for the UE 2 to access the target access network device. The related information for the UE 2 to access the target access network device may include, for example, access network tunnel information or GTP tunnel information. The access network tunnel information may indicate an identifier (forwarding tunnel ID) of a forwarding tunnel used for forwarding the multicast data, or may indicate a transport layer address and a GTP tunnel endpoint identifier (GTP-TEID). In this embodiment, the forwarding tunnel may be used by the source access network device to forward the multicast data to the target access network device.

In step 405, the source access network device may further obtain the access network tunnel information from the second message.

Certainly, the second message may alternatively not carry the access network tunnel information. The target access network device may send the access network tunnel information to the source access network device by using other signaling. The source access network device may separately obtain the second message and the access network tunnel information from the target access network device. Whether the second message carries the access network tunnel information is not limited in this application.

In addition, to hand over the UE 2 to the target access network device, the second message may further carry container information sent to the UE 2. For example, the container information includes an RRC reconfiguration message sent by the target access network device to the UE 2. For example, the RRC reconfiguration message includes one or more of the following items: a cell identifier, a C-RNTI, a G-RNTI, and security identification information of the target cell.

Step 401 to step 405 may be classified into a handover preparation phase.

In step 406, the UE 2 is handed over from the source access network device to the target access network device.

That the UE 2 is handed over from the source access network device to the target access network device may also mean that the UE 2 is handed over from the source cell to the target cell. Completion of handing over the UE 2 from the source access network device to the target access network device may be understood as completion of an air interface handover. The UE 2 that completes the air interface handover may receive data from the target access network device instead of directly receiving data from the source access network device.

For a specific process in which the UE 2 performs the air interface handover, refer to the conventional technology. For brevity, details are not described herein.

In step 407, the source access network device forwards a packet of the multicast data to the target access network device through the forwarding tunnel. Correspondingly, the target access network device receives the packet from the source access network device.

Although the UE 2 has been handed over to the target access network device, the source access network device can still receive the multicast data from the UPF through the multicast transmission tunnel 0, and send the multicast data to another UE (for example, the UE 1) in the same multicast group in the source cell.

The source access network device may forward, to the target access network device, the multicast data received on the multicast transmission tunnel 0. For ease of differentiation and description, in this embodiment, a packet that is of the multicast data and that is received by the source access network device from the UPF through the multicast transmission tunnel 0 is denoted as a second packet. The packet that is of the multicast data and that is received by the target access network device from the source access network device through the forwarding tunnel is also a second packet. Therefore, a packet that is of the multicast data and that is received by the target access network device from the UPF without a need of being forwarded by the source access network device in the following is denoted as a first packet.

In another aspect, after the UE 2 is handed over to the target access network device, the target access network device may further send a message to the core network, to complete switching of a transmission path on a core network side.

In step 408, the target access network device sends an N2 message to the AMF, where the N2 message is used for notifying that the air interface handover of the UE 2 is completed. Correspondingly, in step 408, the AMF receives the N2 message from the target access network device.

The N2 message may be a path switch request message, or may be a handover notify message. This depends on whether the handover between the target access network device and the source access network device is performed through an Xn interface or an N2 interface. For example, if the target access network device and the source access network device are access network devices served by a same AMF, or transmission through the Xn interface is currently supported between the target access network device and the source access network device, the handover is an Xn-based handover, and the N2 message may be a path switch request message. If the target access network device and the source access network device are access network devices served by different AMFs, or only signaling transmission through the N2 interface is currently supported between the target access network device and the source access network device, the handover is an N2-based handover, and the N2 message may be a handover notify message.

It should be understood that the foregoing descriptions of the N2 message are merely examples, and should not constitute any limitation on this application. A specific name of the N2 message is not limited in this application.

Optionally, the N2 message includes a list of transmission tunnels (for example, PDU sessions) established on the target access network device and list information of a QoS flow successfully established in a corresponding session.

In step 409, the AMF sends a third message to the SMF, where the third message indicates the information used for transmitting the multicast data. Correspondingly, in step 409, the SMF receives the third message from the AMF.

The AMF may request, by using the third message, the SMF to configure data transmission on the multicast transmission tunnel 2 of the UE 2. The multicast transmission tunnel 2 may be used for transmitting the data requested by the UE 2, that is, data #1. The data #1 corresponds to the information used for transmitting the multicast data, that is, the data #1 and the multicast data are data with same content. Therefore, it may also be considered that the third message is used for requesting the SMF to configure transmission of the multicast data.

The third message may be an N11 message.

In a possible design, the third message may be an $N_{smf}$ PDU session update session management context request ($N_{smf}$_PDUSession_UpdateSMContext Request) message.

Optionally, the third message carries one or more of the following items: identifier information of a transmission tunnel (for example, a PDU session), identifier information of a session management (SM) context, and N2 SM information. The N2 SM information includes list information of a successfully established QoS flow or list information of an unsuccessfully established QoS flow.

In this way, the SMF may obtain multicast context information based on the third message. In an example, the SMF locally stores a correspondence between multicast context information and unicast information. The following table shows the correspondence between multicast context information and unicast information. It should be understood that the following table shows merely an example for ease of understanding, and should not constitute any limitation on this application. The foregoing correspondence does not necessarily exist in a form of a table.

Optionally, the fourth message includes one or more of the following items: an indication of the forwarding action on the first packet, the information used for transmitting the multicast data, an identification rule, and a forwarding action rule.

In an implementation, the SMF may send the indication of the forwarding action on the first packet to the UPF by using the N4 message.

It may be understood that content of the first packet received by the target access network device from the UPF is the same as content of the data #1 requested by the UE 2 in the source cell. Before the UE 2 is handed over to the target access network device, the data #1 originally needs to be sent to the UE 2, but is filtered out due to transmission of the multicast data whose content is the same as that of the data #1. After the UE 2 is handed over to the target access network device, the SMF may determine the indication of the forwarding action on the data #1 (that is, the forwarding action on the first packet). The indication of the forwarding action on the data #1 may specifically include: determining whether to continue to filter out the data #1, and in a case of no filtering, determining a specific transmission tunnel to which the data #1 is to be mapped.

The SMF may determine, based on identification information of the data #1 requested by the UE 2, that the UE 2 belongs to the multicast group corresponding to the multi-

| Unicast information | Multicast context information |
|---|---|
| PDU session information (or SM context identifier information) | Multicast context identifier and/or multicast QoS information and/or multicast policy information (for example, a QoS parameter authorized by the network), and the like. |
| PDU session information (or SM context identifier information) + QoS flow information | Multicast context identifier and/or multicast QoS information and/or multicast policy information (for example, a QoS parameter authorized by the network), and the like. |
| PDU session information (or SM context identifier information) + tunnel identifier information | Multicast context identifier and/or multicast QoS information and/or multicast policy information (for example, a QoS parameter authorized by the network), and the like. |

Based on the multicast context information, the SMF may determine the information used for transmitting the multicast data.

It has been described above that before the multicast data is transmitted, the SMF has generated the configuration information in advance, where the configuration information includes the mapping relationship between the multicast data and the transmission tunnel. Therefore, when receiving, in step 408, the information that is used for transmitting the multicast data and that is from the AMF, the SMF may determine, based on this information, that the data received by the UE 2 in the source cell is the multicast data and one or more of the information such as the multicast group, the multicast session, the data identifier, and the transmission tunnel that correspond to the multicast data.

In step 410, the SMF sends a fourth message to the UPF, where the fourth message is used for requesting to configure data transmission on the multicast transmission tunnel 2 of the UE 2. Correspondingly, in step 410, the UPF receives the fourth message from the SMF.

The fourth message may be an N4 message.

The SMF may indicate, by using the fourth message, a forwarding action of the UPF on the data #1 requested by the UE 2. In this embodiment, a packet of the data #1 requested by the UE 2 is the foregoing first packet. In other words, the SMF may indicate a forwarding action on the first packet by using the fourth message.

cast data. The SMF may determine, based on a fact that the UE 2 is handed over to the target access network device, not to filter out the data #1 requested by the UE 2, and may further determine, based on the pre-determined mapping relationship between the multicast data and the transmission tunnel, a specific transmission tunnel to which the data #1 is to be mapped for transmission.

Alternatively, the SMF may determine, based on the identification information of the data #1 requested by the UE 2, whether multicast data whose content is the same as that of the data #1 is transmitted in the target cell. When the multicast data is transmitted in the target cell, the SMF may determine to continue to filter out the data #1. The SMF may directly indicate, to the UPF, that the forwarding action rule of the data #1 (that is, the forwarding action rule of the first packet) is to filter out the data #1. When no multicast data is transmitted in the target cell, the SMF may determine not to filter out the data #1, and may further determine, based on the pre-determined mapping relationship between the multicast data and the transmission tunnel, a specific transmission tunnel to which the data #1 is to be mapped for transmission.

It should be understood that the foregoing description of the data #1 is intended to specifically describe processing of the data requested by the UE 2 before and after the UE 2 is handed over to the target access network device. For differentiation, a packet received by the target access network device from the UPF after the UE 2 is handed over to the target access network device is still referred to as a first packet in the following.

In another implementation, the SMF may send the information used for transmitting the multicast data, the identification rule, and the forwarding action rule to the UPF by using the N4 message.

Alternatively, the SMF may directly send the identification rule and the forwarding action rule to the UPF. The UPF identifies, according to the identification rule, a specific multicast group to which the received multicast data corresponds, and determines, according to the forwarding action rule, whether to forward the data #1 and a specific tunnel on which the data #1 is to be forwarded.

Specific content of the identification rule and the forwarding action rule has been described in detail above. For brevity, details are not described herein again.

In this embodiment, the UPF may alternatively determine the forwarding action rule of the first packet based on the configuration information received from the SMF in advance.

The configuration information received by the UPF from the SMF includes the mapping relationship between the multicast data and the transmission tunnel. When the UPF receives the first packet, the UPF may first determine, based on the identification information of the data #1, that the UE 2 belongs to the multicast group corresponding to the multicast data. The UPF may determine, based on a fact that the UE 2 is handed over to the target access network device, not to filter out the data #1 requested by the UE 2, and may further determine, based on the mapping relationship that is between the multicast data and the transmission tunnel and that is sent by the SMF, a specific transmission tunnel to which the data #1 is to be mapped for transmission.

Alternatively, the UPF may determine, according to the identification rule, whether multicast data whose content is the same as that of the data #1 is transmitted in the target cell. When the multicast data whose content is the same as that of the data #1 exists, the UPF may determine to filter out the data #1. When the multicast data whose content is the same as that of the data #1 does not exist, the UPF may determine not to filter out the data #1, and may further determine, according to the forwarding action rule, a specific transmission tunnel to which the data #1 is to be mapped for transmission.

Optionally, the N4 message further includes related information of the end marker packet.

The related information of the end marker packet may include, for example, an end marker packet that carries identifier information of the multicast transmission tunnel 2 or information that indicates to create the end marker packet.

The end marker packet carries the identifier information of the multicast transmission tunnel 2 because there is a correspondence between the multicast transmission tunnel 2 and a forwarding tunnel. There may be a plurality of forwarding tunnels between the source access network device and the target access network device. The plurality of forwarding tunnels may be used for sending data of different terminal devices, for example, data of terminal devices other than the UE 2, or may be used for sending data of a same terminal device on different transmission tunnels (for example, in different PDU sessions). Each forwarding tunnel may correspond to a multicast transmission tunnel of each terminal device. When the source access network device receives the end marker packet, to help the source access network device determine a specific forwarding tunnel used for sending the end marker packet to the target access network device, the end marker packet may carry the identifier information of the multicast transmission tunnel 2, so that the source access network device determines, based on the identifier information of the multicast transmission tunnel 2, the forwarding tunnel corresponding to the multicast transmission tunnel 2. This can avoid impact on data transmission on a forwarding tunnel of another UE or on another forwarding tunnel of the UE 2 when the end marker packet is sent on an incorrect forwarding tunnel.

In this embodiment of this application, the SMF may generate the end marker packet, or may indicate the UPF to generate the end marker packet. If the SMF indicates the UPF to generate the end marker packet, the SMF may indicate the identifier information of the multicast transmission tunnel 2 to the UPF.

The identifier information of the multicast transmission tunnel 2 may be, for example, identifier information of a multicast dedicated PDU session 2, identifier information of a multicast dedicated tunnel, a QFI of a multicast dedicated QoS flow, or a QFI of a unicast QoS flow that carries indication information for transmitting the multicast data. This is not limited in this application.

The identifier information of the multicast transmission tunnel 2 may be further used as information indicating a transmission tunnel used for transmitting the end marker packet. The UPF may transmit the end marker packet on the multicast transmission tunnel 2 based on the identifier information of the multicast transmission tunnel 2.

Alternatively, the identifier information of the multicast transmission tunnel 2 may not be used as information indicating a transmission tunnel used for transmitting the end marker packet. For example, the UPF may send the end marker packet by using either the PDU session 1 or the PDU session 2. This is not limited in this application.

A specific function of the identifier information of the multicast transmission tunnel 2 may be predefined, for example, defined in a protocol. This is not limited in this application.

In step 411, the UPF sends a second end marker packet to the source access network device. Correspondingly, in step 411, the source access network device receives the second end marker packet from the UPF.

In step 412, the source access network device sends a first end marker packet to the target access network device.

For ease of differentiation and understanding, herein, the end marker packet sent by the source access network device to the target access network device is denoted as a first end marker packet, and the end marker packet sent by the UPF to the source access network device is denoted as a second end marker packet. As described above, the UPF may send the second end marker packet based on an indication of the SMF through the multicast transmission tunnel 2.

For example, the multicast transmission tunnel may be a multicast dedicated PDU session. In this case, the source access network device may directly forward the second end marker packet received in the PDU session 2 to the target access network device. In other words, the second end marker packet and the first end marker packet may be a same packet. The source access network device may directly determine, based on the transmission tunnel on which the second end marker packet is transmitted, data on a specific transmission tunnel for which the second end marker packet is sent. Therefore, the first end marker packet may be sent to the target access network device through the forwarding tunnel corresponding to the multicast transmission tunnel 2. For another example, the multicast transmission tunnel may alternatively be a tunnel with a smaller granularity, for example, a dedicated multicast tunnel, a dedicated multicast QoS flow, or a unicast QoS flow. Because the end marker packet is sent at a PDU session granularity, when the multicast transmission tunnel is a tunnel whose granularity is less than the PDU session granularity, the source access network device may not necessarily directly forward, to the target access network device, the second end marker packet that is for the multicast data and that is received from the UPF, but sends, to the target access network device, an end marker packet (for example, denoted as a third end marker packet) that is for unicast data and that is received in a PDU session to which the multicast transmission tunnel belongs, to indicate to the target access network device that the source access network device stops forwarding data to the target access network device. In this case, the second end marker packet and the first end marker packet are different packets. For example, the first end marker packet in step 412 may be the third end marker packet.

It should be noted that if the source access network device sends, to the target access network device, the third end marker packet that is for the unicast data and that is received in the PDU session to which the multicast transmission tunnel belongs, the source access network device may send the third end marker packet to the target access network device after all end marker packets (for example, the second end marker packet and the third end marker packet) for data on transmission tunnels in the PDU session arrive.

Certainly, the source access network device may alternatively generate the first end marker packet and send the first end marker packet to the target access network device after all end marker packets for data on transmission tunnels in the PDU session to which the multicast transmission tunnel belongs arrive. This is not limited in this application.

In this case, the first end marker packet sent by the source access network device to the target access network device is an end marker packet for unicast data. Therefore, the target access network device may process the first end marker packet according to a method in the conventional technology.

In this embodiment, the UPF may alternatively determine to transmit the second end marker packet through the multicast transmission tunnel 0 or the multicast transmission tunnel 2. Because the second end marker packet carries the identifier information of the multicast transmission tunnel 2, the source access network device may send the end marker packet to the target access network device based on the identifier information of the multicast transmission tunnel 2 through the forwarding tunnel corresponding to the multicast transmission tunnel 2.

In some possible designs, when the UPF sends the second end marker packet through the multicast transmission tunnel 2, a packet header of the second end marker packet carries the identifier information of the multicast transmission tunnel 2. Therefore, it may also be considered that the second end marker packet carries the identifier information of the multicast transmission tunnel 2. Alternatively, a payload part of the second end marker packet may carry the identifier information of the multicast transmission tunnel 2. This is not limited in this application. When the UPF sends the second end marker packet through the multicast transmission tunnel 0, the packet header of the second end marker packet carries the identifier information of the multicast transmission tunnel 2, and the identifier information of the multicast transmission tunnel 2 may be carried by using the payload part of the second end marker packet.

Because a tunnel used by the source access network device to receive the second packet is different from a tunnel used by the source access network device to receive the second end marker packet from the UPF, the first end marker packet sent by the source access network device to the target access network device may be asynchronous with the packet (for example, the second packet) of the multicast data. For example, the first end marker packet with a later sequence number arrives at the target access network device first, and the second packet with an earlier sequence number arrives at the target access network device later. As a result, an out-of-order or packet loss case occurs. Therefore, it can be ensured, based on the sequence numbers, that packets of the multicast data that are received by the target access network device are not out of order or lost.

For ease of understanding and description, herein, the sequence number that corresponds to the second packet and that is included in the second packet is denoted as a first sequence number, and the sequence number that corresponds to the first end marker packet and that is included in the first end marker packet is denoted as a second sequence number.

It may be understood that both the first end marker packet and the second packet may be sent to the target access network device through a forwarding tunnel between the source access network device and the target access network device. The target access network device may determine, based on the comparison of the value of the sequence numbers of the packets, whether to forward the second packet, that is, whether to perform step 413, to be specific, the target access network device sends the second packet to the UE 2.

In this embodiment, if the first sequence number is less than the second sequence number, the target access network device may send the second packet to the terminal device. In other words, provided that a sequence number of a packet received by the target access network device from the source access network device is less than the sequence number of the first end marker packet, the target access network device may forward, to the UE 2, the packet received from the source access network device. If the first sequence number is greater than or equal to the second sequence number, the target access network device may send, to the UE 2, the first packet received from the UPF, that is, perform step 415.

The following describes, with reference to specific examples, processing logic when the source access network device and the target access network device receive the second packet and the first end marker packet.

For example, if a sequence number of a packet that is of multicast data and that is most recently sent by the UPF through the multicast transmission tunnel 0 is 20 (that is, an example of the first sequence number), the UPF may send, through the multicast transmission tunnel 2, a first end marker packet whose sequence number is 21 (that is, an example of the second sequence number). The source access network device may forward the packet whose sequence number is 20 and the first end marker packet whose sequence number is 21 to the target access network device. After receiving the first end marker packet whose sequence number is 21, the target access network device starts to consider sending data that is from the UPF and that is not forwarded by the source access network device. In other words, the target access network device only needs to send, to the terminal device, packets that are received from the source access network device and whose sequence numbers are 20 and before 20 (for example, including packets whose sequence numbers are less than or equal to 20). However, the target access network device may not receive a packet whose sequence number is 21 (for example, including a packet whose sequence number is greater than 21) from the source access network device.

There is another possibility that after receiving the first end marker packet whose sequence number is 21, the source access network device may skip forwarding a packet whose sequence number is after 21 (for example, including a packet whose sequence number is greater than or equal to 22). In other words, the source access network device only needs to forward, to the target access network device, packets that are received on the multicast transmission tunnel 0 and whose sequence numbers are 20 and before 20 (for example, including packets whose sequence numbers are less than or equal to 20).

Certainly, when the sequence number of the first end marker packet is the same as a sequence number of a packet received from the source access network device, the target access network device stops receiving a packet of the multicast data from the source access network device, or the source access network device no longer forwards a packet of the multicast data to the target access network device. For brevity, examples are not described herein. In step 413, the target access network device sends, to the UE 2, the second packet received from the source access network device.

The target access network device may determine, based on the foregoing comparison of the value of the first sequence number and the second sequence number, whether to forward the second packet to the UE 2. This can avoid a packet loss of the multicast data for the UE 2 and ensure that the multicast data can be completely received.

In step 414, the UPF sends the first packet to the target access network device. Correspondingly, in step 414, the target access network device receives the first packet from the UPF.

In an implementation, after sending the second end marker packet in step 411, the UPF may send the first packet through a downlink user connection between the UPF and the target access network device. The downlink user connection between the UPF and the target access network device is a multicast transmission tunnel 2 to which the UE 2 is switched. The UPF may send the first packet to the target access network device through the switched-to multicast transmission tunnel 2 (which is referred to as a multicast transmission tunnel 2' below). Because the multicast transmission tunnel 2 is a multicast transmission tunnel established based on the multicast data, the first packet is transmitted on the multicast transmission tunnel 2'.

Because sequence numbers of packets on the multicast transmission tunnel 0 and the multicast transmission tunnel 2' are synchronous, the UPF may implicitly indicate a sequence of the packets by using the sequence numbers, so that no packet loss is caused.

In step 415, the target access network device sends the first packet to the UE 2.

If the first sequence number is greater than or equal to the second sequence number, the target access network device may send the first packet to the UE 2. In other words, if a sequence number of a packet received by the target access network device from the source access network device is greater than or equal to the sequence number of the first end marker packet, the target access network device may start to consider forwarding, to the UE 2, a packet received from the UPF, and no longer forward, to the UE 2, the packet received from the source access network device.

Optionally, if the first sequence number is greater than or equal to the second sequence number, the target access network device stops receiving a packet from the source access network device, or sends a first indication to the source access network device. The first indication indicates the source access network device to stop sending the multicast data, or notify the source access network device that the multicast data is no longer received from the source access network device.

Then, the target access network device may perform step 415 to send, to the UE 2, the first packet received from the UPF. Therefore, a sequence number (for example, denoted as a third sequence number) corresponding to the first packet may be greater than or equal to the second sequence number.

In other words, the target access network device may continue to perform step 413 until the first sequence number is greater than or equal to the second sequence number, and then the target access network device may perform step 415. Certainly, for example, when the first sequence number is greater than or equal to the second sequence number, the target access network device may alternatively skip step 413 and directly perform step 415.

The following describes, with reference to specific examples, processing logic when the target access network device receives the second packet, the first end marker packet, and the first packet from the source access network device. For example, packets whose sequence numbers are 19 and 20 (that is, two examples of the first sequence number) and that are sent by the UPF through the multicast transmission tunnel 0 have not arrived at the source access network device, but an end marker packet whose sequence number is 21 (that is, an example of the second sequence number) and that is sent by the UPF through the multicast transmission tunnel 2 has arrived at the source access network device. The target access network device may first receive the end marker packet whose sequence number is 21, and then receive the packets whose sequence numbers are 19 and 20. Because the sequence number 20 is less than the sequence number 21, the target access network device may continue to send a packet from the source access network device to the UE 2 until sending of the packet whose sequence number is 20 is completed. Then, the target access network device no longer receives a packet from the source access network device through the forwarding tunnel. Optionally, the target access network device may release the forwarding tunnel between the target access network device and the source access network device, or may release the forwarding tunnel between the target access network device and the source access network device after sending a resource release request message in subsequent step 419. This is not limited in this application.

In another aspect, after sending the end marker packet whose sequence number is 21 through the multicast transmission tunnel 2, the UPF may further send the first packet through the multicast transmission tunnel 2'. The UPF may send a first packet with a sequence number starting from 22 (that is, an example of the third sequence number) through the multicast transmission tunnel 2', or may send a packet with a sequence number starting from a number before 22 (that is, another example of the third sequence number) through the multicast transmission tunnel 2'. This is not limited in this application. The target access network device may first locally buffer a packet received through the multicast transmission tunnel 2', and after completing sending the packet whose sequence number is 20, continue to send a packet with a sequence number starting from 22.

In other words, the target access network device may locally buffer the packet from the multicast transmission tunnel 2', and may also forward, to the UE 2, a packet that is on the multicast transmission tunnel 0 and that is from the source access network device. The target access network device may stop forwarding the packet (namely, the packet of the multicast data) from the source access network device, and then send the packet (namely, the first packet) from the multicast transmission tunnel 2' to the UE 2, until a sequence number of a packet from the multicast transmission tunnel 0 is greater than or equal to the sequence number of the first end marker packet. Afterwards, a packet sent by the target access network device to the UE 2 is a packet received through the multicast transmission tunnel 2'.

It may be understood that the multicast transmission tunnel 2' and the forwarding tunnel between the source access network device and the target access network device may be a direct forwarding path and an indirect forwarding path of a same PDU session, or may be two different dedicated transmission tunnels. This is not limited herein.

In another implementation, the UPF may alternatively send the second end marker packet through the multicast transmission tunnel 0. Therefore, after receiving the N4 message from the SMF, the UPF may transmit data through the downlink user connection between the UPF and the target access network device. In other words, step 414 is not necessarily performed after step 413, and may be performed after step 410.

In this implementation, packets received by the target access network device may also be out of order. The target access network device may still determine, based on sequence numbers of the received packets, whether to continue to send, to the UE 2, the second packet from the source access network device or send, to the UE 2, the first packet received on the multicast transmission tunnel 2'. For details, refer to the foregoing description. For brevity, details are not described herein again.

It should be understood that sequences of performing step 411 to step 414 in the foregoing two implementations are slightly different. However, the foregoing two implementations are merely different implementations, and shall not constitute any limitation on this application.

In step 416, the UPF sends an N4 message to the SMF. The N4 message may be understood as a response to the fourth message in step 411, and may indicate that configuration of data transmission on the multicast transmission tunnel of the UE 2 is completed. Correspondingly, in step 416, the SMF receives the N4 message from the UPF.

In step 417, the SMF sends an N11 message to the AMF. The N11 message may be understood as a response to the third message in step 410, and may indicate that path switching is completed. Correspondingly, in step 417, the AMF receives the N11 message from the SMF.

Corresponding to step 410, the N11 message may be an $N_{smf}$ PDU session update session management context response ($N_{smf}$_PDUSession_UpdateSMContext Response) message.

In step 418, the AMF may send an N2 message to the target access network device. The N2 message may be understood as a response to the N2 message in step 408, and may indicate that path switching is completed. Correspondingly, in step 418, the target access network device receives the N2 message from the AMF.

Corresponding to step 408, the N2 message may be a path switch response message.

It should be understood that step 418 may be a step performed in the Xn-based handover scenario. In the N2-based handover scenario, step 418 is not necessarily performed.

In step 419, the target access network device sends the resource release request message to the source access network device, to request to release the context of the UE 2. Correspondingly, in step 419, the source access network device receives the resource release request message from the target access network device.

In this embodiment, the context of the UE 2 may be, for example, a resource of the forwarding tunnel. Therefore, releasing the context of the UE 2 may include releasing the resource of the forwarding tunnel.

It should be understood that step 419 may be a step performed in the Xn-based handover scenario. In the N2-based handover scenario, step 419 is not necessarily performed.

In this way, the forwarding tunnel between the target access network device and the source access network device is released.

According to the foregoing method, the UE 2 completes the handover when receiving the multicast data. When requesting the handover from the target access network device, the source access network device sends, to the target access network device, the information used for transmitting the multicast data, so that the target access network device forwards the multicast data to the UE 2 based on the information, and sends the multicast data or data whose content is the same as that of the multicast data to the UE 2 after path switching, thereby avoiding a packet loss of multicast data, and helping obtain complete data. This ensures that the UE 2 is handed over without a delay in a process of receiving the multicast data, and also ensures data transmission performance.

Figures 5A, 5B:
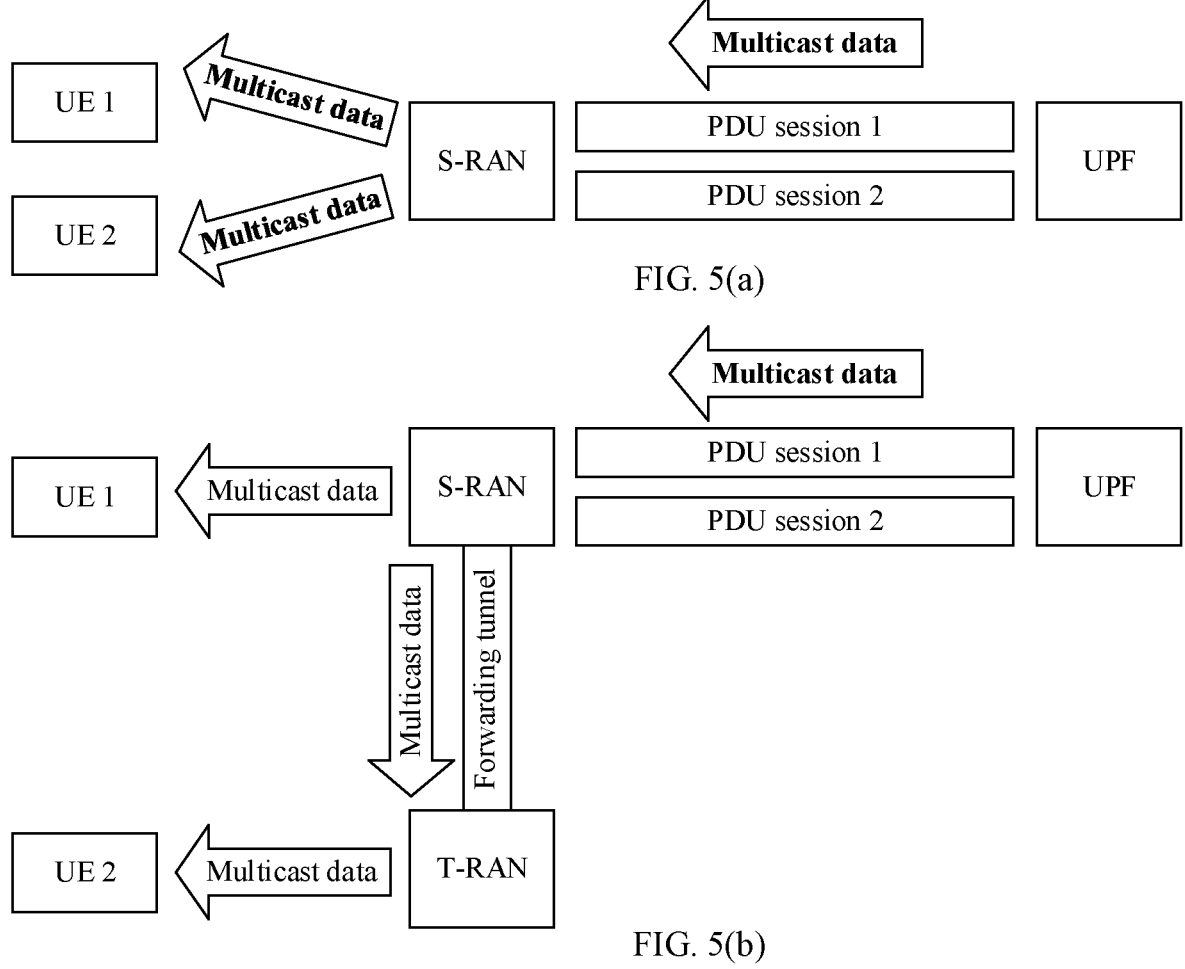
FIG. 5(a) to FIG. 5(e) are schematic diagrams of a handover method according to an embodiment of this application.
Figure 5C:
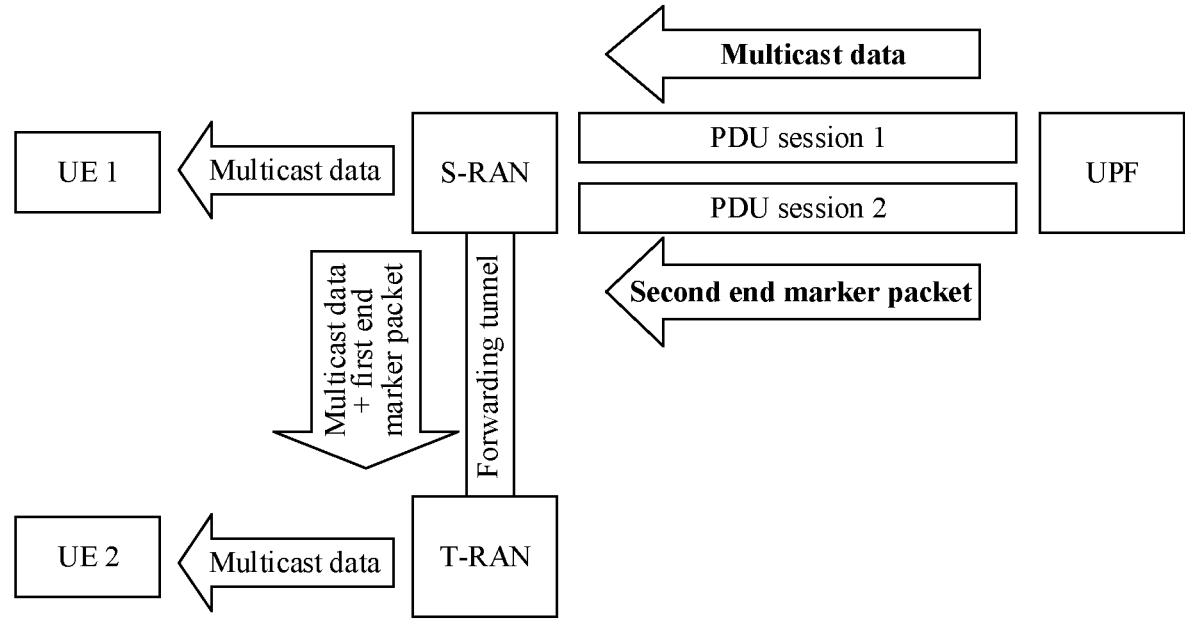
Figures 5D, 5E:
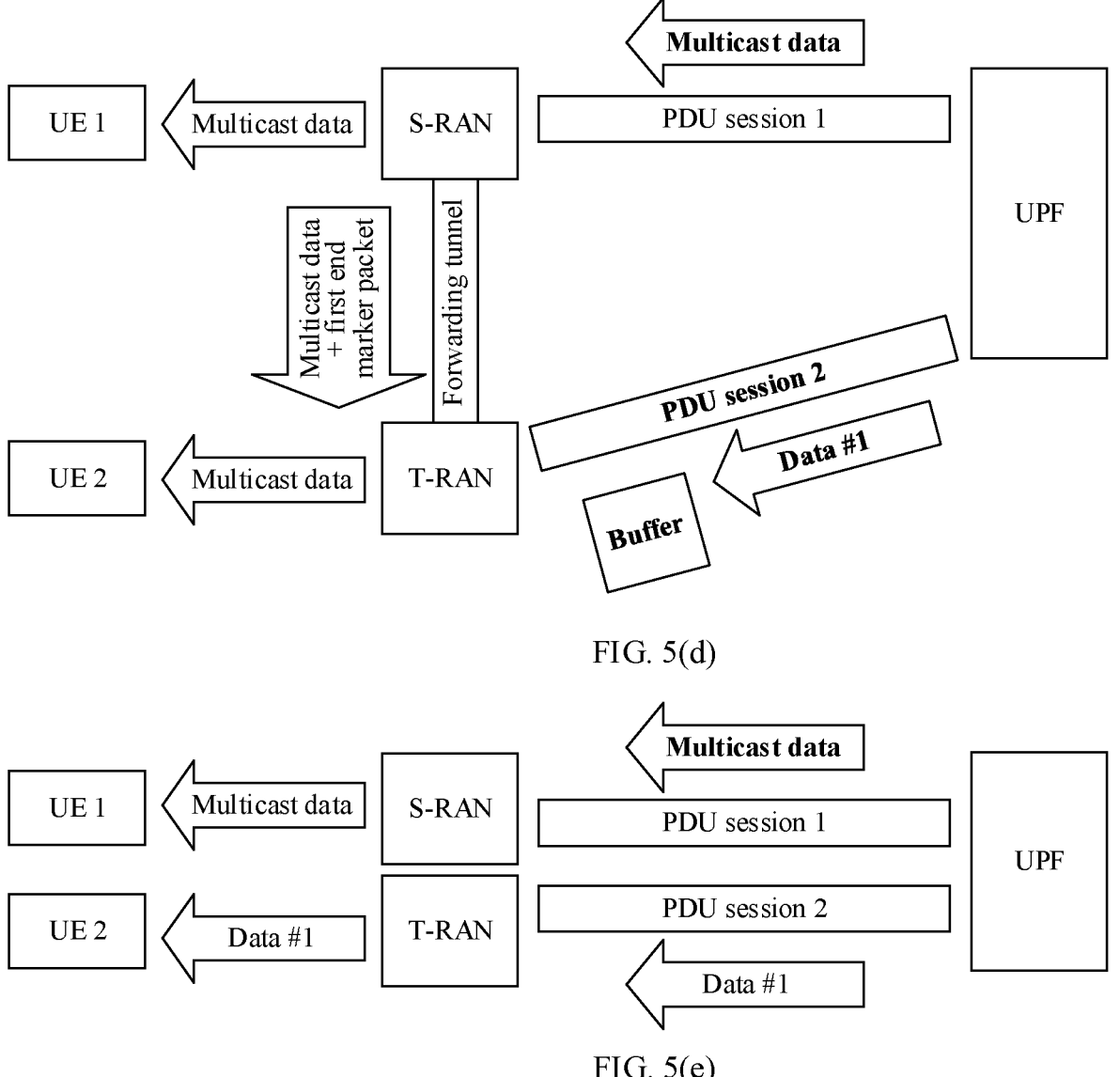

To better understand this embodiment, the following describes the foregoing method 400 with reference to examples shown in FIG. 5(*a*) to FIG. 5(*e*). In the examples shown in FIG. 5(*a*) to FIG. 5(*e*), a transmission tunnel is a PDU session. A specific form of a transmission tunnel 0 may be a PDU session 1 of UE 1, and a specific form of a transmission tunnel 2 may be a PDU session 2 of UE 2.

As shown in FIG. 5(*a*) to FIG. 5(*e*), in FIG. 5(*a*), both the UE 1 and the UE 2 are terminal devices camping on a source cell. In this case, both the PDU session 1 and the PDU session 2 are transmission tunnels established between a source access network device and a UPF. The UPF may send multicast data to the source access network device by using the PDU session 1 of the UE 1. The source access network device sends the received multicast data to terminal devices in a multicast group that is in the source cell and that corresponds to the multicast data, for example, the terminal devices include the UE 1 and the UE 2.

In this embodiment, a sequence number of the PDU session 1 may be synchronized with a sequence number of the PDU session 2. For example, when updating the sequence number of the PDU session 1, the UPF may synchronously update the sequence number of the PDU session 2.

In FIG. 5(*b*), the UE 2 is handed over from the source access network device to a target access network device, or is handed over from the source cell to a target cell. The source access network device may forward a packet of the multicast data (for example, the foregoing second packet) received in the PDU session 1 to the target access network device through a forwarding tunnel between the source access network device and the target access network device. Then, the target access network device sends, to the UE 2, the second packet received through the forwarding tunnel.

In FIG. 5(*c*), the UPF may send an end marker packet 1 for the multicast data in the PDU session 2, and may concurrently send the packet of the multicast data in the PDU session 1. After receiving the end marker packet 1 in the PDU session 2, the source access network device may send the end marker packet 1 and the packet of the multicast data together to the target access network device, where the packet of the multicast data is received in the PDU session 1. The target access network device may continue to send, to the UE 2, the packet that is of the multicast data and that is received from the source access network device. The target access network device may stop receiving the packet of the multicast data from the source access network device, until a sequence number of the end marker packet is less than a sequence number of the packet of the multicast data.

In FIG. 5(*d*), a difference from FIG. 5(*a*), FIG. 5(*b*), and FIG. 5(*c*) lies in that, a transmission path of the PDU session 2 changes, and is no longer a transmission tunnel established between the UPF and the source access network device, but a transmission tunnel established between the UPF and the target access network device. The UPF may send a packet of data #1 (for example, the foregoing first packet) to the target access network device by using the PDU session 2.

In FIG. 5(*e*), the forwarding tunnel between the source access network device and the target access network device is released. The target access network device sends the received packet of the data #1 to the UE 2.

In this way, when the UE 2 is handed over to the target access network device, complete receiving of the multicast data can still be ensured.

Figure 6:
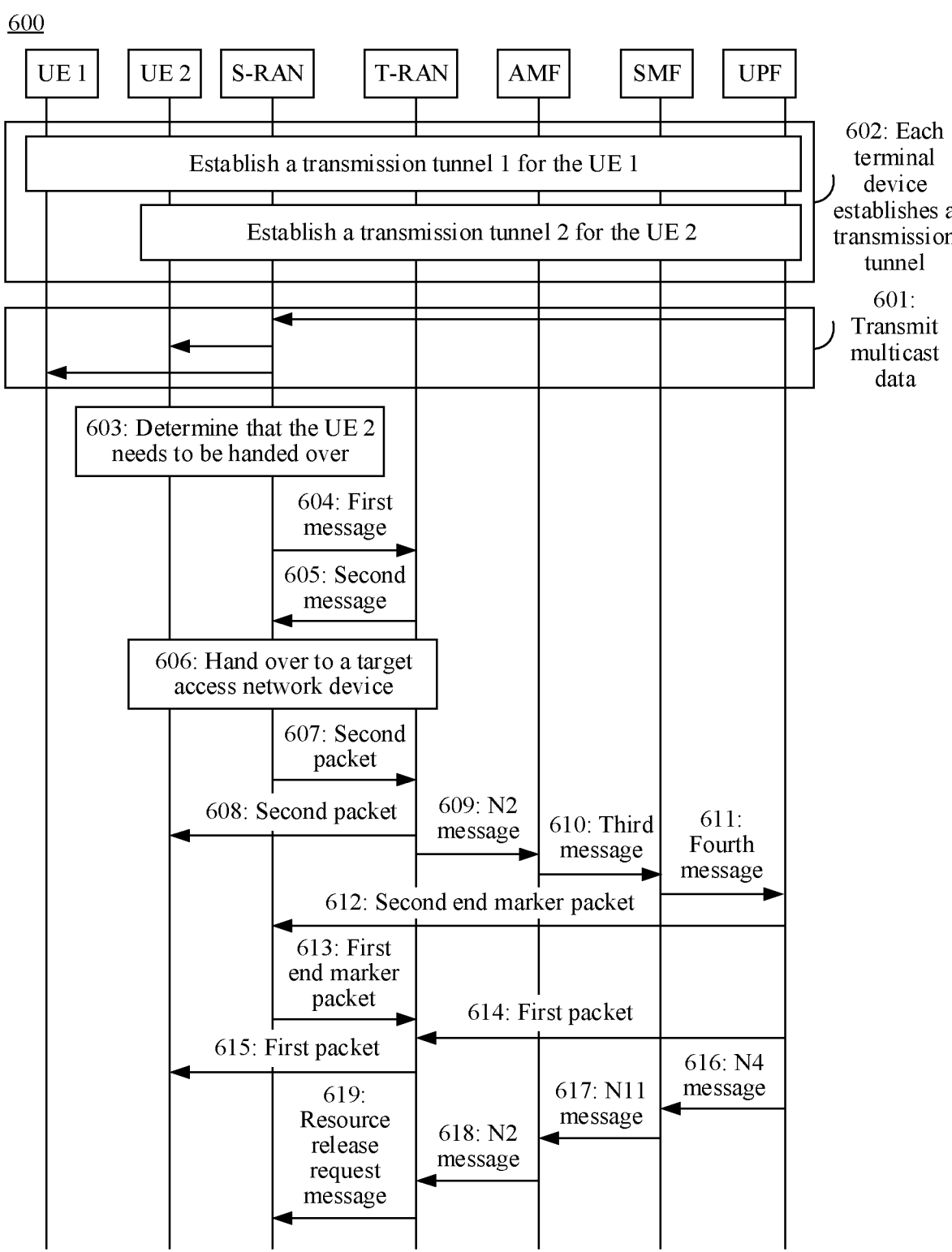
FIG. 6 is a schematic flowchart of a handover method according to another embodiment of this application.

FIG. 6 is a schematic flowchart of a handover method 600 according to another embodiment of this application. As shown in FIG. 6, the method 600 may include steps 601 to 619. The following describes the steps in the method 600 in detail.

In step 601, terminal devices that belong to a same multicast group in a source cell receive multicast data.

It should be understood that a specific process of step 601 is the same as a specific process of step 401 in the foregoing method 400. For brevity, details are not described herein again.

In this embodiment of this application, each terminal device may receive the multicast data through an existing transmission tunnel (for example, in a PDU session), or may establish a transmission tunnel based on transmission of the multicast data and receive the multicast data through the newly established transmission tunnel.

Optionally, before step 601, the method 600 further includes: Each terminal device in the source cell establishes a transmission tunnel.

In this embodiment of this application, the transmission tunnel is a transmission tunnel that is used for transmitting the multicast data and that is from a UPF to a source access network device. The transmission tunnel established by each terminal device may be used for transmitting data requested by the terminal device. For example, a transmission tunnel of UE 2 may be used for transmitting data requested by the UE 2.

For example, the transmission tunnel may include but is not limited to a PDU session, a tunnel, a QoS flow, or another tunnel that can be used for transmitting data.

For example, the terminal devices in the source cell may include but are not limited to UE 1 and the UE 2. Each terminal device may establish a transmission tunnel of the terminal device, to transmit data. For example, the UE 1 may establish a transmission tunnel 1, and the UE 2 may establish a transmission tunnel 2. For a specific process in which each terminal device establishes the transmission tunnel, refer to the conventional technology. For brevity, details are not described herein.

In this embodiment, the transmission tunnel 1 may be a unicast transmission tunnel, or may be a multicast transmission tunnel. Similarly, the transmission tunnel 2 may be a unicast transmission tunnel, or may be a multicast transmission tunnel. This is not limited in this application.

It is assumed that content of data requested by the UE 1 in the source cell and content of data requested by the UE 2 in the source cell are the same. Therefore, the UPF may combine data with same content on the transmission tunnel 1 and the transmission tunnel 2, and send the data to the UE 1 and the UE 2 in the source cell in a multicast manner. The UE 1 and the UE 2 belong to a same multicast group. The UPF sends data to the multicast group in a multicast manner. The data corresponding to the multicast group may be referred to as multicast data.

It should be understood that, in this embodiment, merely for ease of understanding and description, it is assumed that the terminal devices that are in the source cell and that receive the multicast data include the UE 1 and the UE 2. However, this should not constitute any limitation on this application. The terminal devices that receive the multicast data may include more terminal devices, for example, may further include another terminal device in the source cell and/or a terminal device in another cell. A quantity of terminal devices in the multicast group is not limited in this application.

In this embodiment, for the terminal device that receives the multicast data in the source cell, the multicast data may be transmitted through the transmission tunnel of either the UE 1 or the UE 2, or the multicast data may be transmitted through a multicast shared transmission tunnel that is established by a network and that is specially used for transmitting the multicast data.

For ease of description, in this embodiment, it is assumed that a transmission tunnel for transmitting the multicast data is a transmission tunnel 0. The transmission tunnel 0 may be, for example, the transmission tunnel 1 of the UE 1, or may be the foregoing separately established multicast shared transmission tunnel.

In an example, the multicast data may be carried in a QoS flow on a tunnel of a PDU session.

The PDU session may be, for example, a PDU session of the UE 1, or may be a multicast dedicated PDU session separately established for the multicast data. This is not limited in this application.

Optionally, the PDU session is a multicast dedicated PDU session. The PDU session may be a PDU session established based on the multicast data. The tunnel is a tunnel established based on the multicast data. The QoS flow may be a QoS flow dedicated to carrying the multicast data.

Optionally, the PDU session is a unicast PDU session, and the tunnel is a multicast dedicated tunnel. The tunnel may be a multicast dedicated tunnel established based on the multicast data. The QoS flow may be a QoS flow dedicated to carrying the multicast data, or may be a QoS flow used for carrying unicast data, but carries indication information, where the indication information indicates that the QoS flow carries the multicast data.

Optionally, the PDU session is a unicast PDU session, the tunnel is a unicast tunnel, and the QoS flow is a QoS flow dedicated to carrying the multicast data.

Optionally, the PDU session is a unicast PDU session. The tunnel is a unicast tunnel. The QoS flow is a QoS flow used for carrying unicast data, but carries indication information, where the indication information indicates that the QoS flow carries the multicast data.

Because the UPF sends, in a multicast manner through the transmission tunnel 0, multicast data whose content is the same as that of data #1, neither the data (for example, denoted as the data #1) requested by the UE 2 nor the multicast data is transmitted on the transmission tunnel 2.

Although not shown in the figure, it may be understood that because the UE 2 may further concurrently receive other data, for example, other unicast data and/or multicast data, data other than the data #1 and the multicast data may also be transmitted on the transmission tunnel 2. This is not limited in this application.

A specific process in which the UE 2 receives other data on the transmission tunnel 2 may be the same as that in the conventional technology. For brevity, details are not described herein.

In step 603, the source access network device determines, based on a measurement report reported by the UE 2, that the UE 2 needs to be handed over.

In step 604, the source access network device sends a first message to a target access network device, where the first message is used for requesting to establish a resource for handing over the UE 2 to the target access network device. Correspondingly, in step 604, the target access network device receives the first message from the source access network device.

Optionally, the first message carries information used for transmitting the multicast data. Herein, the information used for transmitting the multicast data may specifically include information that can be used for identifying the multicast data (or the multicast group corresponding to the multicast data), such as a data identifier of the multicast data, an identifier of the multicast group, an identifier of a multicast session, an identifier of a multicast PDU session, an identifier of a multicast tunnel, identification information of the multicast data, or a QFI. The information used for transmitting the multicast data is described in detail in the foregoing method 400. For brevity, details are not described herein again.

In step 605, the target access network device sends a second message to the source access network device, where the second message indicates the established resource on the target access network device. Correspondingly, in step 605, the source access network device receives the second message from the target access network device.

In this embodiment, the established resource on the target access network device includes the resource established for handing over the UE 2 to the target access network device.

Related information for the UE 2 to access the target access network device includes access network tunnel information. The access network tunnel information may indicate an identifier of a forwarding tunnel used for forwarding the multicast data, or may indicate a transport layer address and a GTP tunnel endpoint identifier (GTP-TEID). In this embodiment, the forwarding tunnel may be used by the source access network device to forward the multicast data to the target access network device.

In step 606, the UE 2 is handed over from the source access network device to the target access network device.

In step 607, the source access network device forwards a packet of the multicast data to the target access network device through the forwarding tunnel. Correspondingly, in step 607, the target access network device receives the packet from the source access network device through the forwarding tunnel.

It should be understood that, in this embodiment, the source access network device may receive the multicast data through the transmission tunnel 0. Therefore, the packet that is of the multicast data and that is forwarded by the source access network device to the target access network device through the forwarding tunnel is a packet received through the transmission tunnel 0. Similar to that in the method 400, a packet that is of the multicast data and that is received by the source access network device through the transmission tunnel 0 may be denoted as a second packet. The packet that is of the multicast data and that is received by the target access network device from the source access network device through the forwarding tunnel is also a second packet.

Optionally, in step 608, the target access network device may send, to the UE 2, the second packet received from the source access network device. Correspondingly, in step 608, the UE 2 receives the second packet from the target access network device.

In step 609, the target access network device sends an N2 message to an AMF, where the N2 message is used for notifying that an air interface handover of the UE 2 is completed. Correspondingly, in step 609, the AMF receives the N2 message from the target access network device.

In step 610, the AMF sends a third message to an SMF, where the third message indicates the information used for transmitting the multicast data. Correspondingly, in step 610, the SMF receives the third message from the AMF.

The AMF may request, by using the third message, the SMF to configure data transmission on the transmission tunnel 2 of the UE 2. The transmission tunnel 2 may be used for transmitting the data requested by the UE 2, that is, the data #1. The data #1 corresponds to the information used for transmitting the multicast data, that is, the data #1 and the multicast data are data with same content. Therefore, it may also be considered that the third message is used for requesting the SMF to configure transmission of the multicast data.

The third message may be an N11 message.

It should be understood that specific processes of step 602 to step 607, and step 609 and step 610 are the same as specific processes of step 402 to step 409 in the foregoing method 400. Refer to the foregoing related descriptions of step 402 to step 409. For brevity, details are not described herein again.

In step 611, the SMF sends a fourth message to the UPF, where the fourth message is used for configuring transmission of the multicast data. Correspondingly, in step 611, the UPF receives the fourth message from the SMF.

The fourth message may be an N4 message.

In this embodiment, optionally, the fourth message may include one or more of the following items: an indication of a forwarding action on the data #1, the information used for transmitting the multicast data, an identification rule, a forwarding action rule, and related information of an end marker packet.

For details of the indication of the forwarding action on the data #1, the information used for transmitting the multicast data, and the forwarding action rule for the data #1, refer to the related description of step 410 in the foregoing method 400. For brevity, details are not described herein again.

In this embodiment, the end marker packet may include an end marker packet created for the multicast data transmitted on the transmission tunnel 0, and may further include an end marker packet created for other data transmitted on the transmission tunnel 2. For ease of differentiation, the end marker packet created for the multicast data is denoted as an end marker packet 1, and the end marker packet created for the other data transmitted on the transmission tunnel 2 is denoted as an end marker packet 2. If the other data transmitted on the transmission tunnel 2 includes unicast data, a specific process of creating an end marker packet 2 for the unicast data on the transmission tunnel 2 is the conventional technology. For brevity, details are not described herein. If the other data transmitted on the transmission tunnel 2 includes multicast data, a specific process of creating an end marker packet 2 for the multicast data on the transmission tunnel 2 is the same as a specific process of creating the end marker packet 1 for the multicast data in this embodiment, and may be implemented with reference to the process in this embodiment. It may be understood that when the other data transmitted on the transmission tunnel 2 includes both unicast data and multicast data, a plurality of end marker packets 2 may be created for the other data transmitted on the transmission tunnel 2. This is not limited in this application.

In this embodiment, the related information of the end marker packet may be specifically related information of the end marker packet 1. The related information of the end marker packet 1 may include, for example, an end marker packet 1 that carries identifier information of the transmission tunnel 2 or information that indicates to create the end marker packet 1.

It should be noted that a reason why the end marker packet 1 is transmitted on the transmission tunnel 0 but carries the identifier information of the transmission tunnel 2 is as follows:

In one aspect, there is a correspondence between the transmission tunnel 2 and the forwarding tunnel. Specifically, there may be a plurality of forwarding tunnels between the source access network device and the target access network device. The forwarding tunnels may be used for sending data of different terminal devices, for example, data of terminal devices other than the UE 2, or may be used for sending data transmitted by the UE 2 on another transmission tunnel. Each forwarding tunnel may correspond to a transmission tunnel of each UE. When the source access network device receives the end marker packet 1, to help the source access network device determine a specific forwarding tunnel used for sending the end marker packet 1 to the target access network device, the end marker packet 1 may carry the identifier information transmission tunnel 2, so that the source access network device determines, based on the identifier information of the transmission tunnel 2, the forwarding tunnel corresponding to the transmission tunnel 2. This can avoid impact on data transmission on a forwarding tunnel of another terminal device or on another forwarding tunnel of the UE 2 when the end marker packet 1 is sent on an incorrect forwarding tunnel. In another aspect, impact on data transmission of another terminal device (for example, the UE 1) in the multicast group can be avoided. The multicast data transmitted on the transmission tunnel 0 is sent to the multicast group corresponding to the multicast data. Therefore, the source access network device does not interrupt sending the multicast data on another transmission tunnel that is in the source cell and that belongs to the multicast group because the end marker packet 1 is received. If the end marker packet 1 carries the identifier information of the transmission tunnel 2, the source access network device that receives the end marker packet 1 can determine that the source access network device does not need to continue to forward the multicast data to the target access network device through the forwarding tunnel corresponding to the transmission tunnel 2. This does not affect receiving of the multicast data by another terminal device. Alternatively, the target access network device may determine, based on receiving of the end marker packet 1, not to receive the multicast data through the forwarding tunnel any longer.

In this embodiment of this application, the end marker packet 1 may be generated by the SMF and sent to the UPF, or the SMF may indicate the UPF to generate the end marker packet 1. This is not limited in this application. If the SMF indicates the UPF to generate the end marker packet 1, the SMF may send, to the UPF, information indicating to create the end marker packet 1. For example, the SMF may send the identifier information of the transmission tunnel 2 to the UPF, so that the UPF creates the end marker packet 1 that carries the identifier information of the transmission tunnel 2.

Optionally, the SMF may further indicate a specific transmission tunnel on which the UPF is to send the end marker packet 1. In this embodiment, the SMF may indicate the UPF to send the end marker packet 1 on the transmission tunnel 0. A sequence of the packet of the multicast data and the end marker packet that arrive at the source access network device through the transmission tunnel 0 is consistent with a sequence of sending the packet of the multicast data and the end marker packet by the UPF. Therefore, no out-of-order or packet loss case occurs. Optionally, the source access network device may determine not to forward the multicast data to the target access network device through the forwarding tunnel any longer after receiving the end marker packet 1.

In step 612, the UPF sends a second end marker packet to the source access network device. Correspondingly, in step 612, the source access network device receives the second end marker packet from the UPF.

In step 613, the source access network device sends a first end marker packet to the target access network device. Correspondingly, in step 613, the target access network device receives the first end marker packet from the source access network device.

As described above, the UPF may send the end marker packet 1 for the multicast data on the transmission tunnel 0, and may further send the end marker packet 2 for the other data on the transmission tunnel 2. It should be understood that the end marker packet 1 and the end marker packet 2 are not necessarily sent simultaneously, and a sequence of sending the end marker packet 1 and the end marker packet 2 is not limited in this application.

The source access network device may send the first end marker packet to the target access network device through the forwarding tunnel. Similar to that in the embodiment shown in the method 400, the first end marker packet sent by the source access network device to the target access network device may be a second end marker packet that is for the multicast data and that is received from the UPF, or may be an end marker packet 2 sent for the unicast data based on a second end marker packet (that is, the end marker packet 1) for the multicast data and an end marker packet (that is, the end marker packet 2) for the unicast data, where the second end marker packet and the end marker packet are received from the UPF. In other words, the first end marker packet and the second end marker packet may be a same end marker packet, or may be different end marker packets. This is not limited in this application.

In a possible manner, the UPF sends the end marker packet 1 for the multicast data on the transmission tunnel 0 (for example, in a PDU session 0), and may further send the end marker packet 2 for the other data on the transmission tunnel 2 (for example, in a PDU session 2). The source access network device may directly forward the received end marker packet 1 and end marker packet 2 to the target access network device. After receiving the end marker packet 1 and the end marker packet 2, the target access network device may determine not to receive data through the forwarding tunnel any longer.

In another possible manner, the UPF may send the end marker packet 1 for the multicast data on the transmission tunnel 0 (for example, in a multicast dedicated QoS flow in a PDU session 0), and may further send the end marker packet 2 for the other data (for example, unicast data transmitted in a unicast QoS flow) on the transmission tunnel 2 (for example, in a unicast QoS flow in a PDU session 2). After receiving the end marker packet 1 and the end marker packet 2, the source access network device may send the end marker packet 2 in the unicast QoS flow to the target access network device, but does not send the end marker packet 1 in the multicast dedicated QoS flow to the target base station. After receiving the end marker packet 2, the target access network device may determine not to receive data through the forwarding tunnel any longer. In this case, before the source access network device forwards the end marker packet 2, it needs to ensure that packets transmitted by using the multicast dedicated QoS flow and the unicast QoS flow no longer need to be forwarded by the source access network device, for example, are sent after the end marker packet 1 and the end marker packet 2 are received from the UPF.

In the latter implementation, the source access network device does not send the end marker packet for the multicast data, namely, the end marker packet 1, to the target access network device, but sends only the end marker packet for the unicast data, namely, the end marker packet 2, to the target access network device. Therefore, the target access network device may process the end marker packet according to a method in the conventional technology.

Optionally, the target access network device may release the forwarding tunnel between the target access network device and the source access network device after receiving the first end marker packet, or may release the forwarding tunnel between the target access network device and the source access network device after sending a resource release request message in subsequent step 619. This is not limited in this application.

It should be noted that the transmission tunnel used by the UPF to send the second end marker packet to the source access network device and a transmission tunnel used by the UPF to send the second packet are a same transmission tunnel, and usually, a sequence of receiving the packets by the source access network device is consistent with a sequence of sending the packets by the UPF. Therefore, after receiving the first end marker packet, the target access network device may stop receiving the second packet from the source access network device.

In step 614, the UPF sends a packet of the data #1 to the target access network device. Correspondingly, in step 614, the target access network device receives the packet from the UPF.

After sending the end marker packet 1 to the target access network device, the UPF may determine that the target access network device no longer needs to receive the packet of the multicast data through the forwarding tunnel. Then, the UPF may send the packet of the data #1 through a downlink user connection between the UPF and the target access network device. Similar to that in the method 400, the packet of the data #1 may be denoted as a first packet. Due to a handover of the UE 2, a transmission path of the transmission tunnel 2 changes. The UPF may send the first packet to the target access network device through the transmission tunnel 2. In addition, other data originally to be transmitted on the transmission tunnel 2 may continue to be sent to the target access network device.

In step 615, the target access network device sends the first packet to the UE 2.

After receiving the end marker packet 1, the target access network device may send, to the UE 2, the first packet received on the transmission tunnel 2.

In step 616, the UPF sends an N4 message to the SMF. The N4 message may be understood as a response to the fourth message in step 611, and may indicate that configuration of multicast data transmission of the UE 2 is completed. Correspondingly, in step 616, the SMF receives the N4 message from the UPF.

In step 617, the SMF sends an N11 message to the AMF. The N11 message may be understood as a response to the third message in step 610, and may indicate that path switching is completed. Correspondingly, in step 617, the AMF receives the N11 message from the SMF.

Corresponding to step 610, the N11 message may be an $N_{smf}$ PDU session update session management context response ($N_{smf}$_PDUSession_UpdateSMContext Response) message.

In step 618, the AMF may send an N2 message to the target access network device. The N2 message may be understood as a response to the N2 message in step 609, and may indicate that path switching is completed. Correspondingly, in step 618, the target access network device receives the N2 message from the AMF.

It should be understood that, same as step 418 in the foregoing method 400, step 618 may be a step performed in an Xn-based handover scenario. In an N2-based handover scenario, step 618 is not necessarily performed.

Corresponding to step 609, the N2 message may be a path switch response message.

In step 619, the target access network device sends the resource release request message to the source access network device, to request to release a context of the UE 2. Correspondingly, in step 619, the source access network device receives the resource release request message from the target access network device.

In this embodiment, the context of the UE 2 may be, for example, a resource of the forwarding tunnel. Therefore, releasing the context of the UE 2 may include releasing the resource of the forwarding tunnel.

It should be understood that step 619 may be a step performed in the Xn-based handover scenario. In the N2-based handover scenario, step 619 is not necessarily performed.

In this way, the forwarding tunnel between the target access network device and the source access network device is released.

According to the foregoing method, the UE 2 completes the handover when receiving the multicast data. When requesting the handover from the target access network device, the source access network device sends, to the target access network device, the information used for transmitting the multicast data, so that the target access network device forwards the multicast data to the UE 2 based on the information, and sends the data #1 whose content is the same as that of the multicast data to the UE 2 after path switching, thereby avoiding a packet loss of the multicast data, and helping obtain complete data. This ensures that the UE 2 is handed over without a delay in a process of receiving the multicast data, and also ensures data transmission performance.

Figures 7A, 7B:
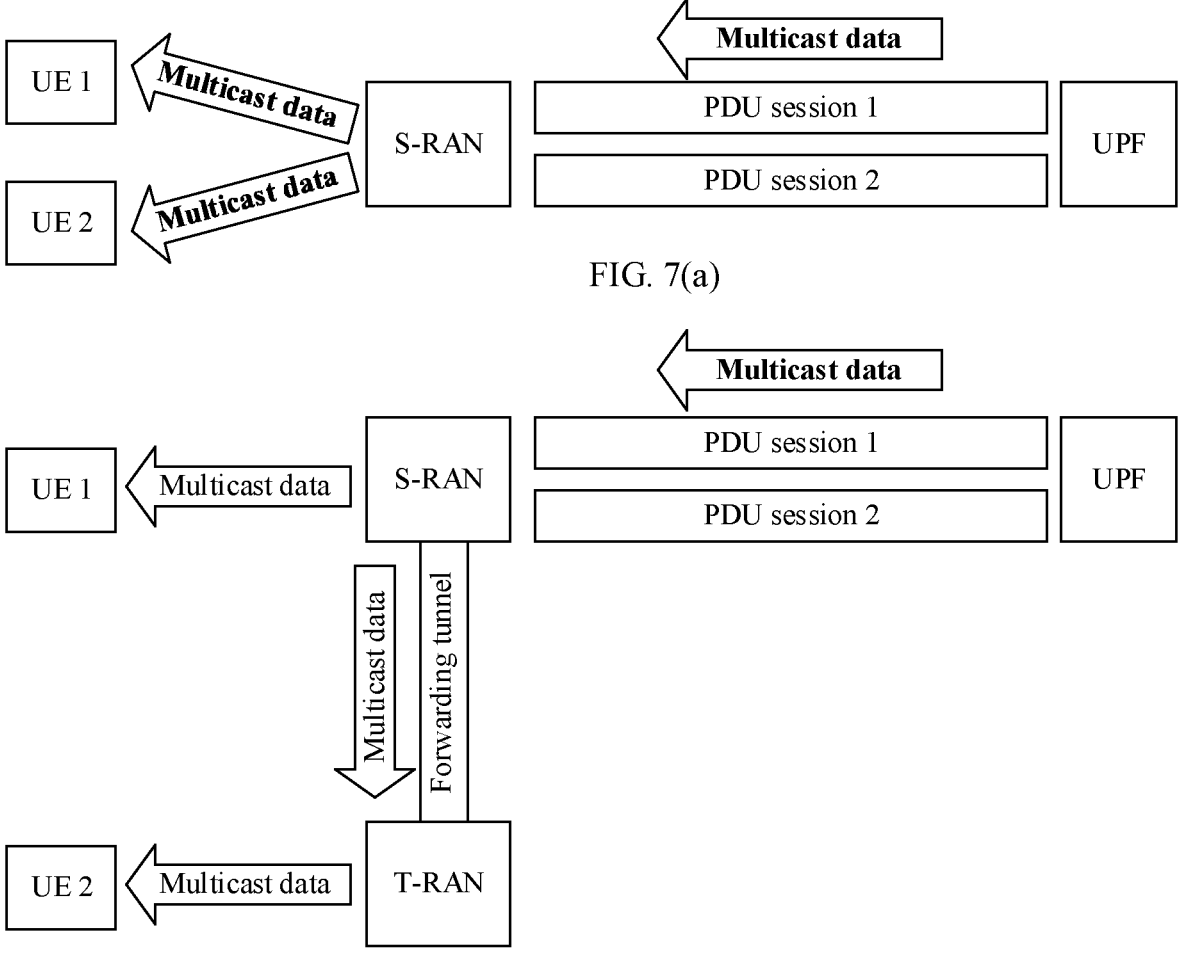
FIG. 7(a) to FIG. 7(d) are schematic diagrams of a handover method according to another embodiment of this application.
Figures 7C, 7D:
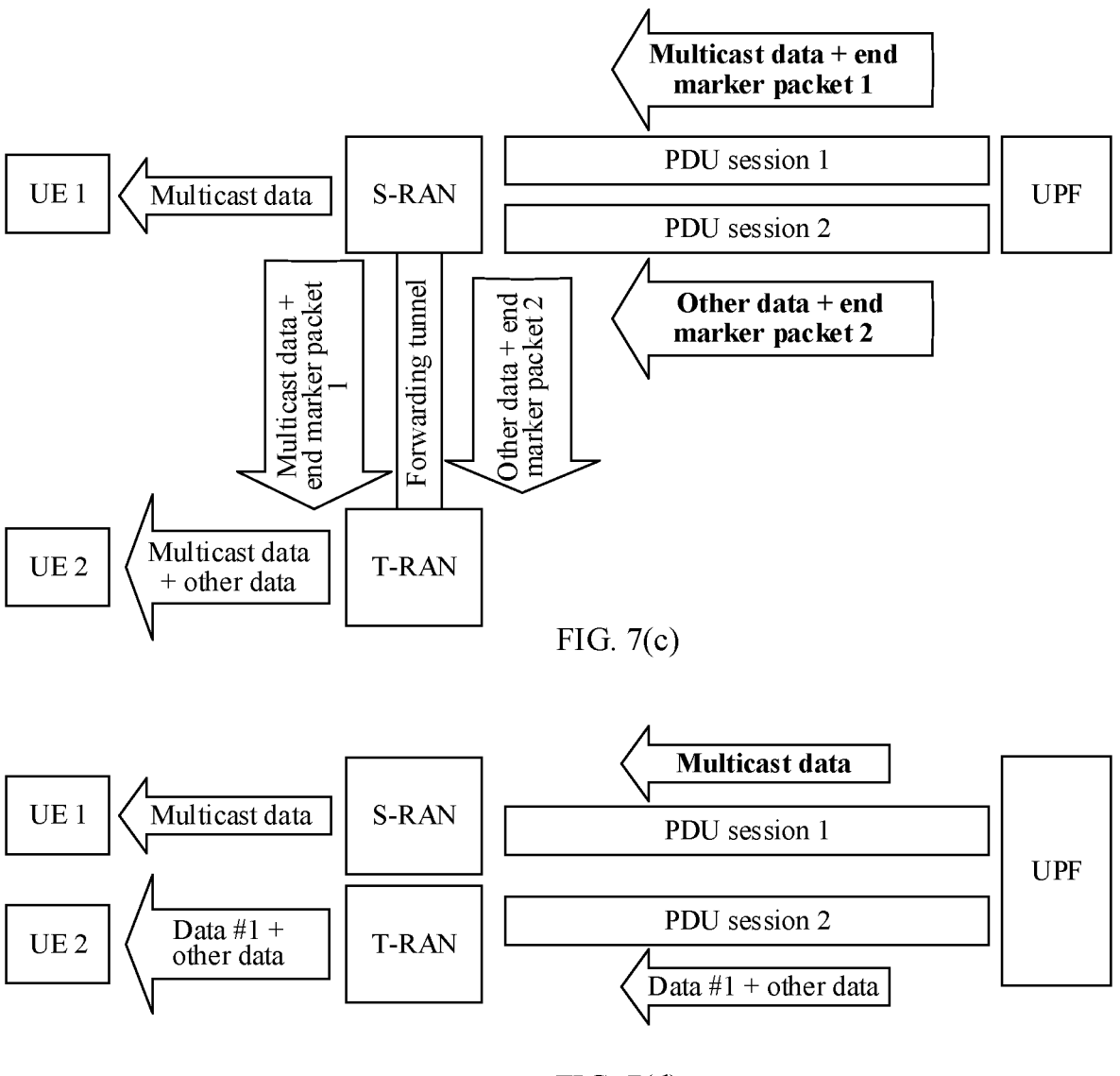

To better understand this embodiment, the following describes the foregoing method 600 with reference to examples shown in FIG. 7(*a*) to FIG. 7(*d*). In the examples shown in FIG. 7(*a*) to FIG. 7(*d*), a transmission tunnel is a PDU session. A specific form of a transmission tunnel 0 may be a PDU session 1 of UE 1, and a specific form of a transmission tunnel 2 may be a PDU session 2 of UE 2.

As shown in FIG. 7(*a*) to FIG. 7(*d*), in FIG. 7(*a*), both the UE 1 and the UE 2 are terminal devices camping on a source cell. In this case, both the PDU session 1 and the PDU session 2 are transmission tunnels established between a source access network device and a UPF. The UPF may send multicast data to the source access network device by using the PDU session 1 of the UE 1. The source access network device may send the received multicast data to terminal devices in a multicast group that is in the source cell and that corresponds to the multicast data, for example, the terminal devices include the UE 1 and the UE 2.

In FIG. 7(*b*), the UE 2 is handed over from the source access network device to a target access network device, or is handed over from the source cell to a target cell. The source access network device may forward a packet of the multicast data (for example, the foregoing second packet) received in the PDU session 1 to the target access network device through a forwarding tunnel between the source access network device and the target access network device. Then, the target access network device may send, to the UE 2, the second packet received through the forwarding tunnel.

In FIG. 7(*c*), the UPF may send an end marker packet 1 for the multicast data in the PDU session 1, and may further send an end marker packet 2 for other data in the PDU session 2. The source access network device may forward the end marker packet 1 and the end marker packet 2 to the target access network device through the forwarding tunnel.

It should be understood that the figure shows merely an example. The end marker packet 1 and the end marker packet 2 are not necessarily sent simultaneously, and a sequence of sending the end marker packet 1 and the end marker packet 2 is not limited in this application.

In FIG. 7(*d*), a difference from FIG. 7(*a*), FIG. 7(*b*), and FIG. 7(*c*) lies in that, a transmission path of the PDU session 2 changes, and is no longer a transmission tunnel established between the UPF and the source access network device, but a transmission tunnel established between the UPF and the target access network device. The UPF may send a packet of data #1 (for example, the foregoing first packet) and a packet of other data to the target access network device by using the PDU session 2. The target access network device sends the received packet of the data #1 and the received packet of the other data to the UE 2.

In this way, when the UE 2 is handed over to the target access network device, complete receiving of the multicast data can still be ensured.

Figure 8:
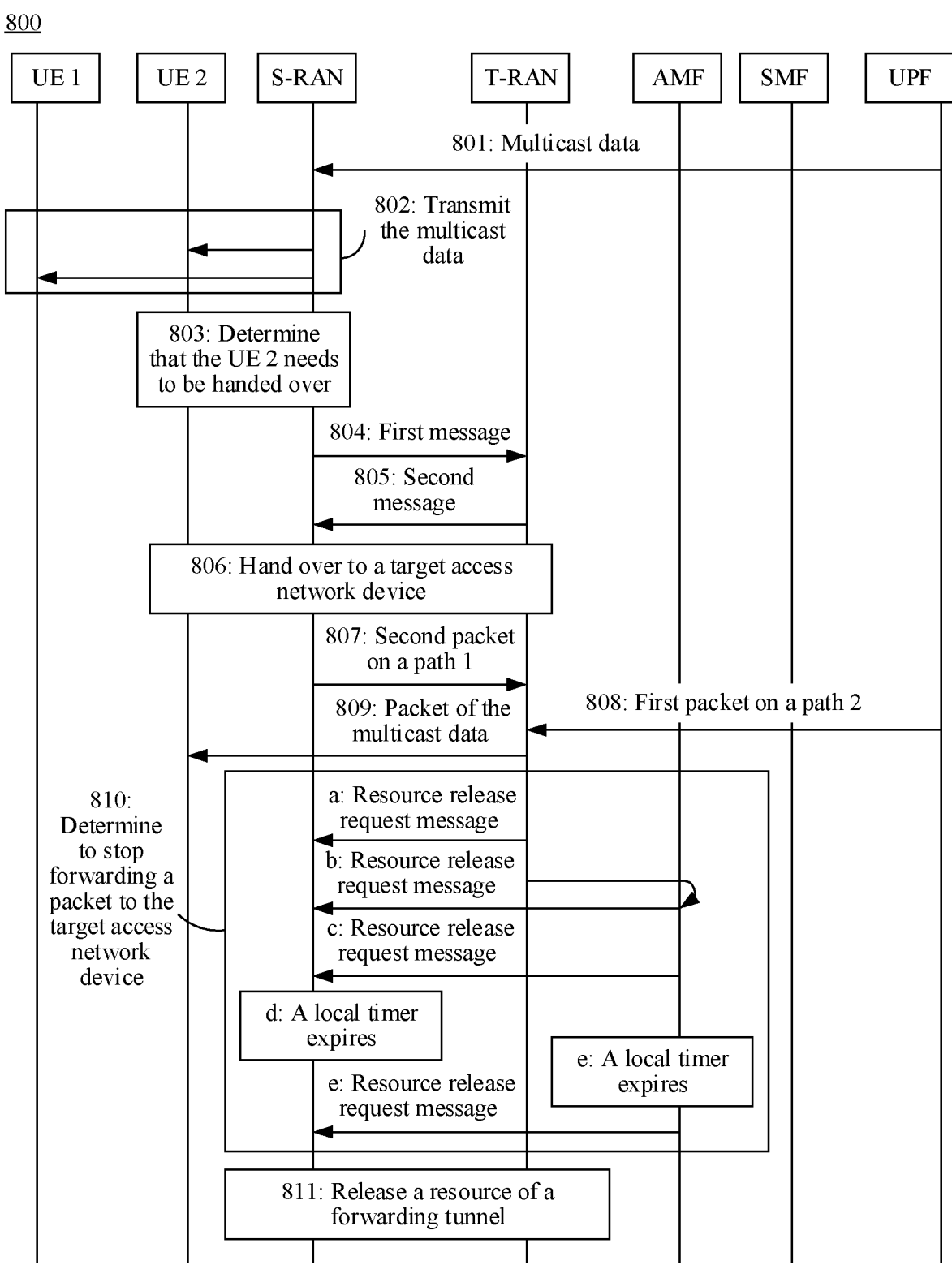
FIG. 8 is a schematic flowchart of a handover method according to still another embodiment of this application.

FIG. 8 is a schematic flowchart of a handover method 800 according to still another embodiment of this application. As shown in FIG. 8, the method 800 may include steps 801 to 811. The following describes the steps in the method 800 in detail.

In step 801, a UPF sends multicast data to a source access network device and a target access network device. Correspondingly, in step 801, the source access network device and the target access network device each receive the multicast data from the UPF.

It is assumed that content of data requested by UE 1 in a source cell and content of data requested by UE 2 in the source cell are the same. An application server may send the requested data to the UPF based on a data request of the UE in the source cell. The UPF may send the data to the source access network device in an IP multicast (IP multicast) manner or through a multicast transmission tunnel. The data is the multicast data.

In addition, a terminal device in the target cell may also request the multicast data. The UPF may also send the multicast data to the target access network device in an IP multicast manner or through a multicast transmission tunnel. In this embodiment, for ease of differentiation and description, a packet that is of the multicast data and that is received by the target access network device from the UPF without being forwarded by the source access network device is denoted as a first packet.

In an example, the UPF sends the multicast data in an IP multicast manner.

It should be understood that, in an IP multicast technology, a source host may send data to a plurality of target hosts. The plurality of target hosts may constitute a multicast group. When a target host in the multicast group requests data, the source host needs to send only one copy of the data and set a destination address of the data to an address of the multicast group. In this way, each member of the multicast group can receive a copy of the data sent by the source host.

In this embodiment, in a solution, if the UPF expects to send the multicast data to the source access network device in an IP multicast manner, the UPF may set a destination address of the multicast data to an address of the source access network device. If the UPF expects to send the multicast data to another device in an IP multicast manner, the UPF may alternatively set a destination address of the multicast data to an address of the another device. Alternatively, in another solution, if the UPF expects to send the multicast data to the source access network device in an IP multicast manner, the UPF may set a destination address of the multicast data to an IP multicast address corresponding to the multicast data. If the UPF expects to send the multicast data to another device in an IP multicast manner, the UPF may alternatively set a destination address of the multicast data to an IP multicast address corresponding to the multicast data.

The multicast data may have a plurality of destination addresses. The multicast data may arrive at different devices through different paths. For example, a path through which the multicast data sent by the UPF arrives at the source access network device after being forwarded by one or more routers may be denoted as a path 1. A path through which the multicast data sent by the UPF arrives at the target access network device after being forwarded by one or more routers may be denoted as a path 2. The destination address to which the UPF sends the multicast data is not limited in this application. When sending the multicast data to the source access network device, the UPF may further send the multicast data to another device.

The UPF needs to send only one copy of the data, and the data can arrive at a plurality of devices. Therefore, it may be considered that packets sent by the UPF are naturally synchronized. However, in paths through which the packets are sent to different access network devices, the packets are forwarded by different routers, and arrival times may be different. However, it may be understood that, provided that the UPF sends a packet, the packet arrives at the access network devices when a transmission path is normal.

In another example, the UPF sends the multicast data through a multicast transmission tunnel. The multicast data may arrive at the source access network device through a multicast transmission tunnel between the UPF and the source access network device.

As described above, for example, the multicast transmission tunnel may include but is not limited to, a multicast dedicated PDU session, a multicast dedicated tunnel, a multicast dedicated QoS flow, a unicast QoS flow carrying indication information for transmitting the multicast data, or another tunnel that can be specially used for transmitting the multicast data.

There is a possibility that when the UPF sends data to different access network devices through different multicast transmission tunnels, sequence numbers of packets on the multicast transmission tunnels are synchronous (for example, for different access network devices, sequence numbers of packets sent at a moment are the same).

There is another possibility that the UPF may alternatively send data to different access network devices asynchronously through different multicast transmission tunnels (for example, for different access network devices, sequence numbers of data sent at a moment are different). However, the UPF maintains a sequence number of a packet from the UPF to each access network device, in other words, maintains a sequence number of a packet on each multicast transmission tunnel. In this way, the UPF can dynamically adjust a data transmission rate based on different path statuses.

It may be understood that if sequence numbers of multicast data carried on different multicast transmission tunnels are the same, content of payload parts of packets carried on different multicast transmission tunnels may be the same.

In step 802, the source access network device sends the multicast data to each UE in the multicast group. Correspondingly, in step 802, each UE in the multicast group receives the multicast data.

In step 803, the source access network device determines, based on a measurement report reported by the UE 2, that the UE 2 needs to be handed over.

In step 804, the source access network device sends a first message to the target access network device, where the first message is used for requesting to establish a resource for handing over the UE 2 to the target access network device. Correspondingly, in step 804, the target access network device receives the first message from the source access network device.

Optionally, the first message carries information used for transmitting the multicast data.

In step 805, the target access network device sends a second message to the source access network device, where the second message indicates the established resource on the target access network device. Correspondingly, in step 805, the source access network device receives the second message from the target access network device.

In this embodiment, the established resource on the target access network device may include the resource established for handing over the UE 2 to the target access network device.

Optionally, the second message carries access network tunnel information, and the access network tunnel information may indicate an identifier of a forwarding tunnel used for forwarding the multicast data. In this embodiment, the forwarding tunnel may be used by the source access network device to forward the multicast data to the target access network device. For example, the forwarding tunnel may be a forwarding tunnel established for the multicast transmission tunnel, or the forwarding tunnel may be used for transmitting data on the multicast transmission tunnel.

In step 806, the UE 2 is handed over from the source access network device to the target access network device.

In step 807, the source access network device forwards, to the target access network device through the forwarding tunnel, a packet received on the path 1. Correspondingly, in step 807, the target access network device receives the packet from the source access network device through the forwarding tunnel.

For ease of differentiation and description, the packet received by the target access network device from the source access network device through the forwarding tunnel is denoted as, for example, a second packet. The second packet is also a packet of the multicast data.

The target access network device may receive packets of the multicast data from both the source access network device and the UPF in a period of time. The packet that is of the multicast data and that is received from the source access network device is the second packet transmitted through the path 1, and the packet that is of the multicast data and that is received from the UPF is the first packet transmitted through the path 2.

Herein, the path 1 may include one or more routers between the UPF and the source access network device, or may be a multicast transmission tunnel between the UPF and the source access network device. Similarly, the path 2 may include one or more routers between the UPF and the target access network device, or may be a multicast transmission tunnel between the UPF and the target access network device. This is not limited in this application.

In step 809, the target access network device sends the packet to the UE 2.

As described above, the path 1 and the path 2 are different paths. For example, routers may be different, and quantities of routers may also be different. For another example, transmission tunnels are different. As a result, packet transmission rates on the path 1 and the path 2 may be different. In this embodiment, the target access network device may locally buffer the packet received on the path 2. A specific packet to be forwarded to the UE 2 is determined based on the comparison of the value of sequence numbers of the packets received on the two paths.

For example, when a sequence number (for example, a first sequence number) of the second packet received from the source access network device is less than a sequence number (for example, denoted as a third sequence number) of the first packet received on the path 2, it may be determined that a transmission rate of the packet on the path 2 is higher. A packet corresponding to a sequence number between the first sequence number and the third sequence number is not received. If the forwarding tunnel is released in this case, the target access network device may lose some packets. Therefore, when the first sequence number is less than the third sequence number, the target access network device may continue to forward the second packet from the source access network device.

For example, when the first sequence number of the second packet received from the source access network device is greater than or equal to the third sequence number of the first packet received on the path 2, it may be determined that a packet that is from the source access network device and whose sequence number is before the sequence number of the first packet received on the path 2 has been successfully received. If the forwarding tunnel is released in this case, the target access network device loses no packet. Therefore, when the first sequence number is greater than or equal to the third sequence number, the target access network device may forward the first packet from the path 2, and does not need to receive the second packet from the source access network device through the forwarding tunnel.

In step 810, the source access network device stops forwarding a packet to the target access network device.

The source access network device may stop forwarding the packet to the target access network device based on a plurality of different conditions.

In an implementation, when determining that the sequence number of the packet received on the path 1 is greater than or equal to the sequence number of the packet received on the path 2, the target access network device sends a resource release request message to the source access network device, to request to release a context of the UE 2. The source access network device may stop forwarding the packet to the target access network device based on the received resource release request message.

Herein, the target access network device may directly send the resource release request message to the source access network device, or may send the resource release request message to the source access network device through forwarding by a core network device. This depends on whether the target access network device and the source access network device support communication through an Xn interface. For example, if the target access network device and the source access network device support communication through the Xn interface, the target access network device may directly send the resource release request message to the source access network device. The resource release request message is an Xn interface message. If the target access network device and the source access network device do not support communication through the Xn interface, the target access network device may send the resource release request message to the source access network device through a core network element such as an AMF. The resource release request message is an N2 message.

In another implementation, the core network device may determine whether to release a context resource of the UE 2. For example, the AMF may send the resource release request message to the source access network device. The source access network device may stop forwarding the packet to the target access network device based on the resource release request message, and release the context of the UE 2.

In still another implementation, the source access network device may determine, based on timing duration of a local timer, whether to release the context of the UE 2. For example, the source access network device may automatically release the context of the UE 2 after the local timer times out (in other words, expires). In this way, the source access network device stops forwarding the packet to the target access network device.

In yet another implementation, the core network device may determine, based on timing duration of a timer, whether to release the context of the UE 2. For example, after timing duration of a local timer reaches a preset threshold, the AMF may send the resource release request message to the source access network device, to indicate the source access network device to release the context of the UE 2. The source access network device may stop forwarding the packet to the target access network device based on the resource release request message, and release the context of the UE 2.

Optionally, the resource release request message carries handover completion information. The source access network device may determine, based on the handover completion information, that the context of the UE 2 can be released. The source access network device may stop forwarding the packet to the target access network device based on the handover completion information, and release the context of the UE 2.

Optionally, the method 800 further includes step 811: The source access network device releases the context of the UE 2.

As described above, releasing the context of the UE 2 may include releasing a resource of the forwarding tunnel between the source access network device and the target access network device.

According to the foregoing method, the UE 2 implements a cell handover when receiving the multicast data. When requesting the handover from the target access network device, the source access network device sends, to the target access network device, the information used for transmitting the multicast data, so that the target access network device forwards the multicast data to the UE 2 based on the information, and sends the data #1 whose content is the same as that of the multicast data to the UE 2 after path switching, thereby avoiding a packet loss of the multicast data, and helping obtain complete data. This ensures that the UE 2 is handed over without a delay in a process of receiving the multicast data, and also ensures data transmission performance.

Figure 9:
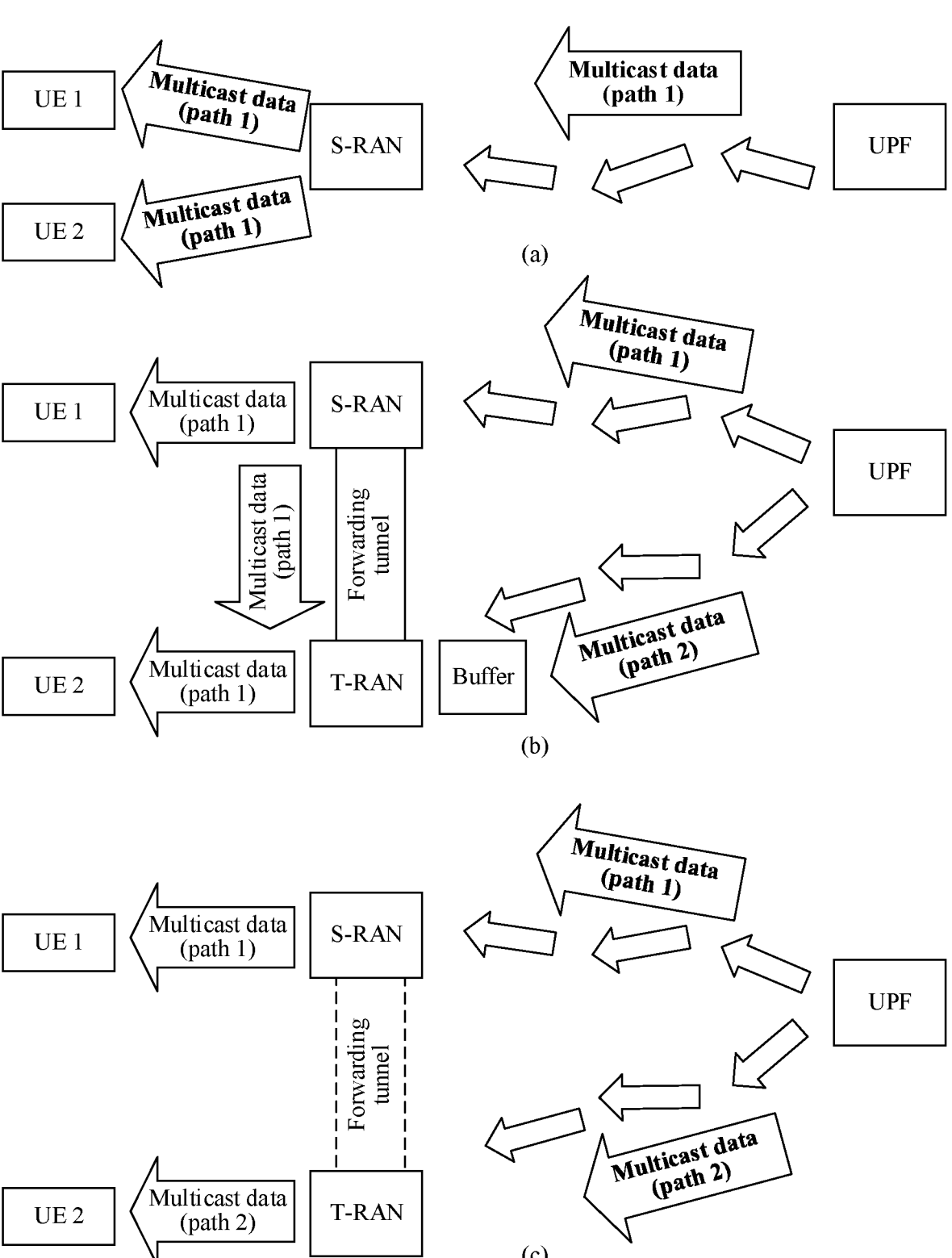
FIG. 9 is a schematic diagram of a handover method according to still another embodiment of this application.

To better understand this embodiment, the following describes the foregoing method 800 with reference to an example shown in FIG. 9. In the example shown in FIG. 9, a UPF sends multicast data in an IP multicast manner.

As shown in (a) of FIG. 9, both UE 1 and UE 2 are terminal devices camping on a source cell. In this case, the multicast data may arrive at a source access network device after being forwarded by one or more routers between the UPF and the source access network device. In other words, the UPF may send the multicast data to the source access network device through a path 1. The source access network device may send the received multicast data to terminal devices in a multicast group that is in the source cell and that corresponds to the multicast data, for example, the terminal devices include the UE 1 and the UE 2.

As shown in (b) of FIG. 9, the UE 2 is handed over from the source access network device to a target access network device, or is handed over from the source cell to a target cell. The source access network device may forward a second packet received on the path 1 to the target access network device through a forwarding tunnel between the source access network device and the target access network device. In addition, the multicast data may arrive at the target access network device after being forwarded by one or more routers between the UPF and the target access network device. In other words, the UPF may send the multicast data to the target access network device through a path 2. The target access network device may receive a first packet through the path 2.

If a sequence number of the second packet received by the target access network device through the path 2 is greater than a sequence number of the first packet that is transmitted on the path 1 and that is received through the forwarding tunnel, the target access network device may send the packet received through the forwarding tunnel to the UE 2, and may locally buffer the packet received through the path 2.

If a sequence number of the second packet received by the target access network device through the path 2 is less than or equal to a sequence number of the first packet received through the forwarding tunnel, the target access network device may stop receiving the second packet through the forwarding tunnel.

In (c) in FIG. 9, the target access network device may send the locally buffered first packet to the UE 2, continue to receive a subsequent packet through the path 2, and forward the received packet to the UE 2.

In this way, when the UE 2 is handed over to the target access network device, complete receiving of the multicast data can still be ensured. According to the foregoing method, the UE 2 completes the handover when receiving the multicast data. When requesting the handover from the target access network device, the source access network device sends, to the target access network device, the information used for transmitting the multicast data, so that the target access network device forwards the multicast data to the UE 2 based on the information, and sends data #1 whose content is the same as that of the multicast data to the UE 2 after path switching, thereby avoiding a packet loss of the multicast data, and helping obtain complete data. This ensures that the UE 2 is handed over without a delay in a process of receiving the multicast data, and also ensures data transmission performance.

FIG. 10 is a schematic flowchart of a handover method 1000 according to an embodiment of this application. As shown in FIG. 10, the method 1000 may include steps 1001 to 1012. The following describes the steps in the method 1000 in detail.

In step 1001, terminal devices that belong to a same multicast group in a source cell receive multicast data.

It should be understood that a specific process of step 1001 is the same as a specific process of step 401 in the foregoing method 400. For brevity, details are not described herein again.

In this embodiment of this application, each terminal device may receive the multicast data through an existing transmission tunnel (for example, in a PDU session), or may establish a transmission tunnel based on transmission of the multicast data and receive the multicast data through the newly established transmission tunnel.

Optionally, before the step 1001, the method further includes step 1002: Each UE in the source cell establishes a transmission tunnel of the UE.

For example, the terminal devices in the source cell may include but are not limited to UE 1 and UE 2. Each terminal device may establish a transmission tunnel of the terminal device, to transmit data. For example, the UE 1 may establish a transmission tunnel 1, and the UE 2 may establish a transmission tunnel 2. For a specific process in which each UE establishes the transmission tunnel, refer to the conventional technology. For brevity, details are not described herein.

In this embodiment, the transmission tunnel 1 may be a unicast transmission tunnel, or may be a multicast transmission tunnel. Similarly, the transmission tunnel 2 may be a unicast transmission tunnel, or may be a multicast transmission tunnel. This is not limited in this application.

It is assumed that content of data requested by the UE 1 in the source cell and content of data requested by the UE 2 in the source cell are the same. Therefore, a UPF may combine data with same content on the transmission tunnel 1 and the transmission tunnel 2, and send the data to the UE 1 and the UE 2 in the source cell in a multicast manner. The UE 1 and the UE 2 constitute a multicast group. The UPF sends data to the multicast group in a multicast manner. The data corresponding to the multicast group may be referred to as multicast data.

In this embodiment, for the terminal device that receives the multicast data in the source cell, the multicast data may be transmitted through the transmission tunnel of either the UE 1 or the UE 2, or the multicast data may be transmitted through a multicast shared transmission tunnel that is established by a network and that is specially used for transmitting the multicast data. This is not limited in this application.

For ease of description, in this embodiment, it is assumed that a transmission tunnel for transmitting the multicast data is a transmission tunnel 0. The transmission tunnel 0 may be, for example, the transmission tunnel 1 of the UE 1, or may be the foregoing separately established multicast shared transmission tunnel.

For details of step 1002, refer to the detailed description of step 602 in the foregoing method 600. For brevity, details are not described herein again.

In step 1003, a source access network device determines, based on a measurement report reported by the UE 2, that the UE 2 needs to be handed over.

In step 1004, the source access network device sends an N2 message to an AMF, where the N2 message is used for notifying the AMF that the UE 2 is to be handed over to a target access network device. Correspondingly, in step 1004, the AMF receives the N2 message from the source access network device.

Optionally, the N2 message includes a list of transmission tunnels (for example, PDU sessions) established on the target access network device and list information of a QoS flow successfully established in a corresponding session.

In addition, the N2 message may further carry a handover indication.

In an implementation, the handover indication indicates that the UE 2 is to be handed over from the source access network device to the target access network device.

In another implementation, the handover indication not only indicates that the UE 2 is to be handed over from the source access network device to the target access network device, but also indicates that the UE 2 is to switch from receiving multicast data to receiving unicast data.

In this embodiment, data received by the UE 2 in the source cell is the multicast data, and data received after the UE 2 is switched to receiving unicast data is data #1. It should be understood that the data #1 is data whose content is the same that of the multicast data. Actually, the data #1 is the data requested by the UE 2, but is filtered out because the multicast data whose content is the same that of the data #1 is transmitted in the source cell. After determining that the UE 2 is to be handed over to the target access network device, the source access network device may determine not to send the multicast data but to send the data #1 to the UE 2.

In a possible design, the N2 message is an N2 PDU session request message.

In step 1005, the AMF sends a third message to an SMF, where the third message indicates information used for transmitting the multicast data, and the third message carries the handover indication. Correspondingly, in step 1005, the SMF receives the third message from the AMF.

The AMF may request, by using the third message, the SMF to configure data transmission on the transmission tunnel of the UE 2. The transmission tunnel may be used for transmitting the data requested by the UE 2, that is, the data #1. The data #1 corresponds to the information used for transmitting the multicast data, that is, the data #1 and the multicast data are data with same content. Therefore, it may also be considered that the third message is used for requesting the SMF to configure transmission of the multicast data.

The third message may be an N11 message.

For a specific manner of determining, by the SMF based on the third message, the information used for transmitting the multicast data, refer to the related description in the foregoing method 400. For brevity, details are not described herein again.

As described above, in an implementation, the handover indication may indicate that the UE 2 is to be handed over from the source access network device to the target access network device. In this case, the SMF may determine, based on the handover indication, not to filter out the data #1 of the UE 2. In other words, the SMF may also determine that the UE 2 is switched from receiving multicast data to receiving unicast data.

In another implementation, the handover indication not only indicates that the UE 2 is to be handed over from the source access network device to the target access network device, but also indicates that the UE 2 is to switch from receiving multicast data to receiving unicast data.

Further, the SMF may determine, based on the information used for transmitting the multicast data, a specific transmission tunnel to which the data #1 is to be mapped. Because the SMF prestores a mapping relationship between multicast data and a transmission tunnel, after receiving the N11 message, the SMF may determine the transmission tunnel for the data #1 based on the information used for transmitting the multicast data, in other words, may determine the specific transmission tunnel to which the data #1 is to be mapped. As described above, the data #1 is originally to be transmitted by using a PDU session 2, but is not transmitted because the data #1 is filtered out. However, based on this, the SMF may prestore a correspondence between the multicast data and the PDU session 2. Therefore, after determining not to filter out the data #1, the SMF may determine to map the data #1 to the PDU session 2 for transmission.

Alternatively, the SMF may not determine or may not indicate, to the UPF, the specific transmission tunnel to which the data #1 is to be mapped, but sends the mapping relationship between the multicast data and the transmission tunnel to the UPF, and the UPF determines the specific transmission tunnel to which the data #1 is to be mapped.

In a possible design, the third message is an $N_{smf}$ PDU session update session management context request ($N_{smf}$_PDUSession_UpdateSMContext Request) message.

In step 1006, the SMF sends a fourth message to the UPF, where the fourth message is used for requesting to modify an N4 session. Correspondingly, in step 1006, the UPF receives the fourth message from the SMF.

Specifically, the fourth message is used for requesting to switch the UE 2 from receiving the multicast data to receiving the data #1. This may be implemented based on a configuration of the UPF. In an implementation, the UPF may not filter out the data #1, but map the data #1 to the transmission tunnel indicated by the SMF for transmission.

The fourth message may be an N4 message.

In a possible design, the fourth message is an N4 session modification request message.

In step 1007, the UPF sends an N4 message to the SMF, where the N4 message indicates that an N4 session modification has been completed. Correspondingly, in step 1007, the SMF receives the N4 message from the UPF.

The N4 message may be understood as a response to the fourth message in step 1006, and may be used for notifying the SMF that the N4 session modification has been completed. More specifically, the N4 message may be used for notifying the SMF that the UE 2 has been switched from receiving multicast data to receiving unicast data.

In a possible design, the N4 message is an N4 session modification response message.

In step 1008, the SMF sends an N11 message to the AMF. Correspondingly, in step 1008, the AMF receives the N11 message from the SMF.

In step 1009, the AMF sends an N2 message to the source access network device. Correspondingly, in step 1009, the source access network device receives the N2 message from the AMF.

The N11 message may be understood as a response to the third message in step 1005, and may be used for notifying the SMF that the UE 2 has been switched from receiving multicast data to receiving unicast data. The AMF may further send the N2 message to the source access network device based on receiving of the N11 message, to notify the source access network device that a core network has switched the UE 2 from receiving multicast data to receiving unicast data. Based on this, the source access network device may determine not to send the multicast data but to send the unicast data to the UE 2.

In a possible design, the N11 message is an $N_{smf}$ PDU session update session management context response ($N_{smf}$_PDUSession_UpdateSMContext Response) message.

In a possible design, the N2 message is a PDU session response message.

In step 1010, the source access network device sends an RRC reconfiguration message to the UE 2, where the RRC reconfiguration message indicates the UE 2 not to receive the multicast data any longer. Correspondingly, in step 1010, the UE 2 receives the RRC reconfiguration message from the source access network device.

In another aspect, the UPF no longer filters out the data #1 based on the fourth message received from the SMF in step 1006.

In step 1011, the UPF sends the data #1 to the source access network device by using the PDU session 2. Correspondingly, in step 1011, the source access network device receives the data #1 from the UPF by using the PDU session 2.

As described above, the UPF may map, based on an indication of the SMF, the data #1 to the PDU session 2 for transmission. Alternatively, the UPF may determine, based on the mapping relationship that is between multicast data and a transmission tunnel and that is sent by the SMF, a specific transmission tunnel to which the data #1 is to be mapped. A specific determining process is the same as a determining process of the SMF. For brevity, details are not described herein again.

After the UPF sends the data #1 to the source access network device by using the PDU session 2, the source access network device may receive the data #1 in the PDU session 2, but may not receive a notification notifying that the UPF sends unicast data to the UE 2. Therefore, the source access network device still does not learn that data to be sent to the UE 2 has been switched from the multicast data (that is, the multicast data) to the unicast data (that is, the data #1). Therefore, the source access network device still sends the multicast data to the UE 2.

In step 1012, the source access network device sends the data #1 to the UE 2. Correspondingly, in step 1012, the UE 2 receives the data #1 from the source access network device.

The source access network device may determine, based on the N2 message received in step 1010, not to send the multicast data but to send the unicast data to the UE 2. Therefore, the source access network device may send the RRC reconfiguration message to the UE 2. The RRC reconfiguration message may indicate that the UE 2 no longer uses a G-RNTI to receive the multicast data, but uses a C-RNTI to receive the multicast data, where the C-RNTI is preconfigured for the UE 2.

Although not shown in FIG. 10, it may be understood that the UPF may still continue to send the multicast data to the source access network device, and the source access network device may also continue to send the multicast data to UE (for example, including the UE 1) that is in the source cell and that belongs to the multicast group corresponding to the multicast data. In other words, except the to-be-handed-over UE 2, another UE that is in the source cell and that belongs to the multicast group can still receive the multicast data.

In this way, the UE 2 is switched from receiving multicast data to receiving unicast data. Then, the UE 2 may be handed over from the source access network device to the target access network device according to the method in the conventional technology.

It should be noted that the procedure of step 1004 to step 1012 may be performed after step 1003. For ease of understanding and description, the following further describes an occasion for performing step 1004 to step 1012 with reference to a handover procedure in the conventional technology. It should be understood that, because a handover procedure shown in the following belongs to the conventional technology, and is shown only for ease of describing a sequence of performing step 1004 to step 1012 in this specification, the following procedure shows only a partial procedure related to step 1004 to step 1012, and does not show a complete handover procedure. The steps shown in the figure are merely a part of steps in the handover procedure, and shall not constitute any limitation on this application. For a specific handover procedure, refer to related descriptions in 3GPP protocols TS23.502, TS38.300, and the like. Details are not described in this specification.

FIG. 11 shows a partial procedure of an Xn-based handover.

In step 1100, an AMF provides mobility control information for all access network devices (for example, including a source access network device and a target access network device).

In step 1101, UE (for example, the UE may be the UE 2 described above) in a source cell performs measurement control and reporting. The UE 2 may report a measurement report to the source access network device.

In step 1102, the source access network device determines, based on the measurement report, that the UE 2 needs to be handed over to the target access network device.

It should be understood that step 1101 and step 1102 may correspond to step 1003 in the foregoing method 1000.

In step 1103, the source access network device sends a handover request message to the target access network device.

In step 1104, the target access network device determines that the UE 2 is allowed to be handed over to the target cell, and in step 1105, sends a handover request acknowledge message to the source access network device. The handover request acknowledge message carries container information to be sent to the UE 2. The container information includes, for example, a target cell identifier, a C-RNTI allocated by the target access network device to the UE 2, and security identification information.

In step 1106, the source access network device initiates a handover to the UE 2, and sends the container information to the UE 2.

Then, the UE 2 may perform a procedure of the handover from the source access network device to the target access network device.

For example, step 1004 to step 1012 may be performed between step 1102 and step 1103, or may be performed between step 1105 and step 1106. This is not limited in this application.

Because a subsequent procedure does not relate to a sequence of performing step 1004 to step 1012, and the handover procedure belongs to the conventional technology, for brevity, details are not described herein.

Figure 13:
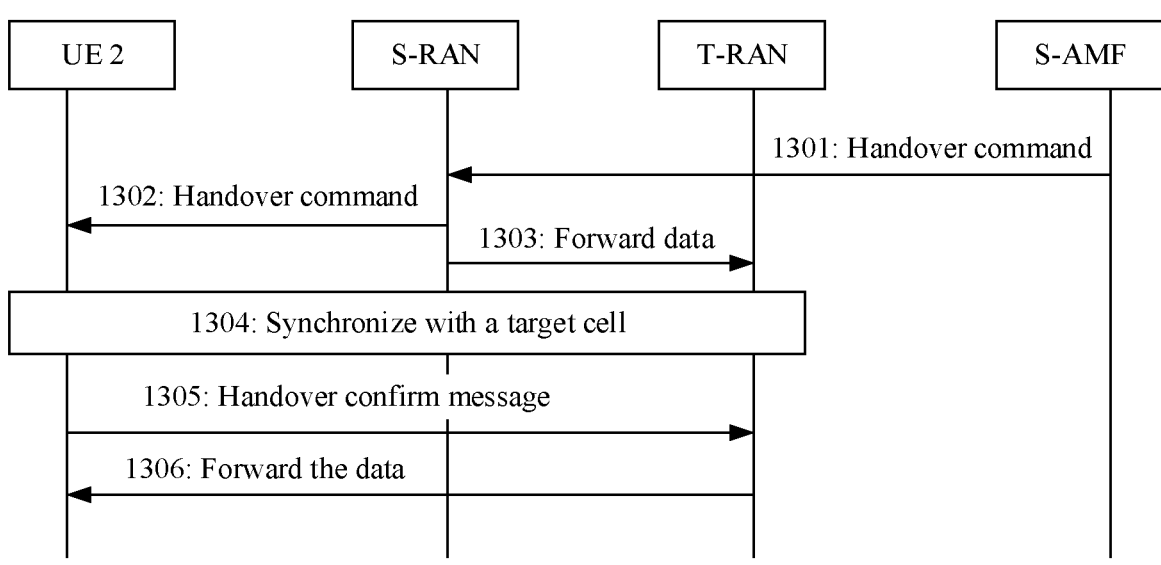

FIG. 12 and FIG. 13 show partial procedures of an N2-based handover. The procedure shown in FIG. 12 is a partial procedure in a preparation phase of the N2-based handover, and the procedure shown in FIG. 13 is a partial procedure in an execution phase of the N2-based handover.

The following first describes a sequence of performing the preparation phase of the N2-based handover shown in FIG. 12 and step 1004 to step 1012.

In step 1201, a source access network device determines that an N2-based handover needs to be performed on UE 2.

For example, the source access network device may determine, based on a measurement report reported by the UE 2, to hand over the UE 2 to a target access network device. Because communication through an Xn interface is not supported between the target access network device and the source access network device, the handover is an N2-based handover. In this case, the source access network device may trigger the N2-based handover of the UE 2.

In step 1202, the source access network device sends a handover required message to a source AMF.

The handover required message may include identifier information of the target access network device, identifier information of a PDU session that needs to be handed over, container information to be sent to the target access network device, and the like.

In step 1203, the source AMF determines a target AMF based on the identifier information of the target access network device.

The source AMF may determine, based on the identifier information of the target access network device, whether the source AMF can continue to provide a service for the UE 2. If the source AMF cannot continue to provide a service for the UE 2, the source AMF may select a new AMF (that is, the target AMF) to provide a service for the UE 2.

If the UE 2 is switched from receiving multicast data to receiving unicast data in the preparation phase of the N2-based handover, step 1004 to step 1012 may be performed, for example, before step 1202.

Because a subsequent procedure does not relate to a sequence of performing step 1004 to step 1012, and the handover procedure belongs to the conventional technology, for brevity, details are not described herein.

The following describes a sequence of performing the execution phase of the N2-based handover shown in FIG. 13 and step 1004 to step 1012.

In step 1301, a source AMF sends a handover command to a source access network device.

The handover command carries handover information, for example, identifier information of a PDU session of UE that needs to be handed over, identifier information of a target access network device, and an identifier of a target cell. This is not limited in this application.

In step 1302, the source access network device forwards the handover command to the UE (for example, UE 2) that needs to be handed over.

In step 1303, the source access network device forwards, to the target access network device, data to be sent to the UE 2, so that the data is forwarded to the UE 2 by the target access network device.

In step 1304, the UE 2 is synchronized with the target cell.

In step 1305, The UE 2 sends a handover confirm message to the source access network device.

In step 1306, the target access network device sends, to the UE 2, the data received from the source access network device.

If the UE 2 is switched from receiving multicast data to receiving unicast data in an execution process of the N2-based handover, step 1004 to step 1012 may be performed, for example, before step 1302.

Because a subsequent procedure does not relate to a sequence of performing step 1004 to step 1012, and the handover procedure belongs to the conventional technology, for brevity, details are not described herein.

With reference to a plurality of handover procedures, the foregoing describes in detail a specific example of applying the method 1000 provided in FIG. 10 to an existing handover procedure. However, these examples are shown merely for ease of understanding, and should not constitute any limitation on this application.

According to the foregoing method, when the UE 2 needs to be handed over, the UE 2 may be first switched from receiving multicast data to receiving unicast data, and then may implement a cell handover based on an existing handover procedure, thereby avoiding a packet loss of the multicast data, and helping obtain complete data. This ensures that the UE 2 is handed over without a delay in a multicast data scenario, and also ensures data transmission performance.

In a plurality of embodiments shown above, data received after the UE 2 is handed over to the target access network device is unicast data. However, this does not indicate that the UE 2 always receives the unicast data in the target cell. If multicast data is also transmitted in the target cell, the UE 2 may further be switched from receiving unicast data to receiving multicast data. A specific process in which the UE 2 is switched from receiving unicast data to receiving multicast data is similar to the foregoing specific process in which the UE 2 is switched from receiving multicast data to receiving unicast data. For brevity, details are not described herein again.

In the foregoing embodiments, each network element may perform a part or all of the steps in the embodiments. These steps or operations are merely examples. Other operations or variations of various operations may further be performed in embodiments of this application. In addition, the steps may be performed in a sequence different from a sequence presented in embodiments, and not all operations in embodiments are necessarily performed. In addition, sequence numbers of the steps do not indicate an execution sequence. An execution sequence of the processes should be determined based on functions and internal logic of the processes, and should not constitute any limitation on the implementation process of embodiments of this application.

Figure 14:
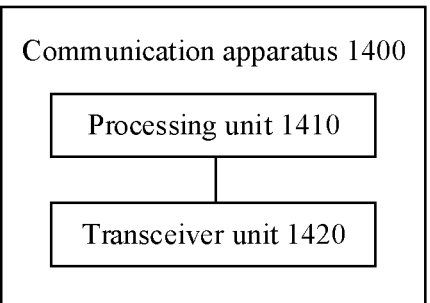
FIG. 14 is a schematic block diagram of a communication apparatus according to an embodiment of this application.

FIG. 14 is a schematic block diagram of a communication apparatus according to an embodiment of this application. As shown in FIG. 14, the communication apparatus 1400 may include a processing unit 1410 and a transceiver unit 1420.

In a possible design, the communication apparatus 1400 may correspond to the target access network device in the foregoing method embodiment. For example, the communication apparatus 1400 may be the target access network device, or a component (for example, a circuit, a chip, or a chip system) disposed in the target access network device.

It should be understood that the communication apparatus 1400 may correspond to the target access network device in the method 400, the method 600, the method 800, and the method 1000 in embodiments of this application. The communication apparatus 1400 may include units configured to perform the methods performed by the target access network device in the method 400 in FIG. 4, the method 600 in FIG. 6, the method 800 in FIG. 8, and the method 1000 in FIG. 10. In addition, the units in the communication apparatus 1400 and the foregoing other operations and/or functions are used for implementing corresponding procedures of the method 400 in FIG. 4, the method 600 in FIG. 6, the method 800 in FIG. 8, and the method 1000 in FIG. 10.

In another possible design, the communication apparatus 1400 may correspond to the source access network device in the foregoing method embodiment. For example, the communication apparatus 1400 may be the source access network device, or a component (for example, a circuit, a chip, or a chip system) disposed in the source access network device.

It should be understood that the communication apparatus 1400 may correspond to the source access network device in the method 400, the method 600, the method 800, and the method 1000 in embodiments of this application. The communication apparatus 1400 may include units configured to perform the methods performed by the source access network device in the method 400 in FIG. 4, the method 600 in FIG. 6, the method 800 in FIG. 8, and the method 1000 in FIG. 10. In addition, the units in the communication apparatus 1400 and the foregoing other operations and/or functions are used for implementing corresponding procedures of the method 400 in FIG. 4, the method 600 in FIG. 6, the method 800 in FIG. 8, and the method 1000 in FIG. 10.

Figure 15:
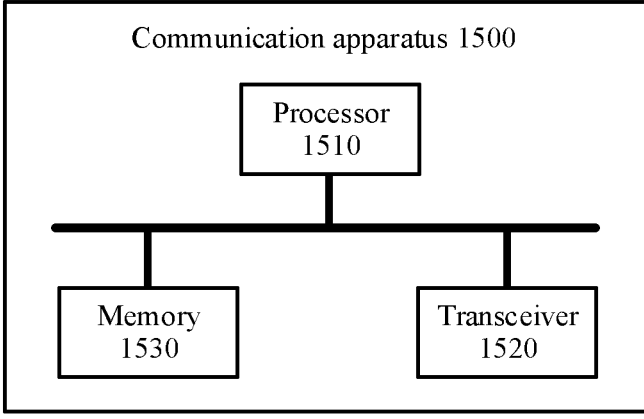
FIG. 15 is another schematic block diagram of a communication apparatus according to an embodiment of this application.
Figure 16:
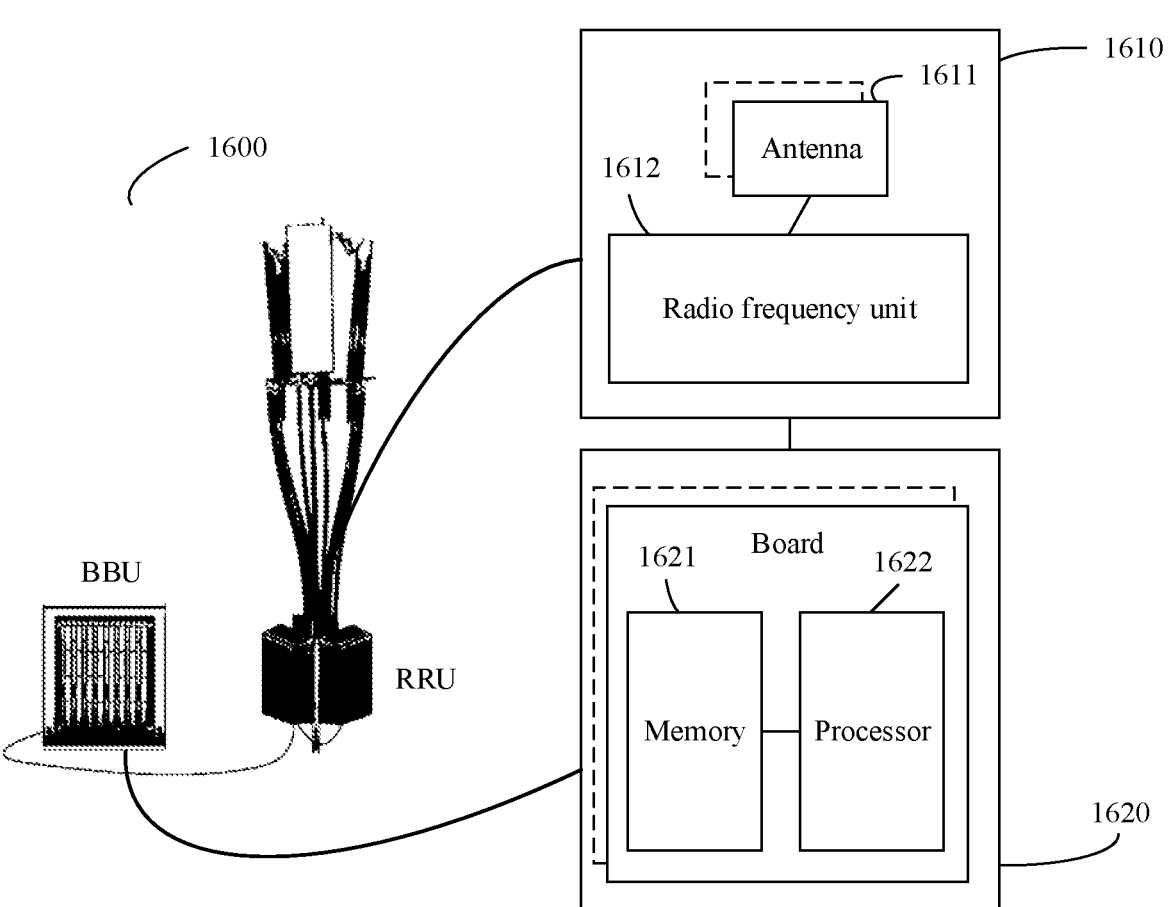
FIG. 16 is a schematic diagram of a structure of an access network device according to an embodiment of this application.

It should be further understood that when the communication apparatus 1400 is the source access network device or the target access network device, the transceiver unit 1420 in the communication apparatus 1400 may be implemented by using a transceiver, for example, may correspond to a transceiver 1520 in a communication apparatus 1500 shown in FIG. 15 or an RRU 1610 in a base station 1600 shown in FIG. 16. The processing unit 1410 in the communication apparatus 1400 may be implemented by using at least one processor, for example, may correspond to a processor 1510 in the communication apparatus 1500 shown in FIG. 15 or a BBU 1620 in the base station 1600 shown in FIG. 16.

It should be further understood that when the communication apparatus 1400 is the chip or the chip system disposed in the source access network device or the target access network device, the transceiver unit 1420 in the communication apparatus 1400 may be implemented by using an input/output interface, and the processing unit 1410 in the communication apparatus 1400 may be implemented by using a processor, a microprocessor, an integrated circuit, or the like integrated on the chip or the chip system.

In still another possible design, the communication apparatus 1400 may correspond to the SMF in the foregoing method embodiment. For example, the communication apparatus 1400 may be the SMF, or a component (for example, a circuit, a chip, or a chip system) disposed in the SMF.

It should be understood that the communication apparatus 1400 may correspond to the SMF in the method 400, the method 600, the method 800, and the method 1000 in embodiments of this application. The communication apparatus 1400 may include units configured to perform the methods performed by the SMF in the method 400 in FIG. 4, the method 600 in FIG. 6, the method 800 in FIG. 8, and the method 1000 in FIG. 10. In addition, the units in the communication apparatus 1400 and the foregoing other operations and/or functions are used for implementing corresponding procedures of the method 400 in FIG. 4, the method 600 in FIG. 6, the method 800 in FIG. 8, and the method 1000 in FIG. 10.

It should be further understood that when the communication apparatus 1400 is the SMF, the transceiver unit 1420 in the communication apparatus 1400 may be implemented by using a transceiver, for example, may correspond to the transceiver 1520 in the communication apparatus 1500 shown in FIG. 15. The processing unit 1410 in the communication apparatus 1400 may be implemented by using at least one processor, for example, may correspond to the processor 1510 in the communication apparatus 1500 shown in FIG. 15.

It should be further understood that when the communication apparatus 1400 is the chip or the chip system disposed in the source access network device or the target access network device, the transceiver unit 1420 in the communication apparatus 1400 may be implemented by using an input/output interface, and the processing unit 1410 in the communication apparatus 1400 may be implemented by using a processor, a microprocessor, an integrated circuit, or the like integrated on the chip or the chip system.

In yet another possible design, the communication apparatus 1400 may correspond to the UPF in the foregoing method embodiment. For example, the communication apparatus 1400 may be the UPF, or a component (for example, a circuit, a chip, or a chip system) disposed in the UPF.

It should be understood that the communication apparatus 1400 may correspond to the UPF in the method 400, the method 600, the method 800, and the method 1000 in embodiments of this application. The communication apparatus 1400 may include units configured to perform the methods performed by the UPF in the method 400 in FIG. 4, the method 600 in FIG. 6, the method 800 in FIG. 8, and the method 1000 in FIG. 10. In addition, the units in the communication apparatus 1400 and the foregoing other operations and/or functions are used for implementing corresponding procedures of the method 400 in FIG. 4, the method 600 in FIG. 6, the method 800 in FIG. 8, and the method 1000 in FIG. 10.

It should be further understood that when the communication apparatus 1400 is the UPF, the transceiver unit 1420 in the communication apparatus 1400 may be implemented by using a transceiver, for example, may correspond to the transceiver 1520 in the communication apparatus 1500 shown in FIG. 15. The processing unit 1410 in the communication apparatus 1400 may be implemented by using at least one processor, for example, may correspond to the processor 1510 in the communication apparatus 1500 shown in FIG. 15.

It should be further understood that when the communication apparatus 1400 is the chip or the chip system disposed in the source access network device or the target access network device, the transceiver unit 1420 in the communication apparatus 1400 may be implemented by using an input/output interface, and the processing unit 1410 in the communication apparatus 1400 may be implemented by using a processor, a microprocessor, an integrated circuit, or the like integrated on the chip or the chip system.

FIG. 15 is another schematic block diagram of the communication apparatus 1500 according to an embodiment of this application. As shown in FIG. 15, the communication apparatus 1500 includes the processor 1510, the transceiver 1520, and a memory 1530. The processor 1510, the transceiver 1520, and the memory 1530 communicate with each other through an internal connection path. The memory 1530 is configured to store instructions. The processor 1510 is configured to execute the instructions stored in the memory 1530, to control the transceiver 1520 to send a signal and/or receive a signal.

It should be understood that the communication apparatus 1500 may correspond to the terminal device in the foregoing method embodiment, and may be configured to perform the steps and/or procedures performed by the network device or the terminal device in the foregoing method embodiment. Optionally, the memory 1530 may include a read-only memory and a random access memory, and provide the instructions and data for the processor. The memory may further include a nonvolatile random access memory. The memory 1530 may be an independent component, or may be integrated into the processor 1510. The processor 1510 may be configured to execute the instructions stored in the memory 1530. In addition, when the processor 1510 executes the instructions stored in the memory, the processor 1510 is configured to perform the steps and/or the procedures corresponding to the network device or the terminal device in the foregoing method embodiment.

Optionally, the communication apparatus 1500 may be the target access network device, the source access network device, the SMF, or the UPF in the foregoing embodiment.

The transceiver 1520 may include a transmitter and a receiver. The transceiver 1520 may further include an antenna. There may be one or more antennas. The processor 1510, the memory 1530, and the transceiver 1520 may be components integrated into different chips. For example, the processor 1510 and the memory 1530 may be integrated into a baseband chip, and the transceiver 1520 may be integrated into a radio frequency chip. Alternatively, the processor 1510, the memory 1530, and the transceiver 1520 may be components integrated into a same chip. This is not limited in this application.

Optionally, the communication apparatus 1500 may be a component, for example, a chip or a chip system, disposed in a target access network device, a source access network device, an SMF, or a UPF.

Alternatively, the transceiver 1520 may be a communication interface, for example, an input/output interface. The transceiver 1520, the processor 1510, and the memory 1530 may be integrated into a same chip, for example, integrated into a baseband chip.

FIG. 16 is a schematic diagram of a structure of an access network device according to an embodiment of this application, for example, may be a schematic diagram of a structure of a base station. The base station 1600 may be applied to the system shown in FIG. 1, and performs a function of the target access network device or the source access network device in the foregoing method embodiment. As shown in the figure, the base station 1600 may include one or more radio frequency units such as remote radio units (RRUs) 1610 and one or more baseband units (BBUs) (which may also be referred to as distributed units (DUs)) 1620.

The RRU 1610 may be referred to as a transceiver unit, and corresponds to the transceiver unit 1420 in FIG. 14. Optionally, the transceiver unit 1610 may also be referred to as a transceiver machine, a transceiver circuit, a transceiver, or the like, and may include at least one antenna 1611 and a radio frequency unit 1612. Optionally, the transceiver unit 1610 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The RRU 1610 part is mainly configured to: send and receive a radio frequency signal, and perform conversion between the radio frequency signal and a baseband signal. For example, the RRU 1610 is configured to send a packet to a terminal device. The BBU 1620 is mainly configured to: perform baseband processing, control the base station, and the like. The RRU 1610 and the BBU 1620 may be physically disposed together, or may be physically disposed separately, that is, in a distributed base station.

The BBU 1620 is a control center of the base station, or may be referred to as a processing unit. The BBU 1620 may correspond to the processing unit 1410 in FIG. 14, and is mainly configured to implement baseband processing functions, for example, tunnel coding, multiplexing, modulation, and spreading. For example, the BBU (the processing unit) may be configured to control the base station to perform an operation procedure related to the network device in the foregoing method embodiment, for example, generate the foregoing indication information.

In an example, the BBU 1620 may include one or more boards, and a plurality of boards may jointly support a radio access network (for example, an LTE network) having a single access standard, or may separately support radio access networks (for example, an LTE network, a 5G network, or another network) having different access standards. The BBU 1620 further includes a memory 1621 and a processor 1622. The memory 1621 is configured to store necessary instructions and data. The processor 1622 is configured to control the base station to perform a necessary action, for example, configured to control the base station to perform an operation procedure related to the network device in the foregoing method embodiment. The memory 1621 and the processor 1622 may serve the one or more boards. In other words, the memory and the processor may be disposed on each board. Alternatively, a plurality of boards may share a same memory and a same processor. In addition, a necessary circuit may be further disposed on each board.

It should be understood that the base station 1600 shown in FIG. 16 can implement processes of the target access network device or the source access network device in the method embodiment in FIG. 4, FIG. 6, FIG. 8, or FIG. 10. The operations and/or the functions of the modules in the base station 1600 are intended to implement corresponding procedures in the foregoing method embodiments. For details, refer to the descriptions in the foregoing method embodiments. To avoid repetition, detailed descriptions are properly omitted herein.

The BBU 1620 may be configured to perform an action internally implemented by the target access network device or the source access network device described in the foregoing method embodiments, and the RRU 1610 may be configured to perform a sending or receiving action of the target access network device or the source access network device described in the foregoing method embodiments, for example, an action of sending to or receiving from the terminal device. For details, refer to the descriptions in the foregoing method embodiments. Details are not described herein again.

An embodiment of this application further provides a processing apparatus, including a processor and an interface. The processor is configured to perform the handover method in any one of the foregoing method embodiments.

It should be understood that the processing apparatus may be one or more chips. For example, the processing apparatus may be a field programmable gate array (FPGA), an appli-cation-specific integrated circuit (ASIC), a system on chip (SoC), a central processing unit (CPU), a network processor (NP), a digital signal processing circuit (DSP), a micro controller unit (MCU), a programmable logic device (PLD), or another integrated chip.

In an implementation process, steps in the foregoing methods may be implemented by using a hardware integrated logical circuit in the processor, or by using instructions in a form of software. The steps in the methods disclosed with reference to embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein.

It should be noted that, the processor in embodiments of this application may be an integrated circuit chip, and has a signal processing capability. In an implementation process, steps in the foregoing method embodiments may be implemented by using a hardware integrated logical circuit in the processor or by using instructions in a form of software. The foregoing processor may be a general-purpose processor, a digital signal processor (DSP), an application-specific inte-grated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (erasable PROM, EPROM), an electrically erasable pro-grammable read-only memory (electrically EPROM, EEPROM), or a flash memory. The volatile memory may be a random access memory (random access memory, RAM) and is used as an external cache. For example but not limitation, many forms of RAMs may be used, for example, a static random access memory (static RAM, SRAM), a dynamic random access memory (dynamic RAM, DRAM), a synchronous dynamic random access memory (synchro-nous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory in the system and the method described in this specification is intended to include, but not limited to, these memories and any memory of another proper type.

Based on the methods provided in embodiments of this application, this application further provides a computer program product. The computer program product includes computer program code. When the computer program code is run on a computer, the computer is enabled to perform the method in any one of embodiments shown in FIG. 4, FIG. 6, FIG. 8, and FIG. 10.

Based on the methods provided in embodiments of this application, this application further provides a computer-readable medium. The computer-readable medium stores program code. When the program code is run on a computer, the computer is enabled to perform the method in any one of embodiments shown in FIG. 4, FIG. 6, FIG. 8, and FIG. 10.

Based on the methods provided in embodiments of this application, this application further provides a system, including one or more of the foregoing target access network device, source access network device, SMF, UPF, and terminal device.

All or a part of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For a function of a specific unit, refer to a corresponding method embodiment. There may be one or more processors.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and based on, for example, a signal having one or more packets (for example, data from two components interacting with another component in a local system and/or a distributed system, and/or across a network such as the internet interacting with other systems by using the signal).

A person of ordinary skill in the art may be aware that, various illustrative logical blocks and steps that are described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Apart or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

In the foregoing embodiments, all or a part of the functions of the functional units may be implemented by using software, hardware, firmware, or any combination thereof.

When software is used to implement the functions, all or a part of the functions may be implemented in a form of a computer program product. The computer program product includes one or more computer instructions (programs). When the computer instructions (programs) are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in a form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A handover method, comprising:
receiving, by a target access network device, a first message requesting establishment of a resource for handing over a terminal device to the target access network device;
obtaining, by the target access network device from the first message, information for transmitting multicast data;
sending, by the target access network device, a second message indicating the established resource on the target access network device, wherein the second message carries related information for the terminal device to access the target access network device and container information sent to the terminal device;

receiving, by the target access network device, a first packet from a user plane network element, wherein the first packet corresponds to the information for transmitting the multicast data and includes a first sequence number corresponding to the first packet;
receiving, by the target access network device, a second packet from a source access network device through a forwarding tunnel, wherein the second packet corresponds to the information for transmitting the multicast data and includes a second sequence number corresponding to the second packet, and wherein the second packet is received by the source access network device from the user plane network element; and
sending, by the target access network device, the first packet to the terminal device when the first sequence number is less than or equal to the second sequence number, and sending, by the target access network device, the second packet to the terminal device when the first sequence number is greater than the second sequence number.

2. The method according to claim 1, further comprising:
buffering, by the target access network device, the first packet; and
sending, by the target access network device, the buffered first packet to the terminal device.

3. A communication apparatus, comprising:
a non-transitory memory storage comprising instructions; and
one or more processors in communication with the memory storage, wherein execution of the instructions by the one or more processors causes the communication apparatus to:
receive a first message requesting establishment of a resource for handing over a terminal device to a target access network device;
obtain, from the first message, information for transmitting multicast data;
send a second message indicating the established resource on the target access network device, wherein the second message carries related information for the terminal device to access the target access network device and container information sent to the terminal device;
receive a first packet from a user plane network element, wherein the first packet corresponds to the information for transmitting the multicast data and includes a first sequence number corresponding to the first packet;
receive a second packet from a source access network device through a forwarding tunnel, wherein the second packet corresponds to the information for transmitting the multicast data and comprises a second sequence number corresponding to the second packet, and wherein the second packet is received by the source access network device from the user plane network element; and
send to the terminal device the first packet when the first sequence number is less than or equal to the second sequence number and send to the terminal device the second packet when the first sequence number is greater than the second sequence number.

4. The apparatus according to claim 3, wherein execution of the instructions by the one or more processors further causes the communication apparatus to:
buffer the first packet; and
send the buffered first packet to the terminal device.

5. A handover system, comprising:

a source access network device; and a target access network device, wherein:

the source access network device is configured to send a first message requesting establishment of a resource for handing over a terminal device to the target access network device, wherein the first message comprises information for transmitting multicast data;

the target access network device is configured to receive the first message and to send a second message indicating an established resource on the target access network device, wherein the second message carries related information for the terminal device to access the target access network device and container information sent to the terminal device;

the source access network device is further configured to receive the second message; and the target access network device is configured to receive a first packet from a user plane network element and to send the first packet to the terminal device, wherein the first packet corresponds to the information for transmitting the multicast data and includes a first sequence number corresponding to the first packet;

the source access network device is configured to send to the target access network device through a forwarding tunnel a second packet corresponding to the information for transmitting the multicast data, the second packet including a second sequence number corresponding to the second packet, and wherein the second packet is received by the source access network device from the user plane network element;

wherein the target access network device is further configured to:

send the first packet to the terminal device when the first sequence number is less than or equal to the second sequence number; and send the second packet to the terminal device when the first sequence number is greater than the second sequence number.

6. The system according to claim 5, wherein the target access network device is configured to:

buffer the first packet; and send the buffered first packet to the terminal device.

7. A non-transitory computer readable storage medium comprising instructions which, when executed by one or more processors, cause the one or more processors to perform operations comprising:

receiving a first message, wherein the first message includes a request to establish a resource for handing over a terminal device to a target access network device;

obtaining, from the first message, information for transmitting multicast data;

sending a second message indicating the established resource on the target access network device, wherein the second message carries related information for the terminal device to access the target access network device and container information sent to the terminal device;

receiving a first packet from a user plane network element, the first packet corresponding to the information for transmitting the multicast data and comprising a first sequence number corresponding to the first packet;

receiving a second packet from a source access network device through a forwarding tunnel, wherein the second packet corresponds to the information for transmitting the multicast data and comprises a second sequence number corresponding to the second packet, and wherein the second packet is received by the source access network device from the user plane network element; and sending to the terminal device the first packet when the first sequence number is less than or equal to the second sequence number and send to the terminal device the second packet when the first sequence number is greater than the second sequence number.

\* \* \* \* \*